United States Patent
Antognini et al.

(10) Patent No.: US 6,176,427 B1
(45) Date of Patent: Jan. 23, 2001

(54) VARIABLE FORMATTING OF DIGITAL DATA INTO A PATTERN

(75) Inventors: Thomas Charles Antognini, Lexington, MA (US); Walter Gerard Antognini, New York, NY (US)

(73) Assignee: Cobblestone Software, Inc., Lexington, MA (US)

(*) Notice: Under 35 U.S.C. 154(b), the term of this patent shall be extended for 0 days.

(21) Appl. No.: 09/382,173

(22) Filed: Aug. 23, 1999

Related U.S. Application Data

(62) Division of application No. 08/609,549, filed on Mar. 1, 1996, now Pat. No. 6,098,882.

(51) Int. Cl.$^7$ .................................................. G06K 7/10
(52) U.S. Cl. ........................ 235/454; 235/456; 235/494
(58) Field of Search ................................ 235/494, 456, 235/432, 462.1, 462.11, 462.09, 462.07, 462.04, 454

(56) References Cited

U.S. PATENT DOCUMENTS

| | | |
|---|---|---|
| 3,624,284 | 11/1971 | Russell . |
| 3,660,641 | 5/1972 | Levasseur . |
| 4,286,146 | 8/1981 | Uno et al. . |
| 4,488,679 | 12/1984 | Bockholt et al. . |
| 4,532,616 | 7/1985 | Jewer . |
| 4,535,204 | 8/1985 | Hughes et al. . |
| 4,754,127 | 6/1988 | Brass et al. . |
| 4,998,009 | 3/1991 | Iijima et al. . |
| 5,018,072 | 5/1991 | Ibamoto et al. . |
| 5,053,609 | 10/1991 | Priddy et al. . |
| 5,060,980 | 10/1991 | Johnson et al. . |
| 5,113,445 | 5/1992 | Wang . |
| 5,137,304 | 8/1992 | Silverschotz et al. . |
| 5,153,928 | 10/1992 | Iizuka . |
| 5,168,147 | 12/1992 | Bloomberg . |
| 5,170,044 | 12/1992 | Pastor . |
| 5,204,515 | 4/1993 | Yoshida . |
| 5,221,833 | 6/1993 | Hecht . |
| 5,241,166 * | 8/1993 | Chandler .............................. 235/494 |
| 5,243,655 | 9/1993 | Wang . |
| 5,245,165 | 9/1993 | Zhang . |
| 5,269,522 | 12/1993 | Chagoll et al. . |

(List continued on next page.)

OTHER PUBLICATIONS

Paulidas, Swartz, & Yang, "Information Encoding With Two–Dimensional Bar Codes", Jun. 1992, pp. 18–29, IEEE, USA.

Xerox, "Smart Paper Tool Kit Technical Overview", Dec. 1994, all pages, Xerox Corporation, Palo Alto, California.

InfoImaging, "3D Fax Software Marketing Material", 1995, all pages, InfoImaging Technologies, Inc., Palo Alto, California.

*Primary Examiner*—Thien M. Le
(74) *Attorney, Agent, or Firm*—Brown Raysman Millstein Felder & Steiner LLP

(57) ABSTRACT

A method of formatting digital data and a method of decoding the formatted digital data. User selectable format parameters vary the dimensions and other attributes of spots and the cells containing those spots as well as other features which the formatting process formats into a pattern. A method of encoding the formatted digital data using these format parameters allows for encoding a substrate optimally for any given printer or scanner. One embodiment provides for markers to facilitate determination of cell locations. In one embodiment the decoding process achieves a pyramid gain of knowledge by locating a landmark (801), which is located in a known position relative to a metasector (802), which contains information about the encoding process used to encode the main body of data (803), which the decoding process decodes to recover the original digital data. Further embodiments include encryption, transmission by facsimile, inclusion of human readable information, and automatic launches of computer files.

38 Claims, 25 Drawing Sheets

U.S. PATENT DOCUMENTS

| | | |
|---|---|---|
| 5,278,400 | 1/1994 | Appel . |
| 5,315,098 | 5/1994 | Tow . |
| 5,327,510 | 7/1994 | Morikawa et al. . |
| 5,329,107 | 7/1994 | Priddy et al. . |
| 5,337,362 | 8/1994 | Wang et al. . |
| 5,343,031 * | 8/1994 | Yoshida ................................ 235/494 |
| 5,369,261 | 11/1994 | Shamir . |
| 5,454,054 * | 9/1995 | Iizuka ................................... 382/321 |
| 5,468,953 * | 11/1995 | Priddy et al. ........................ 235/494 |
| 5,473,151 * | 12/1995 | Priddy et al. ........................ 235/494 |
| 5,477,045 * | 12/1995 | Priddy et al. ........................ 235/494 |
| 5,479,004 * | 12/1995 | Priddy et al. ........................ 235/494 |
| 5,568,555 | 10/1996 | Shamir . |
| 5,576,528 | 11/1996 | Chew et al. . |
| 5,694,102 * | 12/1997 | Hecht .................................. 235/456 |
| 5,898,166 * | 4/1999 | Fukuda et al. ...................... 235/494 |
| 5,945,655 * | 8/1999 | Gilgeous et al. .................... 235/454 |
| 5,959,285 * | 9/1999 | Schuessler ..................... 235/462.04 |

* cited by examiner

FIG. 9
STANLEY'S KAT KLUB
If you can't take your cat with you but you can't stand to leave your favorite feline in the dog house, Stanley's Kat Klub has hundreds of locations nationwide to accommodate your precious pet. For the location and phone number nearest you or your destination, SCAN, DECODE and RUN the datatile below.
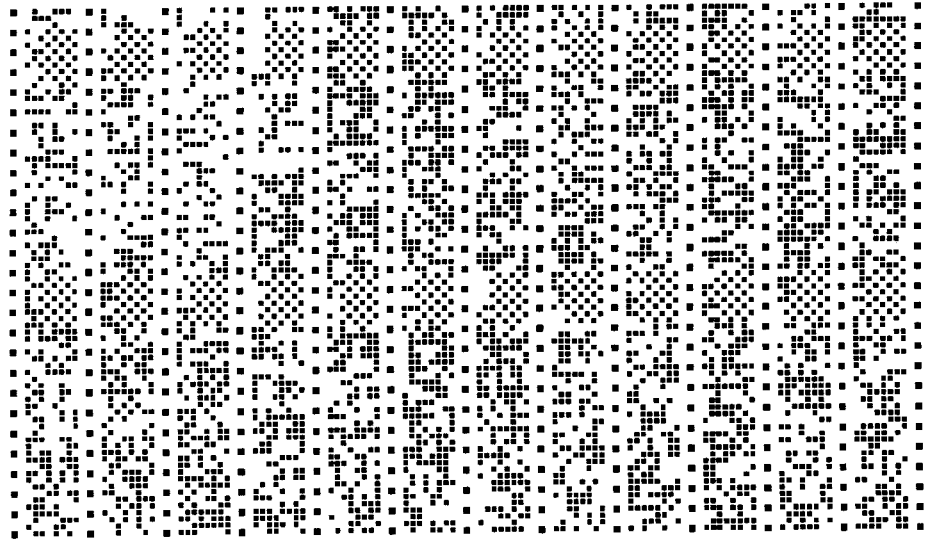

VARIABLE FORMATTING OF DIGITAL DATA INTO A PATTERN

This application is a division of U.S. patent application Ser. No. 08/609,549, titled Variable Formatting of Digital Data into a Pattern, filed on Mar. 1, 1996, now U.S. Pat. No. 6,098,882.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

RELATED APPLICATIONS

This application is related to, and is a division of, patent application Ser. No. 08/609,549, titled Variable Formatting of Digital Data into a Pattern, filed Mar. 1, 1997, now pending, which is hereby incorporated by reference into this application.

BACKGROUND OF THE INVENTION

This invention relates to the formatting of digital data into a pattern, encoding that pattern onto a substrate where appropriate, and decoding that pattern to reconstruct the digital data.

While computers have substantially enhanced the manner in which society conveys and works with information, paper remains the favored manner of conveying information. Indeed, the proliferation of personal computers has resulted in a proliferation of paper. Yet, no technology to date has significantly integrated the digital environment of the computer with the visual environment of written media. Instead, computers primarily direct human readable information to be placed on paper.

It would be greatly advantageous to have digital data placed on paper and other media currently used for human readable information. Such a method would link the largely separate environments of paper and computers. The method could store and convey digital data with greater efficiency, ease, speed, and lesser cost than any other available method. The method would have the further advantage of being the only significant method to integrate digital data with visual media.

As described below, the prior art discloses methods for placing machine readable information on media such as paper. However, none of these prior art methods, and, to the best of the inventors' knowledge, no other technology currently available to personal computer users allows for the placement of a significant amount of machine readable information on the media. Other practical limitations of these prior art methods forestall significant commercial success.

One example of digital information being stored on paper is the use of bar codes. Because standard bar codes are one dimensional, they are severely limited in the number of bars that may be used to store digital information. The limits are somewhat greater in the case of two-dimensional bar codes but these limits are still far more restrictive than the theoretical limits of any particular printer, and bar codes are designed for use with specialized scanners. For more information on bar codes, see "Information Encoding with Two-Dimensional Bar Codes," authored by T. Pavlidis, J. Schwartz and Y. Wang, COMPUTER, June 1992.

U.S. Pat. No. 5,245,165, issued to Zhang, discloses a self-clocking glyph code for encoding dual bit digital values of a logically ordered sequence of wedge-shaped glyphs that are written or otherwise recorded on a hardcopy recording medium in accordance with a predetermined spatial formatting rule. The dual bit values are encoded in the relative rotations of the glyphs. The glyphs are decoded by determining a bounding box for each glyph and determining either which quadrant of the box contains its center of mass or by comparing the relative locations of the shortest and longest runs of ON pixels. To reliably present a single bit of data, each glyph comprises a large number of pixels, and thus this technology requires considerable space on the recording medium. The technology does not optimize the use of space or computational resources by presenting a bit in the most compact fashion.

U.S. Pat. No. 5,337,362, issued to Gormish, discloses a method for transferring digital information to and from plain paper. The method involves storing data in at least one box on the paper, the box including a frame or border having alternating pixels along the left and right edges for use in determining the current location of a horizontal line of pixels when reading the data and having pixels in corners of the frame to determine horizontal spacing between pixels within the box. Binary data is formatted in rows within the box, wherein a bit of digital data is depicted by the presence or absence of an ink dot. The method disclosed by Gormish provides the ability to represent 60 kilobytes of data on a single page.

Although Gormish allows for the storage of more data on a page than can currently be stored in text form, it has several problems which prevent it from being useful in a commercial environment. For example, Gormish requires a thick frame to be placed around the entire data box in order to locate the box, which limits the ability to place the data in convenient shapes and sizes on a substrate. Also, Gormish requires placement of pixels in a rigid fashion, without provision of guideposts to determine where to search for the presence or lack of a dot other than on the borders of the boxes. Further, Gormish provides ink placement in an ink dot that covers an entire square and that square covers an area 16 times larger than the finest optical resolution of any given scanner (e.g., Gormish discloses printing dots at 50 dpi while scanning is performed at 200 dpi), thereby limiting the density of data which can be represented on each page. In addition, although the method disclosed in Gormish may be suited for certain printers and scanners of great precision it does not adequately accommodate for deviations from perfection in printing and scanning found in off-the-shelf printers and scanners designed for use with personal computers. Operating in an environment of personal computers and their peripherals, this rigidity ultimately translates into loss of data density, higher error rates, slower processing speed, all of these deficiencies, or, worse yet, complete inability to use the method in given computer environments.

Other known methods disclose manners in which a single cell contains more than one bit of information through the use of gray scales. One such method is disclosed in U.S. Pat. No. 5,278,400, issued to J. Appel (1994). This patent discloses the encoding of multiple bits in a single cell by marking, preferably by binary marking, a predetermined number of pixels in a cell irrespective of the location of the pixels within the cell. The number of pixels marked corresponds to the data to be encoded. The markings on the substrate are decoded by detecting the gray scale level at each pixel of the cell, converting that gray scale level to a corresponding digital signal and summing all of the digital signals corresponding to all of the pixels in the cell. This method requires discrete determination of where the cell begins and ends. The gains from encoding multiple values in a single cell are lost by requiring larger cells, relative to straightforward binary printing. Gormish also discloses the encoding of multiple values in one cell through the use of gray scale inks. This method employs rigid formatting and printing described above and similarly relies on rigid decoding mechanisms that may be optimized for a particular combination of a printer and a scanner, but not for all such combinations. These methods give back the data density and savings in computational resources that the use of multiple colors should provide.

U.S. Pat. No. 5,329,107, issued to D. Priddy and R. Cymbalski (1994), discloses a method to dynamically vary the size, format, and density of machine readable binary code. The method disclosed in that document provides a code formed of a matrix and allows variation in the amount of data in the matrix by printing on two sides of the perimeter of the matrix broken line patterns of alternating darkened and lightened areas. The method determines the amount of data in the matrix from the product of the number of lightened areas and darkened areas of the first side and the number of lightened areas and darkened areas of the second. The method determines size of the matrix by measuring the other two sides of the perimeter, formed of two solid black lines. While the method allows the encoder of information some flexibility in accommodating the different potentials of higher and lower resolution scanners, the method is rigid in darkening entire square cells. The method also lacks regular reference markers and generally limits information about the encoding, conveyed in the matrix, to size and density. The method therefore lacks the flexibility needed to address the peculiarities of every combination of printer and scanner. Hence the method can not produce the greatest density of data or the most efficient manner of decoding for every combination of printer and scanner.

There is a need to substantially increase the amount of data that can be stored within a given amount of paper in order to compete with other channels of storage and communication such as floppy disks and digital communication by telephone. Employing binary printing (i.e., storing one bit per cell), the most basic and least dense printing process, the invention is capable of storing data at densities several times as great as any other paper based method known to the inventors. Utilizing printing methods which store more than one bit per cell, such as color printing, the theoretical density limits increase substantially.

While Gormish discloses the ability to store 60 kilobytes on a single page using a 400 dpi scanner, the invention is capable of encoding and decoding over 160 kilobytes of data error free (i.e., by utilizing error correction) using just a 300 dpi scanner. With the aid of compression, this single page can contain over 500 kilobytes of text. With a 600 dpi printer and a 600 dpi flatbed scanner, the invention can encode data in cells 1/200 inch square (i.e., 0.005 inch×0.005 inch), successfully encoding and decoding over 300 kilobytes of data before the benefit of any compression, in excess of 1 megabyte of text with the aid of compression. Utilizing more precise printing processes and a 600 dpi flatbed scanner, the invention encodes and decodes over 7,000 bytes per square inch (over 1,100 bytes/cm$^2$), over 20,000 bytes of text using compression. Utilizing an ordinary thermal fax machine as a scanner (achieving a binary scan of approximately 200 dpi), the invention encodes and decodes over 50 kilobytes of data, over 150 kilobytes of text with the aid of compression. All of the above densities are accomplished utilizing binary printing.

The invention also conveys advantages for any particular printer. For example, using an ordinary thermal fax machine the invention can print over 230 kilobytes of data, over 675 kilobytes of text with compression, on an 8.5 by 11 in. piece of thermal fax paper. The invention can then successfully decode that data error free.

SUMMARY OF THE INVENTION

It is an object of the present invention to solve the problems discussed above present in prior art systems for representing digital data on a substrate.

It is another object of the present invention to greatly increase the density at which digital data can be represented on a substrate.

It is another object of this invention to overcome the limitations of prior art through a method that writes and reads digital data on paper and other media using off-the-shelf personal computers and peripherals, and achieves the full carrying capacity these off-the-shelf components can sustain.

It is another object of the invention to determine and enable the features and parameters that contribute to density of information on a printed substrate, and to enable full generality in formatting and decoding along the dimensions identified. This satisfies in turn the ultimate, practical goal: achieving the maximum density possible for any particular combination of printer and scanner. This comes about because that point of maximum density can always be found in the multi-dimensional space so defined.

It is another object of the present invention to provide flexibility in printing digital data onto a substrate along with other information.

These and other objects of the invention are achieved by a method of formatting digital data into a pattern where the pattern comprises a number of cells (i.e., predetermined spaces in the pattern) with known dimensions where each cell conveys at least one bit of data by expressing one of at least two logical states where one logical state is expressed by the presence of spot with a given set of attributes in the cell and a second logical state is expressed by the absence of a spot with those attributes from the cell, and where the size of spots may be different from the size of cells containing the spots.

Generally speaking, in accordance with the invention, a method of formatting data into a pattern in an optimal fashion is provided. The preferred embodiment of the invention provides for the placement of ink on paper. The preferred embodiment allows the person providing data to format the placement of digital data. This flexibility in formatting the placement of digital data allows the person providing data to optimize for any particular combination of encoding device and scanner. The method of encoding allows the person providing data to format the placement of ink in a fashion that best reflects the printer's capabilities to place ink in a designated area. The method of encoding also allows for formatting designed to consider the strengths and limitations of the target audience of scanners.

The features that support encoding information on the printed substrate, and its effective decoding via a scanner, fall under two heads. First, there are dark regions on the substrate, which the current invention terms "spots," whose presence or absence in a specified region represents digital bits. Second, there are guideposts, which the present invention terms "markers," that serve to identify the location of spots on the printed substrate—a function known in the art as "clocking." The present invention explicitly decouples these two features, allowing them to be varied independently, so that each may be optimally configured for its distinct purpose. The current invention also permits each to be varied across all the dimensions (e.g., those defining size, spacing, and frequency) that affect the density of information on the printed substrate, while supporting its effective decoding. This full generality allows the optimum match for a particular printer and scanner always to be selected, formatted, and decoded.

The method of the present invention allows the person or computer encoding data to select the size, in pixels, of both the cell containing a bit of information and the size of the printed spot where a spot is required. The preferred embodiment of the method of encoding provides a bit of one value by placing a spot of the chosen size in the cell of the chosen size. The method provides a bit of the opposite value by leaving the cell of the chosen size blank. In accordance with the invention, the size of the spots and of the cells can be varied in both the width and height directions.

The method of the present invention also allows the person or computer system encoding data to select the size and locations of markers. In accordance with the invention, the size and location of the markers can be flexibly altered to achieve reliable clocking with the minimum amount of space and computation time.

The method of the preferred embodiment provides information about the encoding process through use of a "metasector", a header physically separate from the main body of data. The purpose of providing a metasector is to facilitate decoding the main body of data. In this embodiment, the metasector is itself an instance of the general pattern by which information is stored in the invention. This metasector is preferably printed at a resolution which can be easily and reliably scanned and interpreted. It is also given a predictable and relatively rigid format, which makes it straightforward to decode in the absence of detailed information about the printing process and environment which generated the encoded data. This metasector contains information about the printing process and environment that is then used to decode the main body of data. The somewhat rigid format of the metasector frees the main body of the data from rigidity in its own format, allowing it the greatest flexibility in achieving maximum density. The metasector, encoded at a relatively low resolution, contains information communicated to the remainder of the method in order to decode information at a higher resolution. The information included in the metasector includes, inter alia, the size of the data spots printed, the size of the cells containing data spots, the printing process used to print spots and the size and relative location of markers, if any.

Allowing flexibility in the size and placement of data spots in cells greatly increases density of data and improves the speed and accuracy of determining whether a bit is on or off. The fundamental purpose behind defining spot size independently is twofold—first, to compensate for printer deficiencies and, second, to compensate for scanner deficiencies.

Within types of printers, such as 300 dot-per-inch ("dpi") laser printers, there is variation in both the ability to place ink at a given location and the ability to keep ink within the spot designated by that location. For example, printers have varying degrees of "dot gain"—the tendency of most printers to place ink beyond the purported boundaries of the pixel. Dot gain, and the problems it causes, can be exacerbated when the printing process employed goes through multiple steps. If, for example, the printing process involves producing film from a print, a plate from film, and copies from the plate, increasing amounts of dot gain can occur in each step. A spot is preferably allowed to be defined to be smaller than its cell (i.e., the space that is supposed to contain the spot) simply to prevent spots from spilling over to adjacent cells.

Even with perfect printing, however, it would be important to allow smaller spots than cells, because of a second phenomenon. Scanners characteristically "leak" dark intensities from one pixel to a directly adjacent pixel. That is, if a pixel is directly over a dark region on the printed substrate, and an adjacent pixel is not, the intensity of the adjacent pixel is nonetheless suppressed to a darker value. When spots completely fill in their cells, the cells must be made larger to compensate for this tendency of scanners. If they are not made larger, the neighboring cell when blank may not differ enough in intensity from the dark cell to be discriminated as blank. Making it possible to configure spots to be smaller than cells generally allows cells to be smaller while supporting correct discrimination between dark and white cells.

Of course, it is possible in principle that a given printer (or a like device) may characteristically print smaller spots than defined, or a given scanner (or a like device) may "leak" bright intensities—in which case it would be useful to define spots to be marginally larger than the cells they occupy (or, alternatively, to print spots in reverse video.)

Between types of scanners or types of printers, such as between a 360 dpi inkjet printer and a 600 dpi laser, the degree of variation expands significantly. Laser printers have a greater precision in the placement of ink, and 600 dpi printers place ink more accurately than a 360 dpi printer. The invention provides a method critical to optimization of ink placement based on these variations.

The ability to vary the dimensions of spots and cells in both horizontal and vertical directions also serves to maximize the density of information. For example, with a 200 dpi thermal fax printer, and a 400 dpi scanner, the invention can encode and decode a pattern with cells of 1×2 pixels containing spots of 1×2 pixels, thus encoding over 100 kilobytes of data on a single page. However, a 400 dpi scanner cannot reliably decode a pattern with spots of 1×1 pixels printed at 200 dpi. Since the next step up from 1×1 is 1×2 (or, equivalently, 2×1), the most compact representation is employing the 1×2 cells. If the technology could allow for only square cells, the next step up would be 2×2 cells, which would be only half as compact.

A powerful use of the invention, beyond its ability to communicate and store information (documents, software, graphics, etc.), is as an enabling technology for other technologies. One of the great limiting factors in permitting most consumers to fully exploit their PCs is that the PC possesses simply too many distinct functionalities that must be learned. This is indeed a problem that promises to get only worse as the PC itself develops greater capabilities. Even today, a PC user may have fax and data communication software on the user's PC, and access to the Internet, and the ability to use the PC as a telephone, and many other functionalities. Yet it is a rare user who will know how to utilize all of these functionalities. The present invention can be used to encode on paper an arbitrarily complicated batch file, script file, application file, or executable file that can effectively navigate the user through all the complexities involved in each function the PC can perform. By a simple scan of a datatile, for instance—as easy as running a copier—all such functions can be invoked. A datatile can contain both the identity of the application to be invoked—e.g., data communication, fax communication, Internet access—and the sequence of actions and data that that function requires—e.g., the phone number that must be dialed, the account number of the user, the password that must be entered, the particular address on the Internet sought, and/or a flag for the particular function that should be performed when access is granted. In effect, the datatile enables paper to become the user interface, instructing the user as to the functions that will be performed—e.g., a bill will be paid over the Internet, or a fax back will be initiated. The scan becomes the single thing that the user must learn to do: all other functions can be performed automatically. This spares the unsophisticated user the perhaps overwhelming task of learning how to invoke these functions, and saves the sophisticated user from the tedium of entering the point clicks and detailed information any of these functions demand.

Several features of the invention's methods of encoding and decoding make practical for the first time the enabling of many further, simplifying, technologies. The ability to significantly increase density of data allows far more complicated instructions to be placed in any given amount of space. The ability to accommodate a wide audience of printers and scanners allows access to the greatest number of potential users. The ability to vary the shape, dimensions, and location of the encoded digital data on the substrate allows the greatest flexibility in formatting the digital data alongside other information (such as text or graphics) on the substrate.

Further objects and advantages of the invention will become apparent from a consideration of the drawings and ensuing descriptions.

BRIEF DESCRIPTION OF THE DRAWINGS

The present invention will be understood more fully from the detailed description given below and from the accompanying drawings of the preferred embodiments of the invention which, however, should not be taken to limit the invention to the specific embodiments, but are for explanation and understanding only.

FIG. 9 illustrates a substrate produced by a further embodiment of the invention in which both machine readable encoded digital data and human readable text and graphics is placed on the substrate.

DETAILED DESCRIPTION OF THE PREFERRED EMBODIMENTS

The preferred embodiments of the present invention will be described herein with reference to the drawings in the Figures and the source code of the digital data encoding and decoding software ("DEDS") program contained in the Appendix, which is incorporated in and forms part of this application. The method and system of the preferred embodiments are generally incorporated in the DEDS program. The DEDS program does not yet include, however, all aspects of the preferred embodiment. For example, the format parameters of the preferred embodiment (as described by reference to FIG. 2) include Ink Colors and Ink Types, while the DEDS program does not yet include these parameters. Because inclusion of these additional parameters is advantageous, a future version of the software should include them.

In the preferred embodiment, the DEDS program is designed to operate on a personal computer having an 80386 model microprocessor or higher, at least 4 MB RAM, using the Windows® operating system available from Microsoft Corporation of Redmond, Wash., and available hard disk space of at least 10 MB. The DEDS program supports inkjet and laser printers, grayscale flatbed, handheld, and sheetfed scanners, and thermal, inkjet, and laser fax machines. Of course, one skilled in the art will recognize that the method and system of the present invention can be implemented on any computer system using any appropriate operating system.

Figure 1:
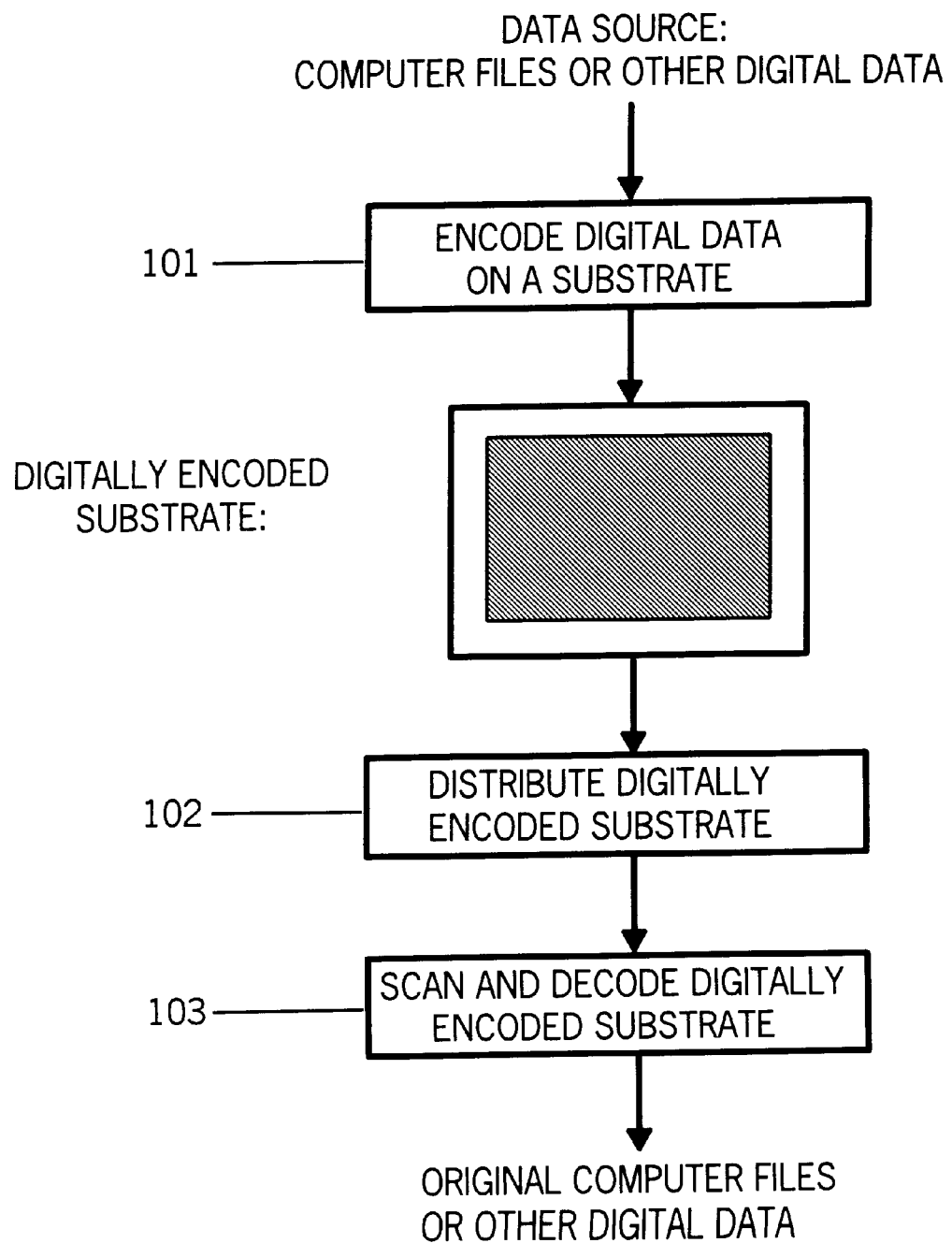
FIG. 1 is a block diagram describing the overall process for transmitting digital data pursuant to one embodiment.

FIG. 1 illustrates the overall process of transmitting digital data, according to one embodiment of the invention, it being understood that the details of the invention itself are described below. The data source comprises digital data. The source, preferably being computer files stored on a personal computer's fixed disk, may also be from a floppy drive, visual images input by a scanner, digital data input by a scanner, files stored in memory, as might be the case, for example, of a word processing document input through a keyboard, or any other source capable of producing digital data. The program encodes this digital data on a substrate, step 101, producing a substrate with the digitally encoded data. The program then places the digitally encoded substrate in the hands of the ultimate user of the digital data, step 102. The ultimate user scans and decodes the digitally encoded substrate, step 103, which results in the reconstruction of the original computer files or other digital data. The overall result of the process described in FIG. 1 is the transmission or storage of digital data, with a substrate such as paper being the medium for that storage or transmission.

Each of these steps will now be described in greater detail.

Encoding

Figure 2:
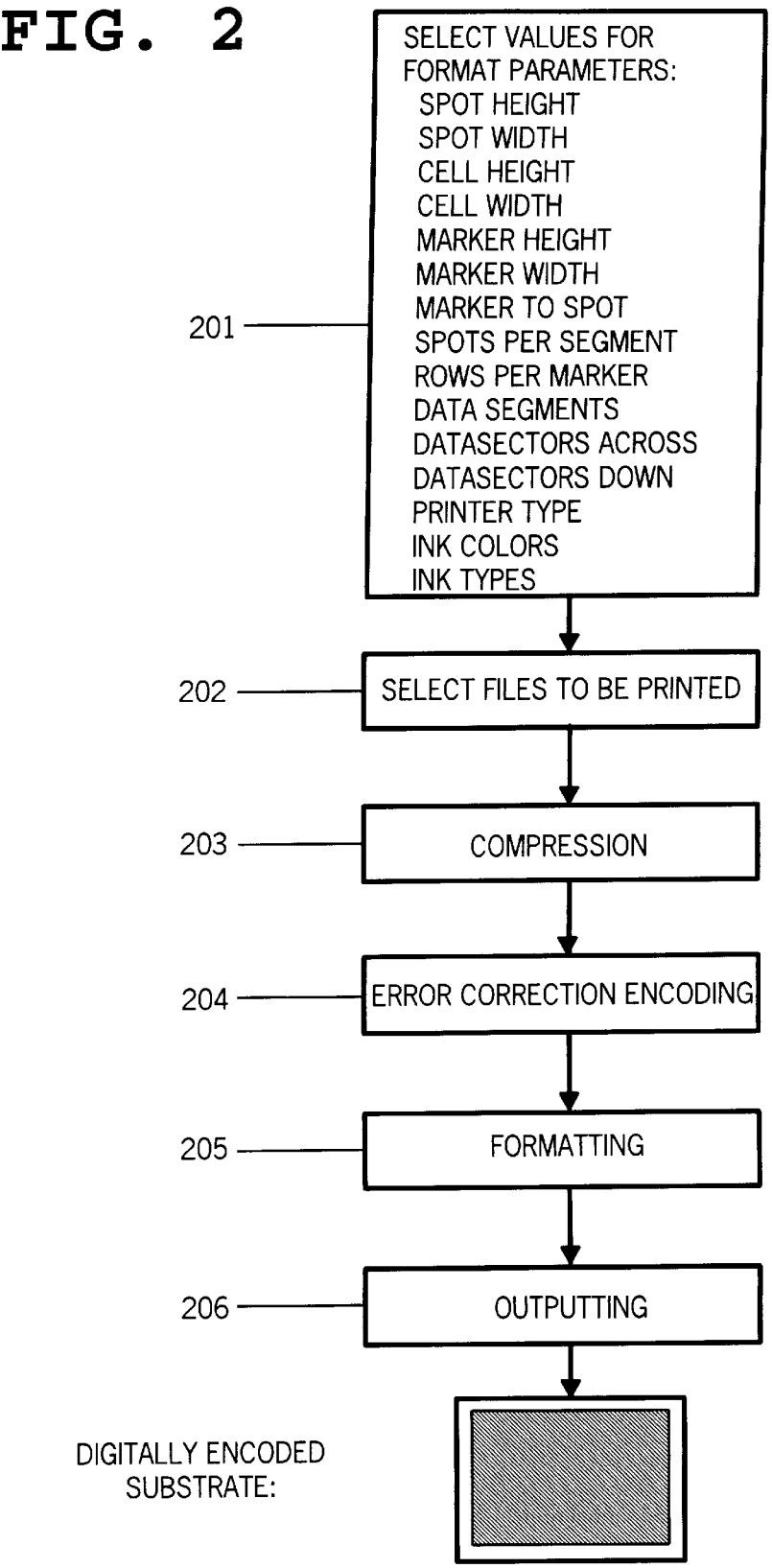
FIG. 2 is a block diagram describing the method of encoding digital data onto a substrate, according to the preferred embodiment.

FIG. 2 illustrates the method of encoding of the preferred embodiment of the invention. Selection step 201 requires selection of various format parameter values. The parameters include the height and width in printer pixels of each printed data spot, the height and width in printer pixels of each cell, the height and width in printer pixels of the markers, and Marker to Spot, the distance in printer pixels between markers and the data spots. Markers, the function of which is described more fully below as part of the decoding process, are guideposts contained in the preferred embodiment that allow for more precise determination of the center of rows and columns of data spots. The person encoding data may also vary the number of cells between markers. The Spots per Segment parameter establishes the number of cells (and thereby the maximum number of possible spots) located horizontally between columns of markers while Rows Per Marker establishes the number of cells located vertically between markers. Hence, the preferred embodiment allows the person encoding data complete flexibility in formatting spots, cells and markers.

The preferred embodiment contains further parameters, allowing flexibility in the formatting of datasectors and allowing the person encoding data to indicate the type of printer to be used. A datasector of the invention is a subdivision of a datatile and a datatile is an overall pattern of digital data complete with all components needed by the method of decoding. A datasector represents the smallest accumulation of data cells which, when decoded, can reconstruct a stream of digital data without errors, by employing error correction. That is, a stream of data of a certain length is first transformed into a sequence of codewords, with redundancy for error correction. The bits composing this sequence of codewords may, in principle, be distributed anywhere in a datasector, but they must all, by convention, be located somewhere within one datasector. The original stream can be reconstructed only after the entire datasector has been examined.

The person encoding data may establish the parameter Data Segments, a measure of the number of data segments located across each datasector. A data segment is a row of cells located between columns of markers with the number of cells in the row determined by the Spots per Segment parameter. Hence, the parameter Data Segments varies the number of columns of markers within a datasector. The person encoding data may also establish the number of Datasectors Across and the number of Datasectors Down the datatile. In the preferred embodiment, the person encoding data must explicitly override the Datasectors Down parameter, that value being otherwise calculated automatically.

The Printer Type parameter does not directly influence the formatting process in the preferred embodiment and, in that sense, may be considered something other than a format parameter. The Printer Type parameter allows the person encoding data to communicate information describing the printing process used to print the datatile. This information is preferably established automatically by reference to the printer currently selected in the computer's operating system, but may be overridden by the user.

The Ink Colors and Ink Types parameters are set in the preferred embodiment to black and normal, respectively, but may be varied in other embodiments using different colors or types of ink.

A cell represents a part of the area covered by a datatile. A cell should be understood as being a space that should contain no more than one spot and a cell should be understood as ordinarily being a space large enough to contain an entire spot. In the preferred embodiment, defining a cell size determines the size of the space that may contain no more than one spot, while defining a spot size determines the size of any spot in the cell. It should be understood that a cell of the preferred embodiment is a conceptual construct with no physical manifestation other than the space it occupies. The DEDS program applies the concepts of cell and spot by determining an array of pixels, with dimensions equal to the cell size, and determining within that array a subarray with dimensions equal to the spot size. If a spot is called for, the DEDS program prints dots (i.e., the placement of ink at a given printer pixel location) at each of the pixels within the subarray. The DEDS program does not print dots at any remaining pixels in the array representing the cell. Hence, a cell differs physically from a spot contained in the cell only by virtue of pixels that the printer skips over and only then if the cell has dimensions larger than the spot.

Thus, if a cell is defined with dimensions M pixels wide by N pixels high, and a spot is defined with dimensions X pixels wide by Y pixels high, X should ordinarily be smaller than, or equal to M and Y should ordinarily be smaller than, or equal to N. It should be understood that M, N, X, and Y are labels for numbers, where M is intended to express the width of a cell, N the height of a cell, X the width of a spot and Y the height of a spot. Of course, because they are labels, M, N, X, and Y could be replaced by any other labels, or the underlying dimensions could be expressed without labels, to accomplish the same effect.

If at least one of the dimensions X or Y is defined as being less than the corresponding dimensions M or N, the spot will be smaller than its corresponding cell. If the dimensions X and Y are defined with different values, the spot will not be square. If the dimensions M and N are defined with different values, the cell will not be square. These possibilities allow greater flexibility to accommodate particular printers and scanners.

In step 202 of the preferred embodiment the person encoding data would select the computer file or files to be printed as spots on paper. The computer files would preferably reside on the encoding computer's hard disk. In other embodiments, the digital data to encode would come from other sources, such sources being limited only by the requisite ability to produce digital data. For example, digital data can be a stream of data that comes from an on-line source, such as might exist on the Internet, and be directly formatted by the method of encoding without the intermediate step of saving data from that stream of data as a file on the computer of the person encoding data.

The digital data from step 202 then passes compression processing 203, if any. It should be noted that in the present invention, compression may or may not be performed. If compression is performed, various forms may be utilized, including both lossy and lossless compression techniques depending on whether the compressed data must be recreated in the exact form as the original. In the preferred embodiment, the invention will decode the printed pattern to produce an error free stream of data. This allows compression techniques to be employed that do not require reconstruction from somewhat corrupted data of as much of the original information as feasible. In the DEDS program, standard compression into ZIP files is employed. In some instances, the impact of compression, such as increased data density, is so minimal that compression is not warranted. A further embodiment allows a user to circumvent compression.

Once any desired compression of the digital data has taken place (processing block 203), error correction encoding (processing block 204) may be performed. Since the substrate is used (along with the target scanner) as a digital channel, the error correction of the present invention can be viewed as just another box with digital input and digital output. Error correction encoding comprises adding correction or "parity" bits to the digital information. The method of error correction encoding can be any one of many methods known to those skilled in communications theory. The technique of error correction employed in the preferred embodiment is a straightforward and standard technique that derives from the Hamming distance theorem in communication theory. In the preferred embodiment, the coding technique allows for the correction of at least two bit errors in any given codeword. The precise amount of redundancy is user or system selectable. It is useful to allow for the correction of at least two bit errors, since a given codeword might be subject to more than one bit error even if its bits are distributed throughout a datasector to reduce the effects of localized defects. If only one bit error could be corrected, even a single case of a codeword with two bit errors in the entirety of a printed pattern would effectively corrupt the entire pattern.

The preferred embodiment uses one method of error detection and correction (with user selectable degrees of redundancy) and one method of compression. In the DEDS program the degree of redundancy selected is information conveyed in the metasector. In other embodiments other methods are used. Some of these further embodiments allow the user to select the methods of error detection and correction and compression from a variety of possibilities. In one embodiment, for example, the user can choose, as a further format parameter, between lossy (e.g., MPEG) and lossless methods of compression. In one such embodiment, the user can choose, also a further format parameter, between various methods of error detection and correction, including one that requires perfect digital accuracy, one that allows up to a selected degree of errors, and one that requires perfect digital accuracy for some data but allows up to a selected degree of errors for other data. The methods of error detection and correction and compression of these further embodiments are widely known to those skilled in the art.

It should be understood that compression can occur before any of the steps in FIG. 2. If so desired, the user can choose to employ any available compression technique to convert one computer file or data stream into a compressed computer file. For example, a stream of audio from a microphone connected to a computer's sound card can be stored as an Adaptive Differential Pulse Code Modulation ("ADPCM") compressed file. This already compressed file can then be selected in step 202. In a further embodiment, the user can choose whether to skip step 203 which would employ a second compression process.

Note that there is an advantage to using information about the formatting parameters to set the parameters for error correction. The organization of codeword bits on the printed page can be optimized using this information to reduce certain common types of defects introduced in printing, faxing, and scanning. In the present embodiment, the bits are separated within a datasector. In this manner, error correction results where the plain paper starts with defects, sustains damage or the printing or scanning processes introduce defects. The DEDS program allows the user to vary the degree of error correction to reflect the quality of the target scanner or other circumstances encountered or anticipated by the user. For example, a hand held scanner would typically require greater error correction than a flatbed scanner of the same resolution.

Once the digital data has undergone compression processing 203, if any, and error correction processing 204, the digital data goes through formatting process 205. Formatting process 205 is done in accordance with all values selected for format parameters. Formatting process 205 of the preferred embodiment first creates a landmark—2 dark bars which facilitate determining the location and orientation of the datatile as discussed more fully below in regard to the method of decoding. Formatting process 205 then creates a metasector. The metasector indicates the format parameters used in the method of encoding. Formatting process 205 is then responsible for changing a digital bit sequence into a pattern which is readable by the printer and from which printed pixels can be produced such that the printed pattern can be accurately scanned. In the preferred embodiment, the formatting process produces a bitmap file which is then printed by any printer capable of printing bitmap files. The formatting process begins by exclusive-ORing the bit sequence with a known random sequence to create a relatively uniform appearance in the pattern on the printed page. The uniform appearance created can render a more aesthetically pleasing effect for the printed pattern, which can be important if the pattern is integrated with certain human readable material, such as an advertisement. The digital data is then formatted into black and white pixels, in which a "0" bit is stored as a blank or a white space and a "1" is stored as a black spot with the dimensions in printer pixels as previously specified.

In other embodiments, the digital data is formatted into different colors. Varying levels of gray scale is here regarded as one form of color formatting. In one such embodiment, gray scale formatting is accomplished through binary printing by printing a known number of pixels (i.e., the number of pixels needed to achieve a given level of gray scale) at arbitrary locations within the subarray of pixels that constitutes a spot.

In further embodiments, the digital data is formatted into differing levels of electric charge, as in the use of substrates capable of holding electrical charges, differing levels of magnetism, as in the use, for example, of magnetic inks, and differing levels of non-visible (e.g., infrared) reflectivity, as in the use of inks with non-visible light qualities, it being understood that the invention is not limited to these particular types of formatting or materials.

Data formatted through step 205 is output onto a substrate, step 206. In a preferred embodiment, the step of outputting, step 206, includes communicating the formatted image from a personal computer to an off-the-shelf laser printer, preferably a laser printer with a high resolution. In other embodiments, the printer is an inkjet, dot-matrix, or LED printer, or any other printer capable of accepting graphic input from a computer. Further embodiments involve outputting digital data on substrates through means other than just communicating data from a personal computer to a connected printer. In one embodiment, a digitally encoded substrate produced, for example, by a laser printer connected to a personal computer, is photocopied through commercially available photocopiers. In a further embodiment, a digitally encoded substrate is printed in colors, such as light blue, by offset or other printing processes, which such colors can be scanned by a color scanner but not effectively photocopied with most photocopiers, thus preventing improper photocopying. In a further embodiment, printing presses produce the digitally encoded substrates, either directly from the formatted image or indirectly by copying a digitally encoded substrate. In a yet further embodiment, a rubber stamp or other solid material, produced in the likeness of a datatile, is used to place ink or other substance on paper.

The paper used for printing can be any paper capable of accepting and holding the placement of ink including, for example, postcards, business reply cards, business cards, newsprint, magazine paper, self-adhesive paper notes, labels, forms, envelopes, cardboard, and checks. In the case of business cards, the digital information could include a database or additions to a database consisting of a person's name, telephone number, address, e-mail address, picture, audio file (e.g., a sound clip of the person speaking his or her name) and other pertinent information together with computer instructions that initiate a telephone call to the included telephone number.

In still further embodiments, the outputting of digital data on a substrate involves processes other than printing ink on paper and outputting step 206 should be understood to include any means for outputting digital data onto a substrate. In one embodiment, the outputting involves placing the encoded digital data on paper by changing the characteristics of the paper such as occurs when a facsimile machine prints using thermal fax paper or when the paper is burned (through the use of lasers or otherwise) or when holes are produced in the paper. In one embodiment, reflective substances are placed on such non-paper substrates as cloth (e.g., shirts, towels, bags), ceramics (e.g., mugs, glasses, and plates), and buttons. In one embodiment, the outputting of digital data occurs through photographic processes that place the digital data on a photographic print or slide. In another embodiment, the outputting occurs by producing plastic objects (e.g., plastic labels, and cards) containing a datatile. In a further embodiment, the outputting occurs by selectively magnetizing a substrate capable of retaining such a charge. In a still further embodiment, the outputting occurs through processes that act upon a substrate of biological agents capable of being differentiated in discrete locations in at least two separate states. For example, the hide or skin of animals (or their internal organs) and the surface of plant matter can be marked, such as with tattoos or branding, with datatiles. In a yet further embodiment, the outputting occurs not through the placement of substances on a substrate but by the removal of substances from a substrate as occurs through, for example, etching of metals, plastics or other materials, or the creation of pits in a compact disk. It should be understood that printing step 206 is not limited to the embodiments described above, but could include any means of outputting digital data on a substrate of any type capable of being differentiated in at least two different states in each of a plurality of locations on such substrate.

Figure 3:
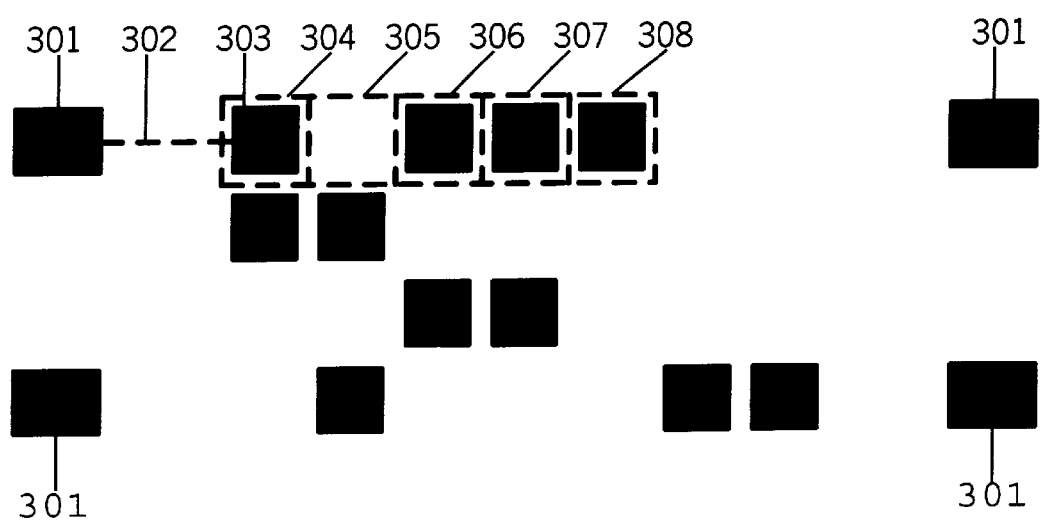
FIG. 3 is an enlarged portion of a digitally encoded substrate illustrating how the method of encoding converts a series of digital data values into a pattern.

FIG. 3 is an enlarged view of a portion of a digitally encoded substrate. FIG. 3 illustrates how the method of encoding takes a series of digital data values (i.e., bit values) and, using those format parameters applicable to spots, cells, markers, and rows, produces a pattern. The format parameter values used for producing the digitally encoded substrate of FIG. 3 are: Spot Height=3, Spot Width=3, Cell Height=4, Cell Width=4, Marker Height=3, Marker Width=4, Marker to Spot=6, Spots per Segment=7, and Rows per Marker=3. The series of bit values for the first row of cells are: 1, 0, 1, 1, 1, 0, and 0.

FIG. 3 reflects the bit values and format parameters selected, as illustrated in markers 301, distance from the first marker to the first spot 302, spot 303, and cells 304, 305, 306, 307, and 308. Each of the markers 301 is 4 pixels wide by 3 pixels high, consistent with a Marker Width value of 4 and a Marker Height value of 3. Consistent with a Rows per Marker value of 3, there are three rows of cells for each marker, the first row being immediately to the right of the first marker. Distance from the first marker to the first spot 302 is 6 pixels, consistent with a Marker to Spot value of 6. Each spot, such as spot 303, is 3 pixels high by 3 pixels wide, consistent with a Spot Height value of 3 and a Spot Width value of 3. Each cell, such as cell 304, is 4 pixels high by 4 pixels wide, consistent with a Cell Height value of 4 and a Cell Width value of 4. The embodiment of the method of encoding utilized to produce the digitally encoded substrate of FIG. 3 reflects each bit in the series of bit values by expressing one bit in each cell through two different logical states, where one state is represented by the presence of a spot and the other logical state is represented by the absence of a spot from the cell. In this instance, a spot represents a 1 and a blank cell represents a 0. Accordingly, cells 304, 305, 306, 307, and 308 are spotted, blank, spotted, spotted, spotted, blank and blank, reflecting the series of bit values 1, 0, 1, 1, 1, 0, and 0. Similarly, the second row reflects the series of bit values 1, 1, 0, 0, 0, 0, and 0, the third row reflects the series of bit values 0, 0, 1, 1, 0, 0, and 0, and the fourth row reflects the series of bit values 0, 1, 0, 0, 0, 1, and 1.

In the preferred embodiment of the method of encoding, a marker consists of a dark rectangular array of pixels. Series of markers are located in columns, with a number of white pixels vertically separating one marker from the next marker down the column, such number of pixels being a function of the values for format parameters Cell Height, Rows per Marker and Marker Height. Similarly, each marker is horizontally separated from the nearest possible spots by a number of white pixels, such number being determined by the value for the format parameter Marker to Spot. FIG. 3 illustrates markers according to this preferred embodiment.

It is well recognized in the area of the invention that it is important to have a "clocking" mechanism to allow a precise mapping from image pixel locations to printed pattern locations. The present invention allows the clocking mechanism, which always demands some overhead in terms of space, to be configured so that it can maximize the density of information on the printed substrate. The clocking mechanism assumes the most compact form that allows it to represent spatial information: periodic dark interrupting white, or periodic white interrupting dark. The area occupied by this mechanism is fully configurable: both the frequency with which it occurs, and the size of each occurrence can be fully modified. Moreover, the clocking mechanism "wraps around" so that the clocking region provides spatial information for data cells on both sides.

It is important that the amount of clocking apparatus on the substrate be configurable. If there is too much, then density is lost due to the space occupied by the clocking mechanism itself. If there is not enough, then spatial inaccuracies creep in, and this brings about either erratic behavior, or loss in density if the spots must be made larger to accommodate the inaccuracies. Somewhere between there is an optimum amount of clocking, and this amount may vary considerably from one combination of printer/scanner to another.

The clocking is performed by markers, currently implemented as dark rectangles on a white vertical column. These markers capture both horizontal and vertical location. The horizontal information is carried essentially by counting the number of marker columns over, and multiplying that count by a determinable horizontal displacement between columns; the vertical information is carried by counting the number of markers down, and multiplying that count by a determinable vertical displacement between markers.

In principle the markers could be arranged in strips that run horizontally across the direction of the scan. Yet the distortions in a scanned image are almost always in the vertical dimension, since this is governed by mechanical factors of paper moving down a document feeder, or of a scan head moving down. It is more important therefore to keep track of the variations along the vertical dimension, which vertical strips of markers more effectively do. (Of course it would be also possible in the current invention to have both horizontal and vertical strips, if significant distortions were introduced in both directions.)

Rather than have the markers the same size and periodicity as the spots—which a number of technologies do—it is far better to make their size and periodicity independent, since the role they play is quite different.

The principle that must guide the dimensions and periodicity of the markers is that they must be laid down by the printing process so that they rarely are absent, are clearly identifiable in the scan, and have absolutely reliable physical location. This is a general constraint on any clocking mechanism in any technology that encodes digital information on a substrate and decodes it by means of a scan. When the amount of overhead that the clocking mechanism incurs is decreased, by decreasing the clocking features in size and/or frequency, the amount of data that can be affected by each imperfection (or aggregation of imperfections) in the printing or scanning of the clocking features increases. It is important therefore to be able to configure the clocking mechanism so as to minimize defects in the printing or scanning of the clocking features. The optimal configuration depends on the imperfections peculiar to the particular printer and scanner.

Considerable imperfection can be tolerated in data spots, since any individual defect can compensated for by error correction. Yet a single spatial inaccuracy arising from a marker can affect any number of rows of spots—which may in turn comprehend perhaps hundreds of spots, thereby corrupting large quantities of data. In general, these constraints imply that markers should be larger than spots, and better separated from other features, including both spots and each other. The absence of this capability in other technologies limits their ability to achieve highest densities and reliability.

The concept of "wrap around" in the current invention also plays a key role. It means that the same set of guideposts that provides spatial information about a grouping of data cells on one side also provides it for a grouping on the other. Alternative technologies which divide data into separated blocks demand not only a new, effectively redundant, set of guideposts for the nearby side of the neighboring block, but also a separation of white space (and perhaps other paraphernalia—e.g., a thick bar), between the blocks so that the location of each block itself can be determined. The unnecessary overhead all of this introduces can severely reduce the density of information on the substrate.

Figure 4:
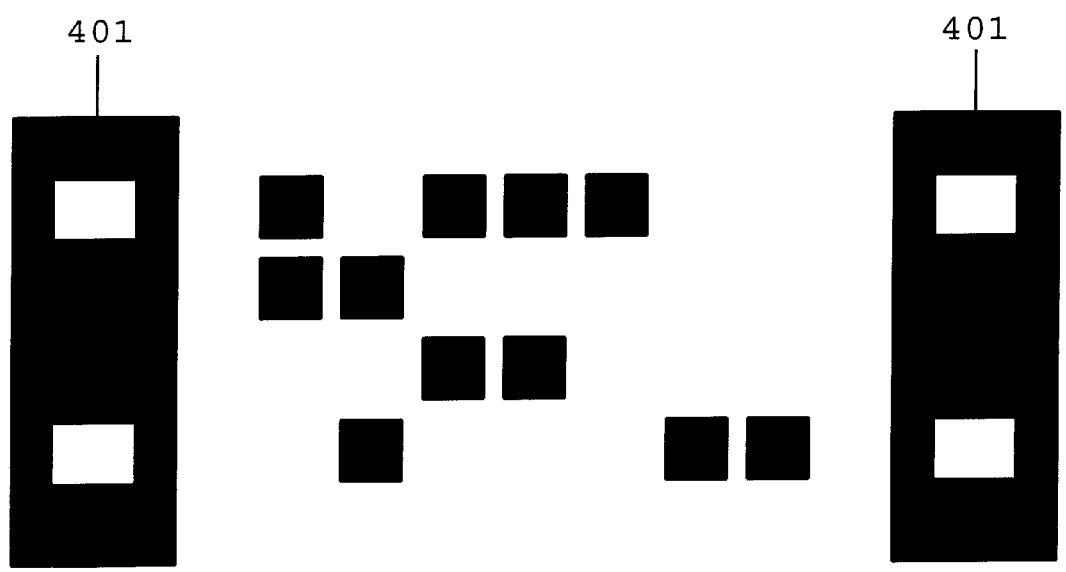
FIG. 4 is an enlarged portion of a digitally encoded substrate illustrating an embodiment of the method of encoding where markers are light areas inside dark bars.

Other embodiments utilize markers other than rectangular arrays of dark spots set in a light background. In one such embodiment, the markers consist of a grouping of dark pixels in nonrectangular shapes such as circles, ellipses or triangles. In a further embodiment, markers consist of groupings of light pixels against a dark background. FIG. 4 illustrates this further embodiment. FIG. 4 contains an enlarged view of a portion of a datatile that is identical to that illustrated in FIG. 4 except for the markers. Each column of markers 401 consists of a dark bar that preferably extends the entire length of the column of markers 401 plus a few pixels on top and bottom. The number of additional pixels on top and bottom would preferably be between one and two times the value for the format parameter Marker Height. The bar would have a width that can preferably be varied by the person encoding data so that the user can optimize the width for the particular printers and scanners anticipated or such other circumstances the user might encounter. Thus, this embodiment would preferably have a further format parameter, Marker Bar Width. Similar to the datatile in FIG. 3, the horizontal distance from each marker to the nearest edges of possible spots is 6 pixels (i.e., the value for Marker to Spot equals 6). The dark bar for each column of markers 401 is 8 pixels wide, consistent with a value of 8 for Marker Bar Width. Thus, the distance from the dark bar to the nearest edges of possible spots is 4 pixels. Within each dark bar are the markers themselves—arrays of white pixels that are 4 pixels wide and 3 pixels high.

It is important for the technology to come to terms with the basic fact that the defined dimensions of a spot may be very different from the actual dimensions of the spot produced on a substrate by a printer. The precision of defined dimensions of a spot usually well exceeds the true precision of a printer. When pushed close to their theoretical resolution, printers rarely can produce on a substrate a dark region filled in exactly to the bounds defined, and typically exceed and/or fall short of these bounds. One effect of this is that the notion of "shape" of a spot largely breaks down. For example, at these resolutions, the defined squareness (or rectangularity) of a spot is in great measure lost, and the spot becomes effectively a roughly circular (or oval) "blob." It is likewise true that scanners when pushed close to their resolutions cannot distinguish the shapes of even perfectly printed shapes on the substrate, and effectively reduce all small shapes to "blobs" which vary only in darkness and, to a degree, size. From the standpoint of ability to encode data, the real issue becomes: in a given space, how many such "blobs" can be separately printed so that they can be distinguished by a scanner? For this reason, even if the defined shapes of these microscopic entities on the printed page differ from one case to another, it is, for the purposes of the technology, effectively the same representation.

In the preferred embodiment, cells and spots are rectangular or essentially rectangular with the cells placed in horizontal rows and vertical columns in the datatile. In another embodiment, cells are formatted as diagonal spaces and series of cells are formatted diagonally into the datatile. In one embodiment spots are likewise formatted as nonrectangular spots. Formatting spots as nonrectangular shapes may be particularly advantageous where placing dots in all pixels of a rectangular spot results in too much ink spreading beyond the spot's theoretical limits (i.e., dot gain) while placing dots at less than all pixels (as might be accomplished with a nonrectangular spot shape) reduces the encroachment over a rectangular spot's borders while still giving good definition within the borders.

Figure 5:
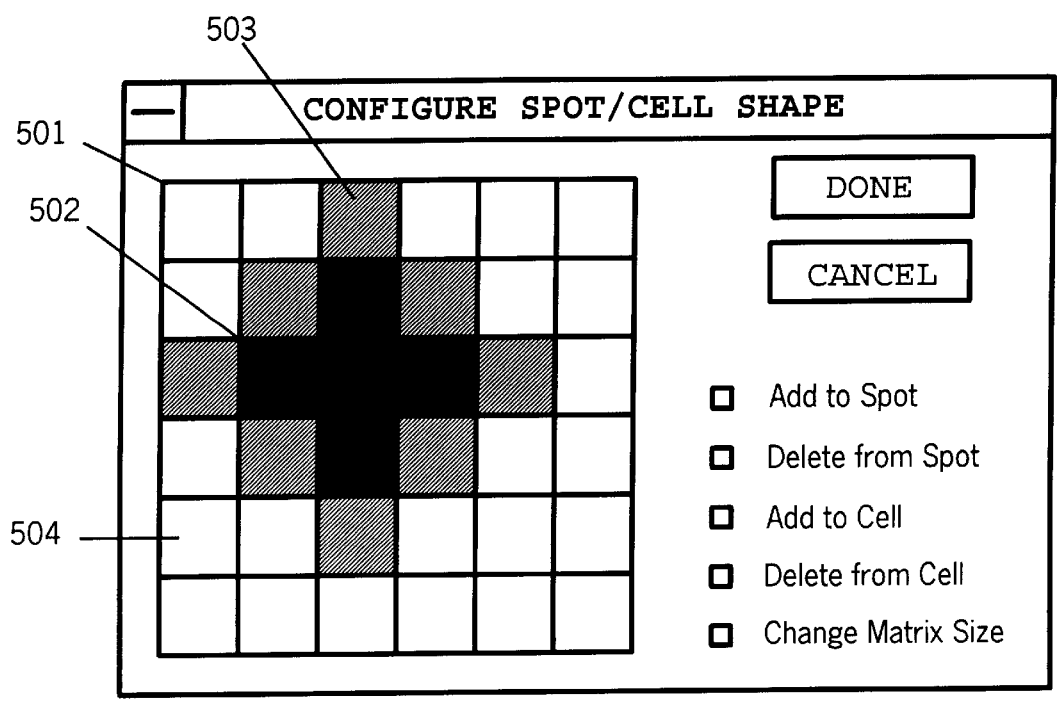
FIG. 5 is a dialog box for establishing shapes for spots and cells.
Figure 6:
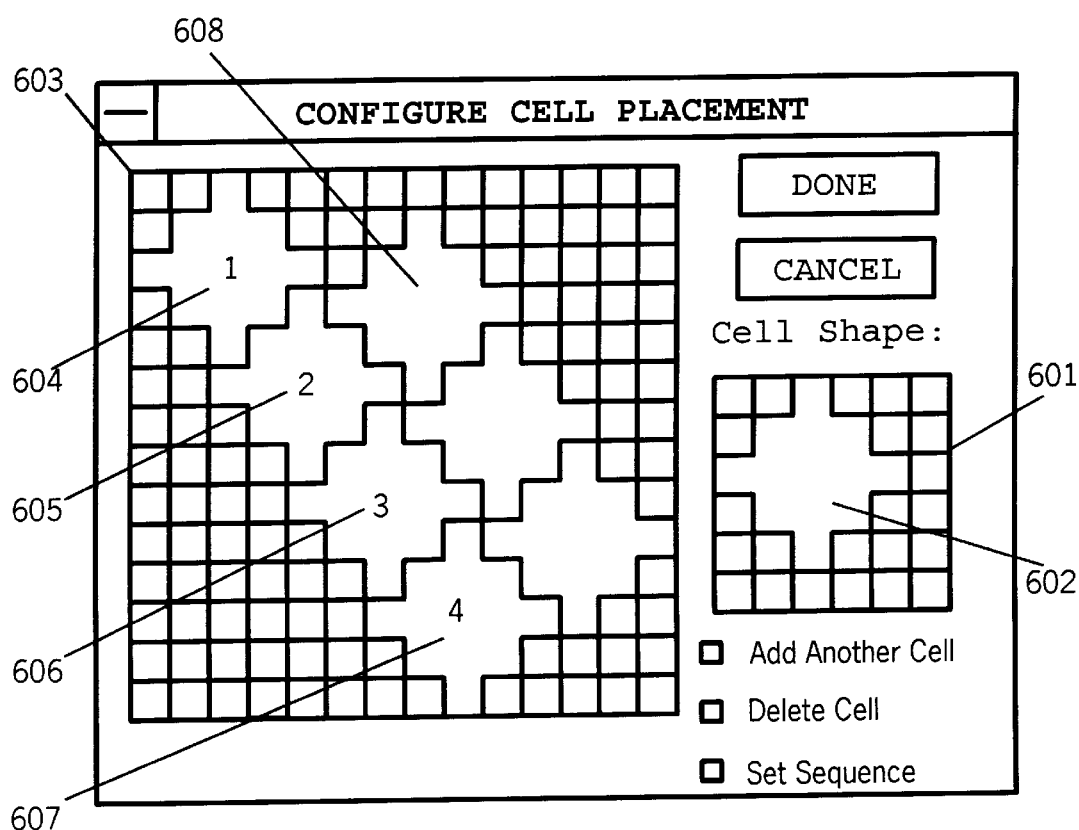
FIG. 6 is a dialog box for determining how cell shapes fit together and the sequence in which cells are created and each bit in the series of digital data values encoded.

In one embodiment, nonrectangular cells and spots are chosen through a dialog box that includes an array of squares, each square representing a pixel. The person encoding data selects those squares in the array that represent a cell and within those squares, the squares that represent a spot. Each of a plurality or all of the cells and spots in a datatile would have the shapes selected. FIG. 5 and FIG. 6 illustrate dialog boxes according to this embodiment. FIG. 5 illustrates a dialog box for establishing the shapes for a spot and a cell. FIG. 6 illustrates a dialog box for determining how nonrectangular cell shapes fit together, and the sequence in which those cells are created and each bit in the series of digital data values is encoded.

In FIG. 5, the user has 7 options, 5 represented by radio buttons and 2 by icons. Matrix 501 represents the printer pixels available for formatting spots and cells, where each square in the matrix represents one printer pixel. The user selects Add to Spot. When this button is selected, the user moves the mouse cursor over desired squares in matrix 501 and clicks those squares. In FIG. 5, squares that have been selected as part of the spot are black. Pixel 502 illustrates a square that is part of the spot. If the user desires to revise pixels selected for the spot, the user selects Delete from Spot, moving the mouse cursor over previously selected squares and clicks, thereby removing those pixels from the spot (in an alternative dialog box, there is no separate Delete from Spot and Delete from Cell radio buttons—clearing previous selections is instead performed done by clicking a second time on previously selected squares). The user also selects Add to Cell. When this button is selected, the user moves the mouse cursor over desired squares in matrix 501 and clicks those squares. In FIG. 5, squares that have been selected as part of the cell are those that either hatched or selected as part of a spot. Pixel 503 illustrates a square selected to be part of the cell but not part of the spot. All squares not selected as part of either the spot or the cell remain blank. Square 504 illustrates a square that is neither part of the spot nor the cell. The user selects Change Matrix Size if the user desires to either increase or decrease the array of printer pixels available for selection as part of the spot and cell. When the user completes the selection of spot and cell shapes, the user selects DONE or, if the user wishes to abort the selection process, the user selects CANCEL.

In FIG. 6, the user has 3 options in addition to DONE and CANCEL (DONE and CANCEL have functions comparable to the similarly named icons in FIG. 5). Matrix 601 depicts the cell shape chosen in the CONFIGURE SPOT/CELL SHAPE dialog box illustrated in FIG. 5. The CONFIGURE CELL PLACEMENT dialog box preferably pops up following completion of selection in the CONFIGURE SPOT/CELL SHAPE dialog box. The cell previously selected is illustrated as area 602—i.e., the area not composed of squares. Matrix 603 represents the printer pixels available for placing cells, where each square represents one printer pixel. The user selects Add Another Square, moves the mouse cursor over area 602 representing the cell shape, and leaving the mouse button clicked, moves (i.e., drags) an image of the cell shape to the desired location in matrix 603. Inappropriate selections are ignored by the computer in the dialog box, including selections that effectively change the shape of cells by leaving unfilled squares in gaps between cells of the chosen shape. The user selects Delete Cell to revise a previous selection (in an alternative dialog box the Delete Cell radio button does not exist and instead, the user clicks a second time on a previously placed cell).

The user then selects Set Sequence, and moves the mouse cursor over cell shapes in matrix 603 in the order desired, clicking on each cell shape as the cursor moves. The sequence is indicated in the dialog box by the numerals in the cell shapes. The sequence selected determines the order in which bits from the series of digital data values are encoded in the cell, proceeding in the order selected to the border of the datasector then moving to the next line in the datasector. In matrix 603, the order selected is a line of cells extending from upper left to lower right. Cell shape 604 was selected as the first in the series followed by cell shapes 605, 606, and 607. The method of encoding would encode cells in this sequence starting at the left border of the datasector moving down and to the right to the other border of the datasector. Once the lower border has been reached, the sequence goes back to the first cell of the next line, depicted in matrix 603 as cell shape 608. This embodiment preferably determines a sequence of cells by default if none is selected by the user. One such default sequence would generally follow the sequence of the preferred embodiment—i.e., generally from left to right.

Figure 7:
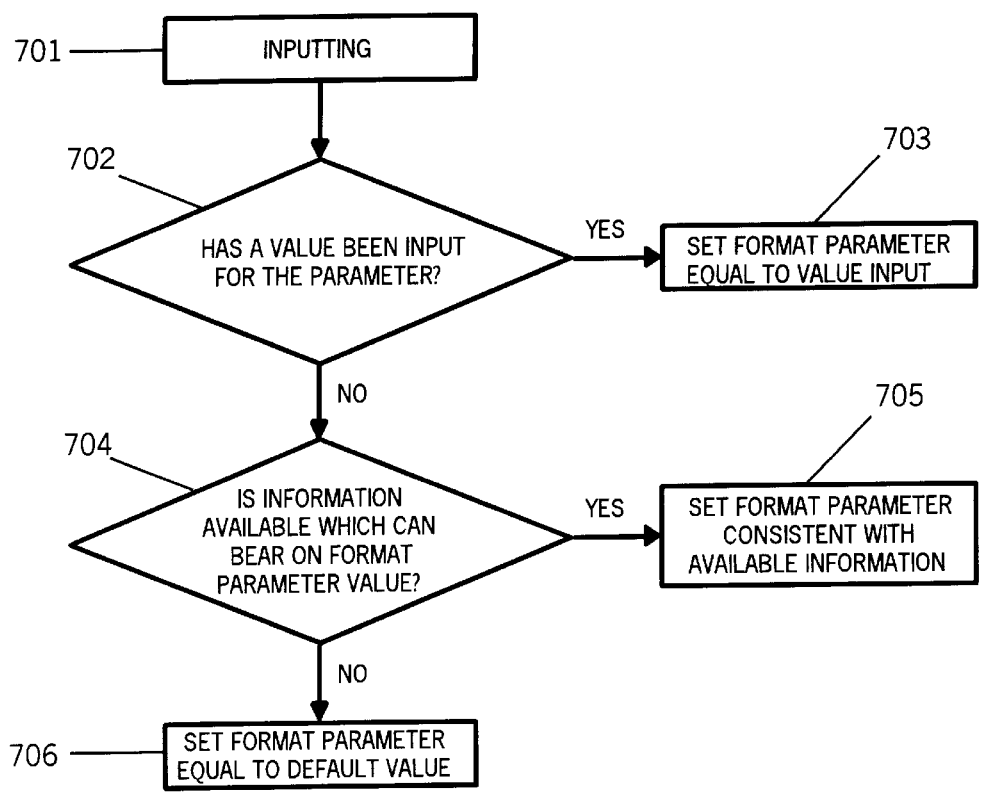
FIG. 7 is a block diagram describing one implementation of the process for selecting format parameters.

In the preferred embodiment the format parameters are selected through a combination of input, automatic selection and default values. FIG. 7 describes this selection process as applied to each format parameter. The step of inputting, 701, can encompass a user inputting a value for a format parameter. Inputting is performed using a keyboard, mouse, or other input device, to select values in a dialog box. After allowing adequate time for inputting but before the method of encoding commences formatting, the selection process determines whether a value has in fact been input, step 702.

If a value has been input, the selection process sets the format parameter equal to that value, step 703.

If a value has not been input, the selection process then determines whether information otherwise available bears on the selection of a format parameter value, step 704. For example, if the encoding process is being performed by a computer, the computer's operating system may have stored information in the printer driver concerning the default printer used by the computer. This information could include the printer's make, model, and resolution. Printer resolution can be particularly useful in automatic selection of format parameter values. Another source of information can be information input by the user other than values for the format parameters themselves. For example, the user can input information concerning the types and resolutions of printer and intended scanners for a given datatile. While this information does not directly establish format parameter values (other than the Printer Type parameter which preferably does not directly influence the formatting process), the information clearly bears on the selection of these values. The correct setting for these parameters can be established by experimentation with desired printers and scanners. The results of these experiments are then captured in lookup tables for the parameters that are stored in the software. In the source code, the lookup tables for the preferred embodiment can be found in the setdefs.c file.

If information is available, from whatever source, that bears on the selection of a format parameter value, then the selection process establishes the value consistent with that information, step 705. Otherwise, the selection process sets the format parameter equal to a predefined default value, step 706. The preferred default values are intended to be reliable no matter what printer or scanner is used.

While the selection process of the preferred embodiment provides for user input as at least one manner of selecting format parameters, other embodiments have other ways of selecting format parameters with no user input. One such embodiment selects format parameter values as part of the process of developing computer code for the instructions to be executed by a computer and attached printer. In accordance with this embodiment, format parameter values are selected for a particular printer or set of printers, where the values are preferably optimized for the particular printer or printers. It is therefore possible to include the selected format parameter values as part of printer drivers—i.e., the set of computer instructions directing a particular printer to print and the manner in which to print. In other embodiments, format parameter values are varied without user input by reference to information available without user input. In one such embodiment, the format parameter values are selected by reference to information known about attached printers, possible scanners, or a combination of such factors.

Figure 8:
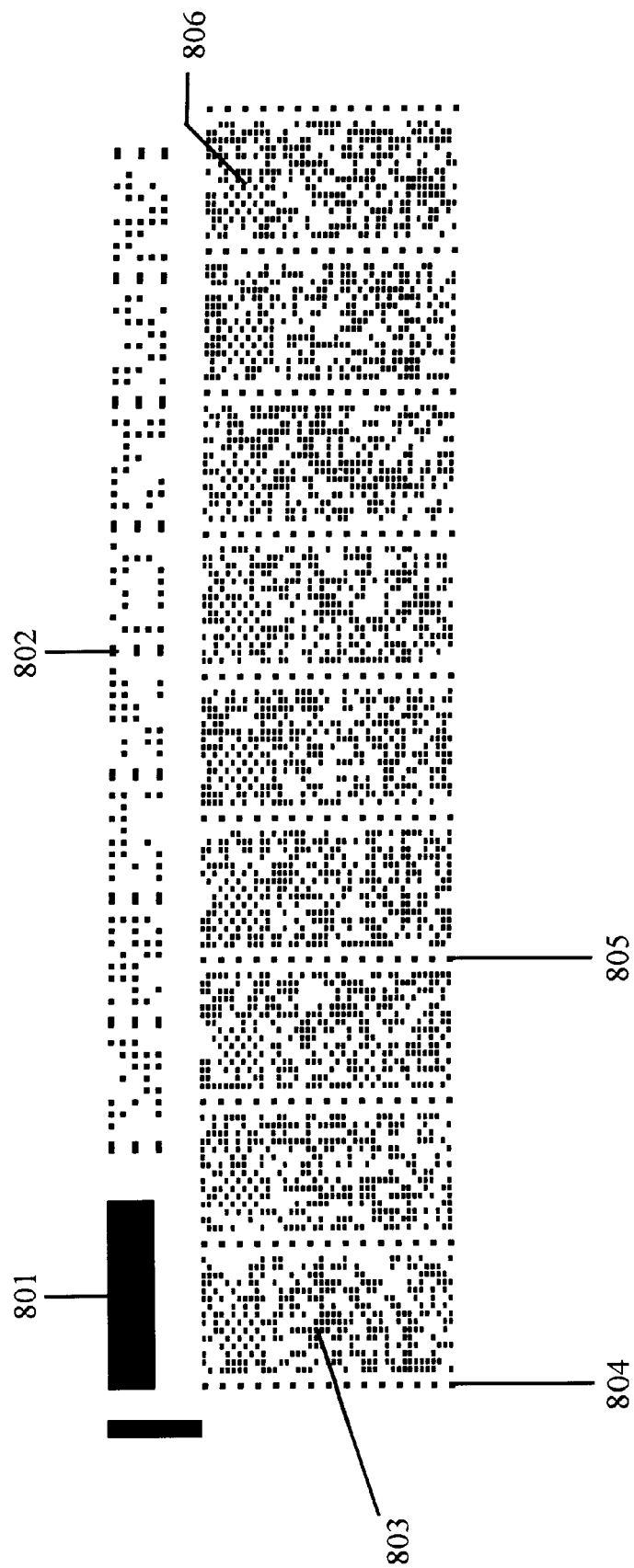
FIG. 8 is an enlarged digitally encoded substrate produced by the method of encoding, where the substrate, in this instance, is paper encoded with the placement of ink.

FIG. 8 illustrates a digitally encoded substrate as produced by a preferred embodiment of the method of encoding. More particularly, the digitally encoded substrate illustrated in FIG. 8 consists of one datatile. It should be understood that the preferred embodiment produces one or a plurality of datatiles depending on the amount of digital data, the density of data produced by the formatting process, the size of the substrate and user preferences for datatile size and quantity. The datatile in FIG. 8, enlarged for illustration purposes, consists of three main components, a landmark 801, a metasector 802, and a main body of data 803.

In this embodiment, landmark 801 consists of two bars—i.e., two rectangular regions composed entirely of pixels in the same state. The landmark 801 consists of two bars that are entirely black. One such rectangle is elongated vertically while the other is elongated horizontally. The basic purpose of these landmarks, as further described in the decoding process below, is twofold.

First, the landmark provides information about the orientation of the pattern within the image, and in particular the orientation of the metasector. The metasector and the horizontal bar of the landmark are both much longer than they are high. Furthermore, they are both designed to be printed at the same orientation—i.e., the horizontal aspects of each should be printed perfectly horizontal. The skew of the landmark in the scanned image therefore gives a very good approximation of the skew of the metasector.

Second, the landmark provides information about the scale of the pattern within the image, and the scale of the metasector in particular. In the DEDS program, the dimensions of the vertical bar and horizontal bar are standardized based on the sizes they assume when printed on a 300 dpi laser and configured for a 400 dpi scanner—i.e., these settings are treated by the DEDS program to be the "base" case. In particular, the vertical bar is printed with width of 6 printed pixels, and height of 32 printed pixels. The horizontal bar is printed with length of 64 pixels, and height of 16 pixels. These relative proportions are observed no matter what the resolution of a printer and scanner might be. If the pattern is to be scanned in by a 300 dpi scanner, and printed on a 300 dpi laser, then the number of pixels is half again as much in each dimension (i.e., vertical bar 9 pixels wide by 48 pixels high, horizontal bar 96 pixels wide by 24 pixels high). And a 600 dpi laser will precisely double the number of pixels in each dimension for the two cases—i.e., for a 300 dpi scanner the vertical bar is printed at 18 pixels wide by 96 pixels high and the horizontal bar is printed at 192 pixels wide by 48 pixels high, while for a 400 dpi scanner the vertical bar is printed at 12 pixels wide by 64 pixels high and the horizontal bar is printed at 128 pixels wide by 32 pixels high. The vertical bar in landmark 401 has dimensions 9 pixels wide by 48 pixels high, while the horizontal bar has dimensions 96 pixels wide by 24 pixels high. The scale can generally vary widely depending on the resolution of the printer and the scanner.

In the DEDS program, the landmark is in precise scale to the metasector, which also has a rigid format. The width of the horizontal bar is precisely 16 times the width and 32 times the height of a marker in the metasector. Likewise, the dimensions in printer pixels of the metasector itself will be a multiple of the "base" case printer pixels. Thus, the metasector's markers, spots, and distances will, for example, precisely double if printed on a 600 dpi printer instead of a 300 dpi printer. The multiple used is encoded within the metasector. This allows a precise understanding of the ratio of printed pixels to image pixels. This understanding enables the algorithm to decode the data portion of the pattern, since distances and dimensions of markers and spots are defined in the metasector in terms of printed pixels.

In other embodiments, the method of encoding produces digitally encoded substrates with landmarks other than two bars consisting of pixels of the same state. Potential shapes for landmarks should be distinctive so that they are not easily confused with other possible features in the scanned image. They should also bear a predictable orientation with respect to the metasector, as well as a predictable scale (or limited set of scales.)

In still further embodiments, the method of encoding produces digitally encoded substrates with no landmarks. In general, the landmarks perform a function that can be achieved through further computational steps. Such a process locates the left side of the printed pattern by examining the image for horizontal sequences of white pixels followed to the right by dark pixels, and reconstructing the vertical left side for the pattern by assembling into a straight line the points at which the dark pixels first occur. At the top of the left side of the pattern lies the metasector, and an algorithm locates the predictable number of vertical markers in the metasector (typically three) that occurs at the extreme left side. From the size and relative location of these markers, the orientation of the metasector as well as its scale can be well approximated. The known pattern (or one of a series of known patterns) for the metasector markers virtually precludes mistaking some other graphical image as a metasector, thus allowing both a datatile and human readable graphics and text on the same page.

Metasector 802 of the present embodiment consists of two basic elements, metasector markers and metasector data cells. These two basic elements are differentiated in the present embodiment by relative size and placement. Each metasector marker of metasector 802 is 3 pixels high by 6 pixels wide. These metasector markers are placed in groups of three, stacked vertically and separated from each other by 9 blank pixels. Metasector 802 contains 9 groups of three metasector markers, including one group at the leftmost region of metasector 802 and one group at the rightmost region of metasector 802. Each metasector data cell of metasector 802 is 6 pixels high by 6 pixels wide. These cells are grouped together between the groups of metasector markers, with any spots in the cells closest to the metasector markers being 6 pixels horizontally removed from the metasector markers. The groups of metasector cells are 8 cells wide by 5 cells high. Each cell within a group may contain a spot that is black or may be blank (white) depending on the bit value being encoded within that cell. Each black spot in a metasector cell, where called for, is 3 pixels wide by 3 pixels high.

The data cell that may contain a spot is most perspicuously to be understood as locating such a spot precisely in its center. That is, if a spot is 3 pixels by 3 pixels, and its containing cell is 6 pixels by 6 pixels, then the border of that cell should be understood as extending 1.5 pixels above, below, to the right of, and to the left of the spot. Understanding the notion of a cell in this way allows all cells to be treated equally and symmetrically—in particular, the cells at the extreme right and extreme left of a contiguous aggregation of cells are equally distant from the markers at the border of the aggregation. While the notion that a spot is located precisely at the corresponding cell's center facilitates understanding of the construct of a cell, it should be further understood that the spot could be located anywhere in the array of pixels that defines a cell and achieve the same effect.

The importance of a notion of a cell from the point of view of understanding the invention is that a cell captures the separation of a potential spot from the neighboring potential spots. This separation is important to the invention, because, one, printed spots typically extend beyond their defined boundaries, and, two, when a dark spot is scanned, the darkness typically extends (beyond its physical bounds) into neighboring image pixels. These two phenomena demand that spots be defined with separation from each other if they are to be most effectively determined to be "on" or "off." Taking advantage of this can greatly increase the density of information on the page.

The main body of data 803 of the present embodiment consists of two basic elements, markers and data cells. These two basic elements are differentiated in the present embodiment by relative size and placement. Each marker is 3 pixels by 3 pixels, these dimensions having been determined by setting the parameters Marker Height and Marker Width each equal to 3. The markers are arranged in columns, with each column being one marker wide and as high as the main body of data 803. The beginning of each marker within a column is separated vertically from the beginning of the next marker by 9 pixels, this distance being determined by (and is a product of) setting the parameter Cell Height equal to 3 and the parameter Rows per Marker equal to 3. The main body of data 803 contains 10 columns of markers and 9 groupings of data cells between those columns of markers. The 9 groupings of data cells across results from (and is a product of) setting the parameter Datasectors Across equal to 3 and the parameter Data Segments equal to 3. The first three groupings for instance, located between columns of markers 804 and 805, constitutes the first datasector (note Datasectors Down equals 1). Each grouping of data cells is 15 cells wide and extends the height of the main body of data 803. The number of cells across each grouping is 15 as a result of setting the parameter Spots per Segment equal to 15. Each grouping contains, in addition to data cells, a calibration pattern such as calibration pattern 806. A calibration pattern contains spotted and blank cells arranged in a checkerboard pattern. The calibration patterns facilitate the decoding process by providing information on the darkness of the scanned image. The manner in which the calibration pattern facilitates the decoding process is further disclosed in the source code for the DEDS program. Each data cell is 4 pixels wide by 3 pixels high, these dimensions having been determined by setting the parameter Cell Width equal to 4 and the parameter Cell Height equal to 3. Each data cell of the main body of data 803 contains either a black spot or is blank (white), depending on the bit value being encoded within that cell. Each black spot is 3 pixels wide by 2 pixels high, these dimensions having been determined by setting the parameter Spot Width equal to 3 and the parameter Spot Height equal to 2. The column of markers is horizontally separated from the closest possible spots in the data cells by 5 pixels, this distance having been determined by setting the parameter Market to Spot equal to 5. The height of the main body of data 803 is a function of the amount of data to encode, the parameter Datasectors Down, and the width of the main body of data 803, such width having been determined as indicated above.

In a further embodiment of the method of encoding, information recorded on a substrate includes digital data as well as other information such as human readable text and graphics. FIG. 9 illustrates an example of a substrate according to this embodiment. The substrate in FIG. 9 includes human readable text, graphics (i.e., a drawing of a cat's face), and a datatile containing digital data relevant to the human readable information (the datatile in FIG. 9 illustrates an embodiment that does not include a landmark). The substrate illustrated in FIG. 9 thus conveys how a further embodiment of the invention can be used for such purposes as advertising, thus providing further evidence of the invention's value. The invention's unique advantages (relative to other known technologies), including the ability to store far greater amounts of data in a limited space, the ability to determine locations of data through use of metasectors, and the ability to determine cell locations by utilizing formattable series of markers, make the embodiment of FIG. 9 commercially practical for the first time. In other embodiments, involving photographic materials and processes, encoded digital data is placed inside, alongside or on the back of images captured from normal photographic processes. In further embodiments involving digital photography, encoded digital data is placed inside, alongside or in back of printouts of the digitally captured and recorded image, or inside, alongside or in back of printouts of scanned and digitized images captured from normal photographic processes.

A further embodiment of the invention serves as a substitute for optical character recognition ("OCR"). The datatile in FIG. 9 could, for example, contain (whether or not in addition to the indicated list of information and phone numbers) the underlying file or files for the printed text and graphics. The datatile could further contain instructions to not perform OCR on the printed text. An embodiment that includes both OCR capability and the ability to decode datatiles first attempts to find and decode a datatile. If successful in decoding a datatile (one that contains instructions not to perform OCR) the invention does not perform OCR on the printed text but instead stores the file contained in the datatile. If no datatile is present on a printed document (or if the datatile is not successfully decoded) this further embodiment performs OCR on the document. The result in either case is a digital representation of the document. In light of current deficiencies in OCR, the first possibility—deriving a perfect digital representation from a datatile—is clearly preferable.

While FIG. 9 includes human readable information in addition to digital data, it should be understood that further embodiments of the invention combine digital data as well as other information that is not or is not primarily human readable through visual inspection. Thus, one further embodiment combines the encoded digital data with braille so that digital data can be transmitted by substrate to the visually impaired. For example, computer audio files can be transmitted on paper and the recipient can read the braille on the substrate to determine the contents of the computer audio files. In further embodiments, the machine readable digital data produced by the present process is combined with machine readable digital data of other processes such as those that utilize bar codes or characters written in magnetic ink. These further embodiments allow existing installed bases of technologies to initially sort or otherwise make determinations using existing equipment and processes in place.

Figure 10:
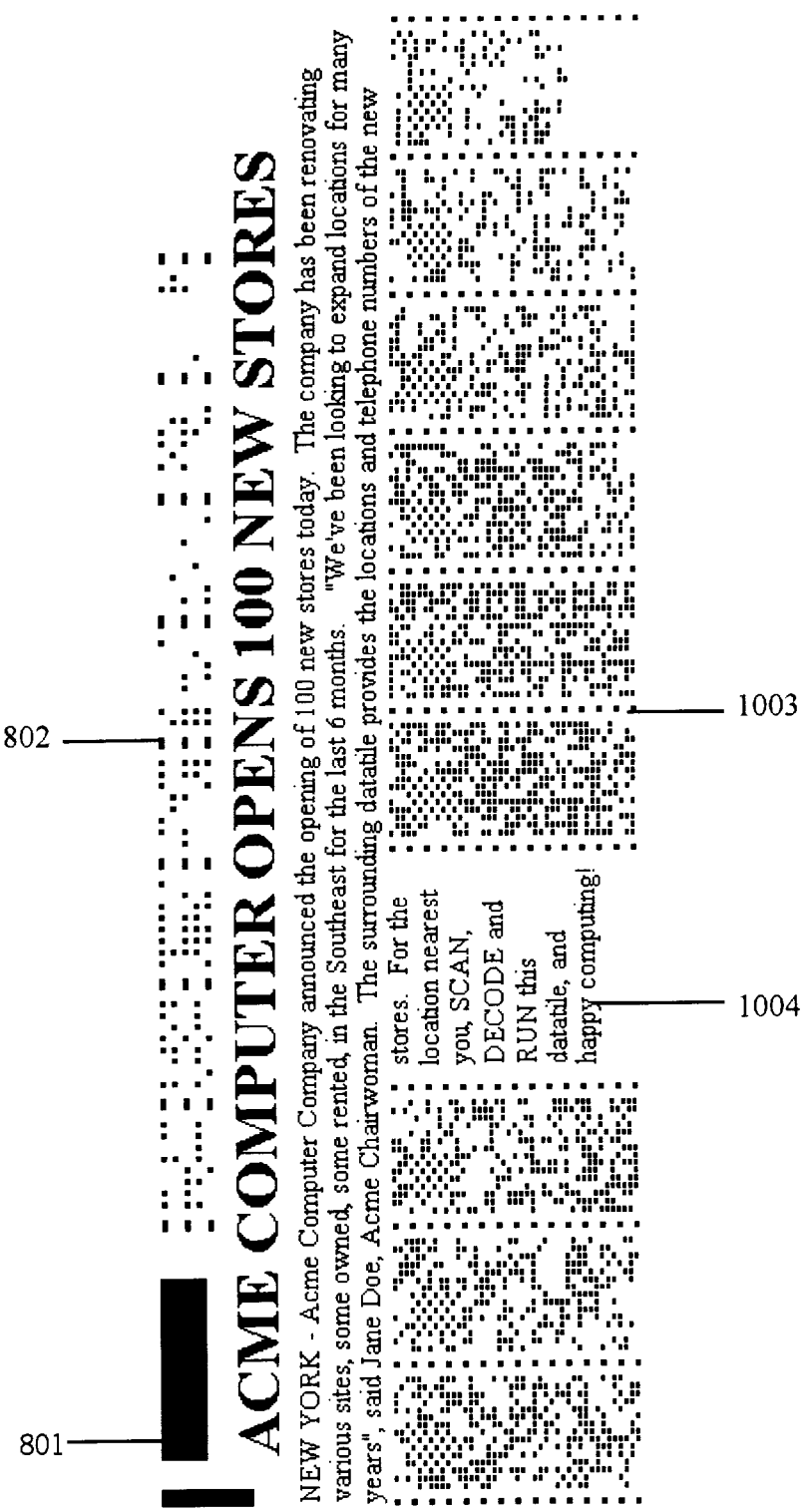
FIG. 10 illustrates a substrate produced by an embodiment of the invention in which parts of a datatile are placed in noncontiguous regions of the substrate instead of being placed as a whole in one region of the substrate.

In a further embodiment of the method of encoding, the digitally encoded substrate contains at least one datatile where parts of the datatile are located in noncontiguous regions of the substrate instead of the whole datatile being located in one region of the substrate. The regions not occupied by parts of the datatile may contain other printable matter including human readable text or graphics, blank space, or parts or all of other datatiles. FIG. 10 illustrates an example of a substrate produced in accordance with this embodiment. This substrate contains parts of a single datatile, a landmark 801, a metasector 802, and a main body of data 1003. The substrate also contains human readable text 1004. Parts of the datatile are in noncontiguous regions of the substrate. Landmark 801 and metasector 802 are located together at the top of the substrate. Main body of data 1003 is divided into 2 parts, each of which is physically separate from each other and from landmark 801 and metasector 802. Human readable text 1004 occupies space between the noncontiguous parts of the datatile.

In one embodiment of the method of encoding, the metasector contains information indicating or otherwise assisting in the determination of the location of the various parts of the main body of data 1003 while in a further embodiment, a part or parts of the main body of data 1003 contains information indicating or otherwise assisting in the determination of the location of the other parts of the main body of data 1003, while in a still further embodiment, the various parts of the main body of data 1003 are located without reference to information provided by either metasector 802 or other parts of the main body of data 1003. Of these various embodiments, the preferred method places in the metasector the location information for at least the first grouping of cells of the main body of data. If less than all location information is placed in the metasector, the preferred method would place in the main body of data's first grouping of cells the location information for at least the next grouping of cells. Determination of the landmark and metasector locations therefore facilitates determination of locations of a series of non-contiguous parts of the main body of data. Location of cells within non-contiguous parts of the main body of data is aided by another aspect of the invention—i.e., the intermittent series of formattable markers. In some embodiments, the number and size of the separate parts of the main body of data 1003 are fixed by information contained in metasector 802 or other parts of the main body of data 1003. In other embodiments, the number and/or size of the separate parts of the main body of data 1003 are not fixed. The method of decoding continues searching for additional parts until no more are found, either because the entire substrate has been searched or because the succession of location references from part to subsequent part ceases.

While the result of the method of encoding is sometimes a single digitally encoded substrate, in some instances the preferred embodiment produces a plurality of digitally encoded substrates from one or more computer files or series of digital data values. Utilization of multiple substrates may be called for particularly when the amount of data or the size of one or more computer files exceeds the limits of what can be encoded on a single substrate. Thus, computer files or other digital data of virtually unlimited sizes can be encoded.

In a further embodiment, a plurality of datatiles are encoded onto a single digitally encoded substrate. The encoding into multiple datatiles may be particularly called for to facilitate in the navigation to particular digital data. For example, a newspaper page might contain several articles with a separate datatile alongside each article with digital data (such as a digital representation of the article itself) relevant to the particular article. Multiple datatiles on one substrate may also be used such that each is decoded in sequence in order to provide a steady stream of data once the first datatile is decoded instead of waiting for an entire page to be decoded. In some embodiments this steady stream of data is used for some further application, where the computer decodes datatiles and executes this further application on such a substantially contemporaneous basis as to be transparent to the user. In one such embodiment, the method of decoding is integrated with application software that displays video clips and plays audio files such that datatiles are decoded, video displayed, and audio played on a substantially contemporaneous basis.

Figure 11:
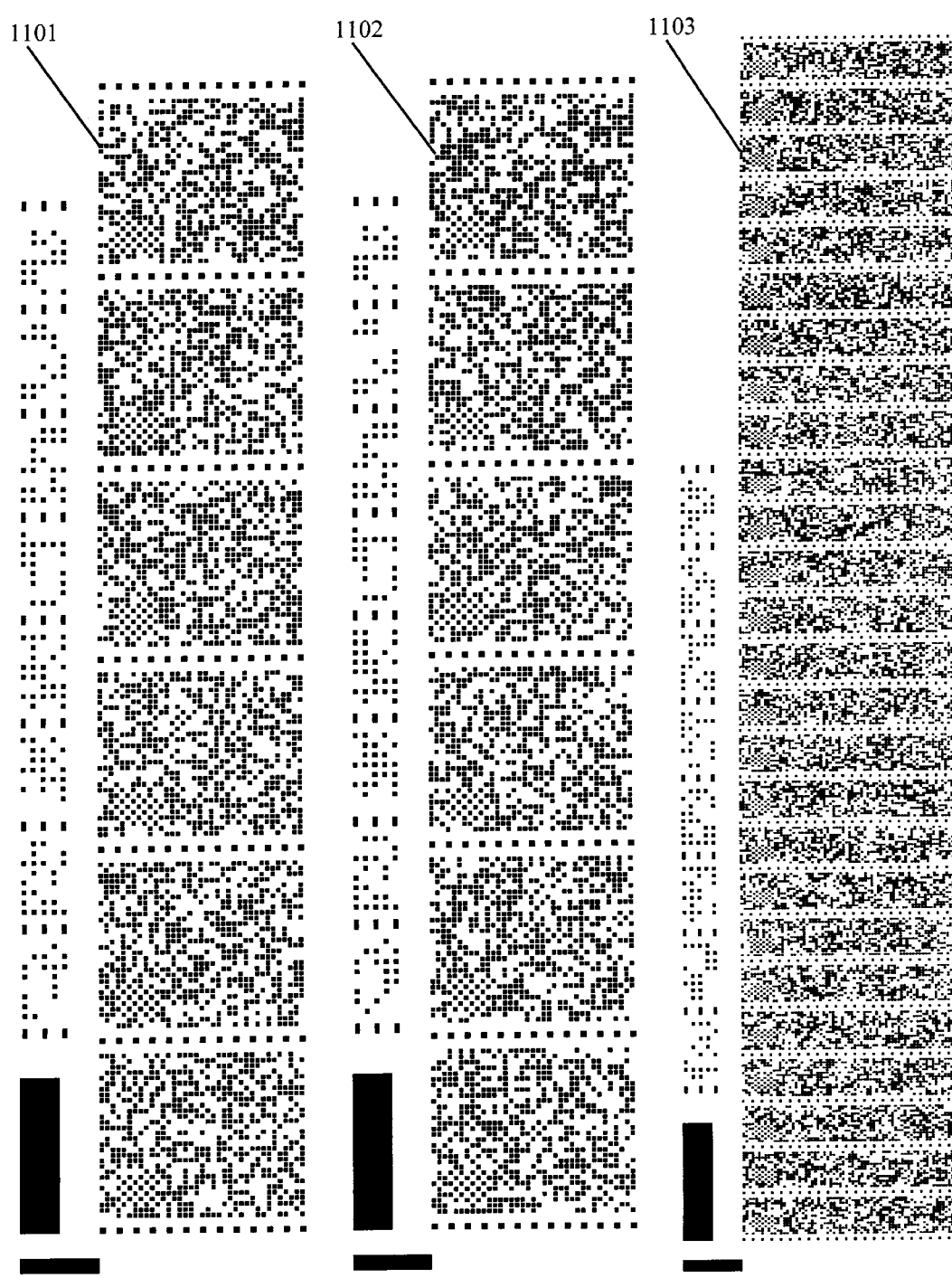
FIG. 11 illustrates a digitally encoded substrate containing multiple datatiles, each of which has been enlarged for illustration purposes.

FIG. 11 illustrates a digitally encoded substrate containing multiple datatiles, each originally produced by the DEDS program and then enlarged 250% in each dimension for illustration purposes. The first two datatiles, 1101 and 1102, were intended to be decoded by using a fax machine as a scanner. The third datatile, 1103, was intended to be decoded by using a flatbed scanner with an optical resolution of no less than 300 dpi scanning 256 levels of gray scale. Datatiles 1101 and 1102 are two datatiles that together contain one computer file. Datatile 1103 contains one whole computer file. The one computer file contained in datatiles 1101 and 1102 contains 1,866 bytes of text while the one computer file contained in datatile 1103 contains 3,112 bytes of text. While a flatbed 300 dpi scanner can successfully decode the originals (i.e., at their original size) of all three datatiles, 1101, 1102, and 1103, using a fax machine as a scanner, the invention can successfully decode only datatiles 1101 and 1102 (at their original size). Thus, FIG. 11 illustrates another feature of the invention—the ability to convey a base amount of data to all recipients regardless of their scanners' capabilities by formatting at least one datatile using the lowest common denominator while providing significantly more data to those with more powerful scanners.

Figure 12:
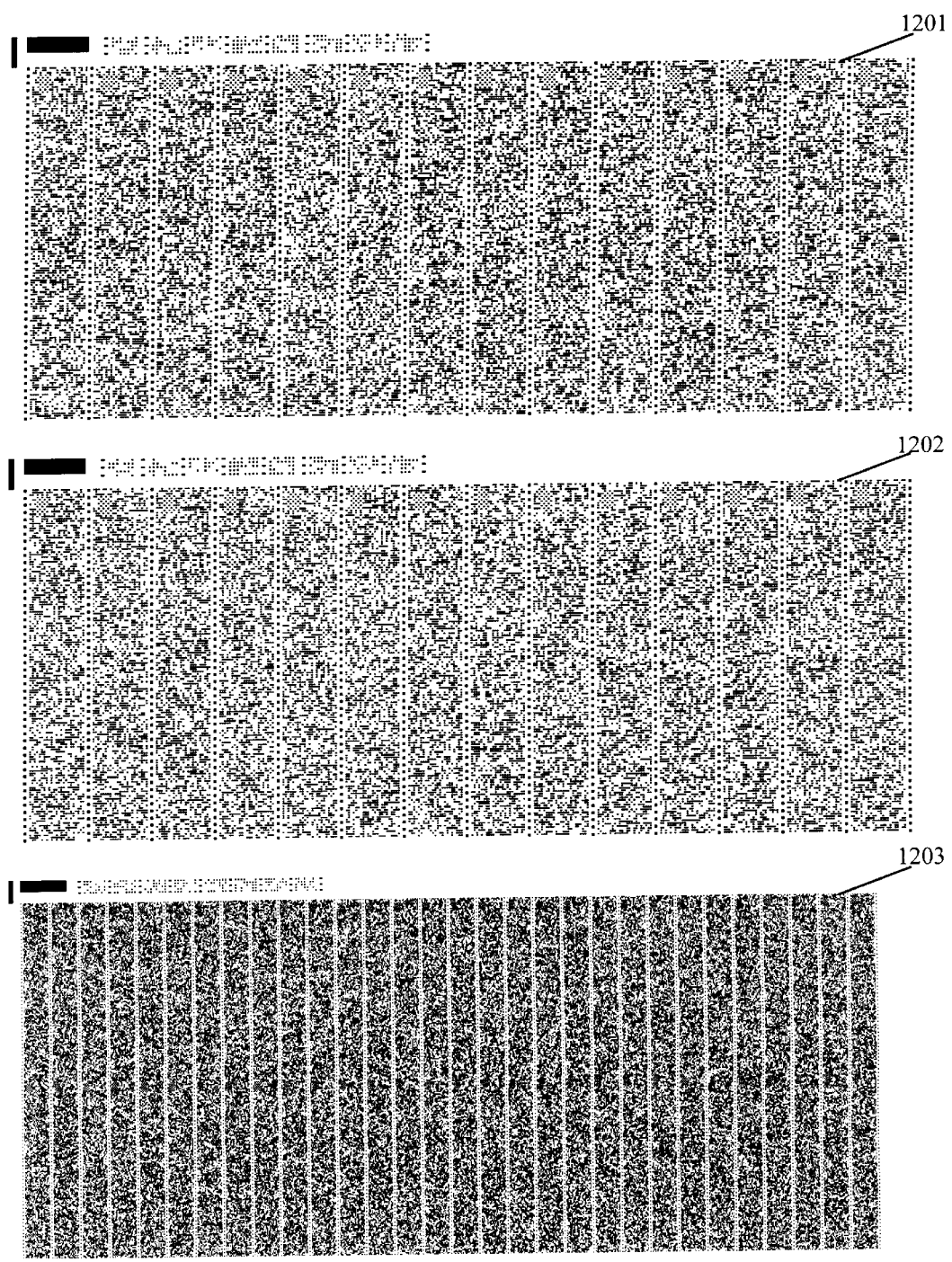
FIG. 12 illustrates a digitally encoded substrate containing multiple datatiles, shown at their actual sizes.

FIG. 12 illustrates a digitally encoded substrate containing multiple datatiles, all produced by the DEDS program, all depicted at their actual, original size. The first two datatiles, 1201 and 1202, are intended to be decoded by using a fax machine as a scanner. The third datatile, 1203, is intended to be decoded by using a flatbed scanner with an optical resolution of no less than 300 dpi scanning 256 levels of gray scale. Datatiles 1201 and 1202 are two datatiles that together contain one computer file. Datatile 1203 contains one whole computer file. The one computer file contained in datatiles 1201 and 1202 contains 28,371 bytes of text while the one computer file contained in datatile 1203 contains 48,102 bytes of text.

The method of encoding of the preferred embodiment is capable of producing multiple datatiles (or series of datatiles) each of which contains the identical file or files and are distinguished from each other by their unique identification tag. This capability allows each datatile to contain a unique password, for example, while minimizing the amount of computing necessary to format each datatile. Each of the formatted patterns represented by the datatiles are preferably identical to each other except for that part of the pattern expressing the unique identification tag. In this fashion, a multiplicity of datatiles conveying the same data can be formatted using as a template a pattern containing everything but the identification tag and, for each datatile, completing the datatile by adding to the template a second (and much smaller) pattern representing the identification tag. In the preferred embodiment, the identification tag is added to the main body of data at the end (i.e., in the lower right corner of the datatile, following the file or files intended to be conveyed). In a further embodiment, the identification tag is added to the metasector—one grouping of metasector cells 8 cells wide by 5 cells high is capable of expressing $2^{40}$ unique identifications. In still further embodiments, the identification tag is a pattern near but not within the metasector or main body of data of the datatile. This last embodiment facilitates first photocopying the template pattern then adding the identification tag in a second step. Because the identification tag is not part of the metasector or main body of data of the datatile, the embodiment is more tolerant of any misregistration caused by outputting in 2 steps.

Figure 13:
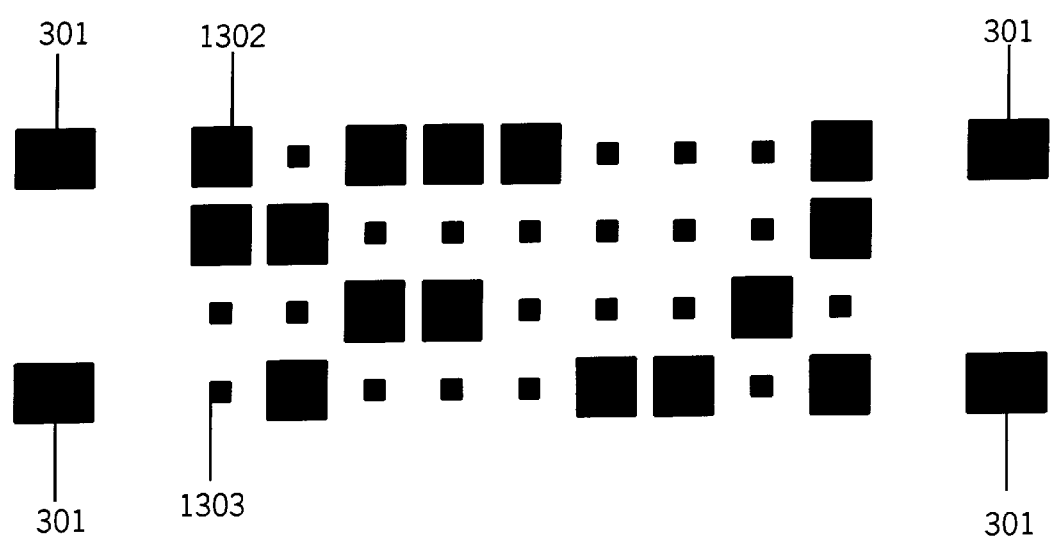
FIG. 13 is an enlarged view of a portion of a digitally encoded substrate illustrating an embodiment in which each cell contains one bit of digital data expressed by spots with different attributes, where the difference in attributes is a difference in spot size.

One embodiment would express different logical states for each cell by the placement of spots with different attributes. Depending on the embodiment, the attributes that could vary to express different logical states include spot size, spot color, ink type, and spot shape. In one such embodiment, illustrated in FIG. 13, each cell contains a spot. Each spot has one of two sizes. Markers 301, bordering the data cells, are 4 pixels wide by 3 pixels high. Each data cell contains one bit of information expressed by two logical states. A first logical state, exemplified by spot 1302, is expressed by a spot 3 pixels wide by 3 pixels high. A second logical state, exemplified by spot 1303, is expressed by a spot 1 pixel wide by 1 pixel high. In this fashion, each cell contains a spot of one of the two sizes. In instances where a self-clocking mechanism is called for, this embodiment would have the advantage of providing such a mechanism.

Figure 14:
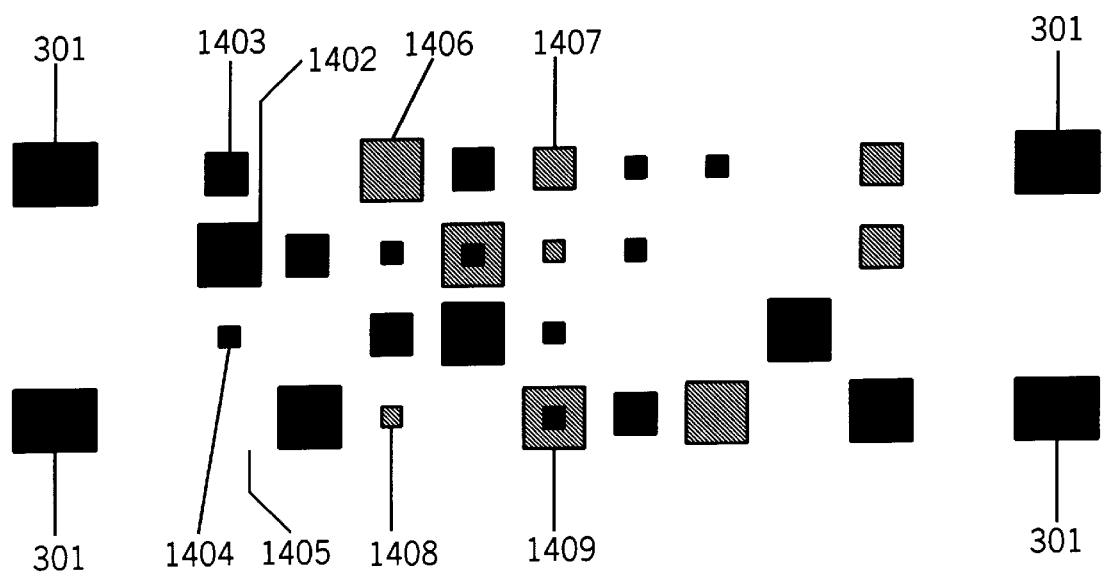
FIG. 14 is an enlarged digitally encoded substrate produced by a further embodiment of the invention in which each cell represents a plurality of bits where spots of different sizes and colors express different logical states.

In a further embodiment, each cell represents more than one bit where a plurality of bits are expressed by spots of different sizes and colors. FIG. 14 is an enlarged view of a substrate produced by such an embodiment containing markers 301 and cells 1402, 1403, 1404, 1405, 1406, 1407, 1408, and 1409. Markers 301 are of uniform size, 4 pixels wide by 3 pixels high, and color, black. FIG. 14 contains cells each of which represents 3 bits in a series of digital data values. Each cell has one of eight different logical states with one logical state expressed by the absence of a spot and each of the other logical states expressed by a spot with either a size or color different from a spot expressing any other logical state. Cell 1402 contains a black spot 3 pixels wide by 3 pixels high. Cell 1403 contains a black spot 2 pixels wide by 2 pixels high. Cell 1404 contains a black spot 1 pixel wide by 1 pixel high. Cell 1405 is blank. Cell 1406 contains a gray spot 3 pixels wide by 3 pixels high. Cell 1407 contains a gray spot 2 pixels wide by 2 pixels high. Cell 1408 contains a gray spot 1 pixel wide by 1 pixel high. Cell 1409 contains a black spot 1 pixel wide by 1 pixel high surrounded by a gray border 1 pixel wide on all sides. Hence, cells 1402, 1403, 1404, 1405, 1406, 1407, 1408, and 1409 are examples of each of the eight different logical states that a cell can express.

Figure 15:
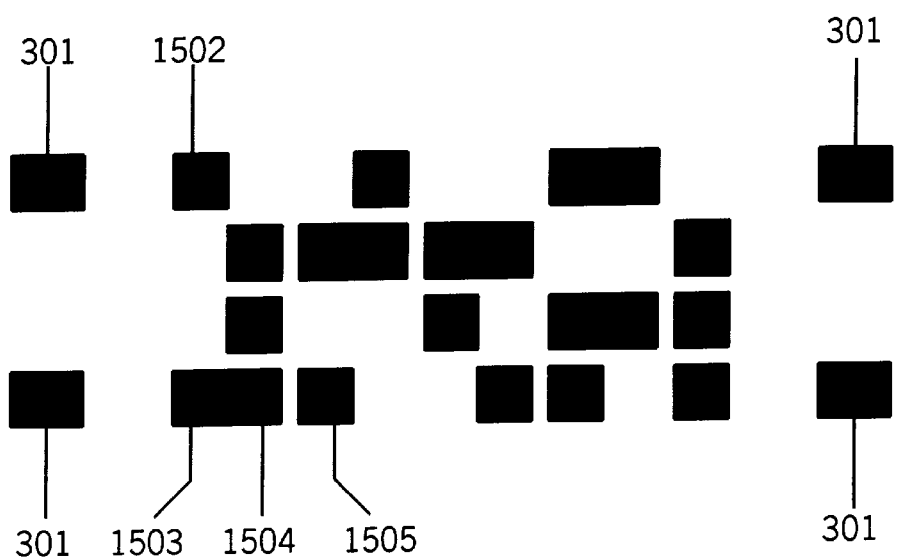
FIG. 15 is an enlarged view of a portion of a digitally encoded substrate illustrating an embodiment of the method of encoding in which one spot size and two cell sizes are defined.

FIG. 15 illustrates the use of more than one cell size in the same datatile. A user of the invention may desire to select such a configuration when, for example, one cell size is too small and the next larger cell size wastes space. If a user determines that dot gain prevents a smaller cell size from accurately conveying data, this embodiment allows the user to alternate cell sizes between a smaller size and the next larger size to overcome the problem while making the most efficient use of space. It is a reasonable inference that the technique of different cell sizes can increase the density of information. Any spot either within a larger cell, or within a smaller cell contiguous to a larger cell, will enjoy greater separation from at least one neighboring spot than it would if all spots were within smaller cells. This will serve to reduce the bit errors that will be introduced in decoding, since the number of bit errors depends critically on the separation. The reduction of bit errors in turn can allow the correct decoding of the information in cases in which it would be impossible if all cells were of the smaller size.

FIG. 15 references markers 301, and spots 1502, 1503, 1504, and 1505. The elements in FIG. 15 are enlarged for purposes of illustration and explanation. While spots are considered in FIG. 15 to occupy the upper left corners of cells for illustration purposes, it should be understood that this is just one possible embodiment—another embodiment, for example, places a spot in the center of cells. Markers 301 are 4 pixels wide by 3 pixels high. Each of the spots is 3 pixels wide by 3 pixels high. The first column is formatted to include cells that are 3 pixels wide and 4 pixels high and, accordingly, spots 1502 and 1503 are in cells 3 pixels wide and 4 pixels high. The second column is formatted to include cells that are 4 pixels wide by 4 pixels high and, accordingly, spot 1504 is in a cell 4 pixels wide by 4 pixels high. Because the first column has been formatted such that its width equals the width of any spot, a spot in the first column directly adjoins a spot in the same row in the second column, as illustrated by spots 1503 and 1504, which together appear to be one spot twice as wide as high, but are in fact two distinct spots. Because the second column has been formatted to be wider than any spot, any spots in the same row in the third column will not directly adjoin spots in the second column. Accordingly, spot 1504 does not directly adjoin spot 1505.

Decoding

Figure 16:
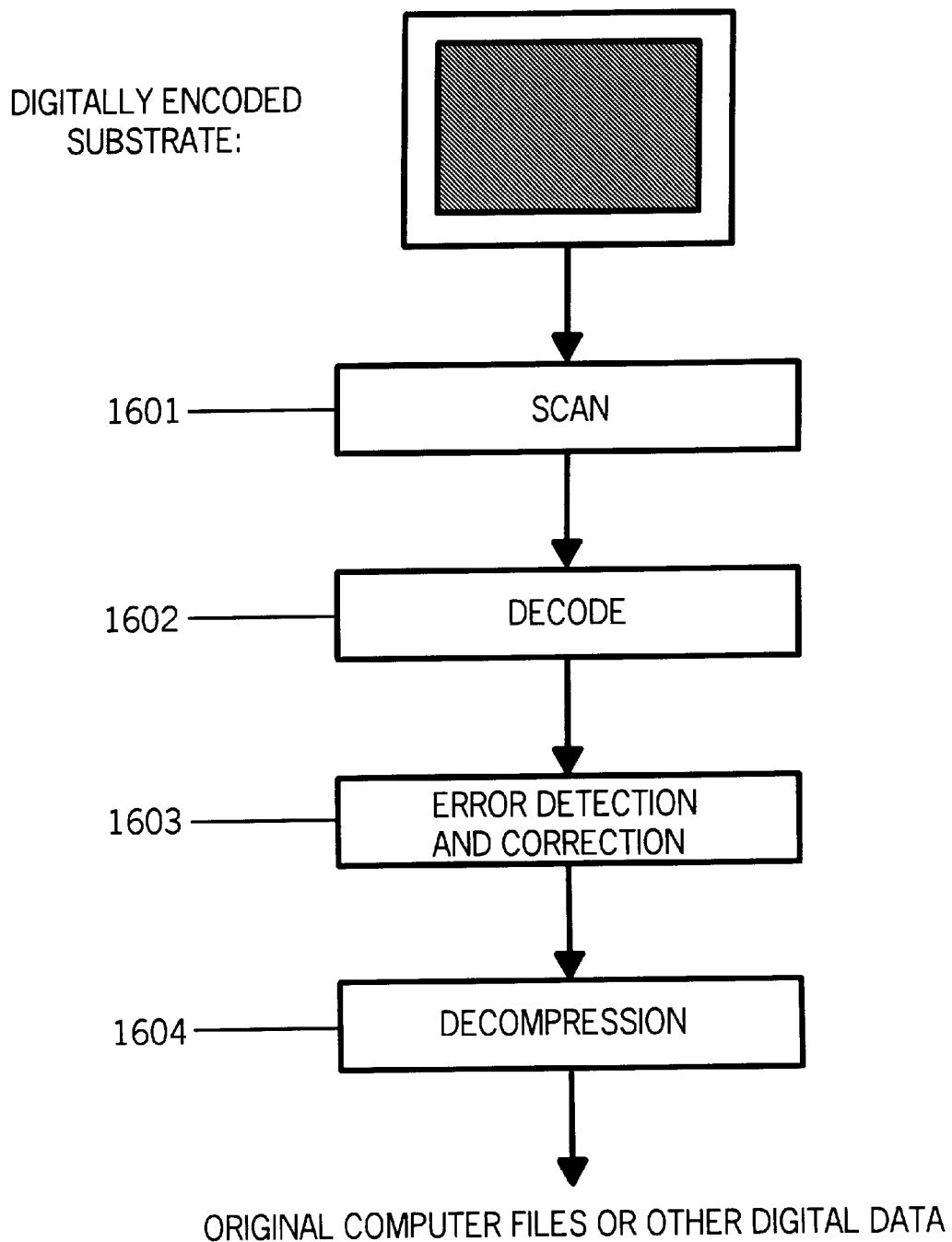
FIG. 16 is a block diagram describing the method of decoding for decoding digital data contained on a digitally encoded substrate, according to the preferred embodiment.
Figure 17:
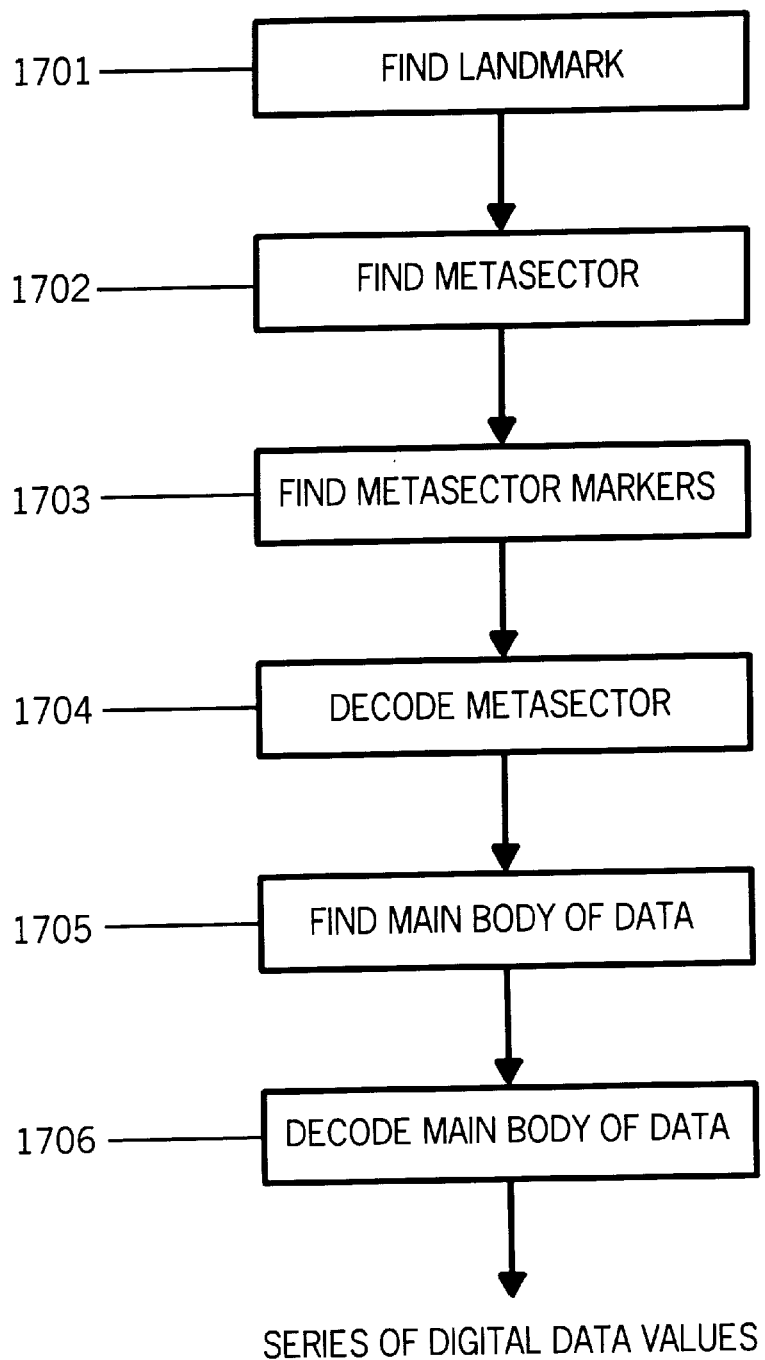
FIG. 17 is a block diagram describing the decoding process for deriving a series of digital data values from an image of a digitally encoded substrate.
Figure 18:
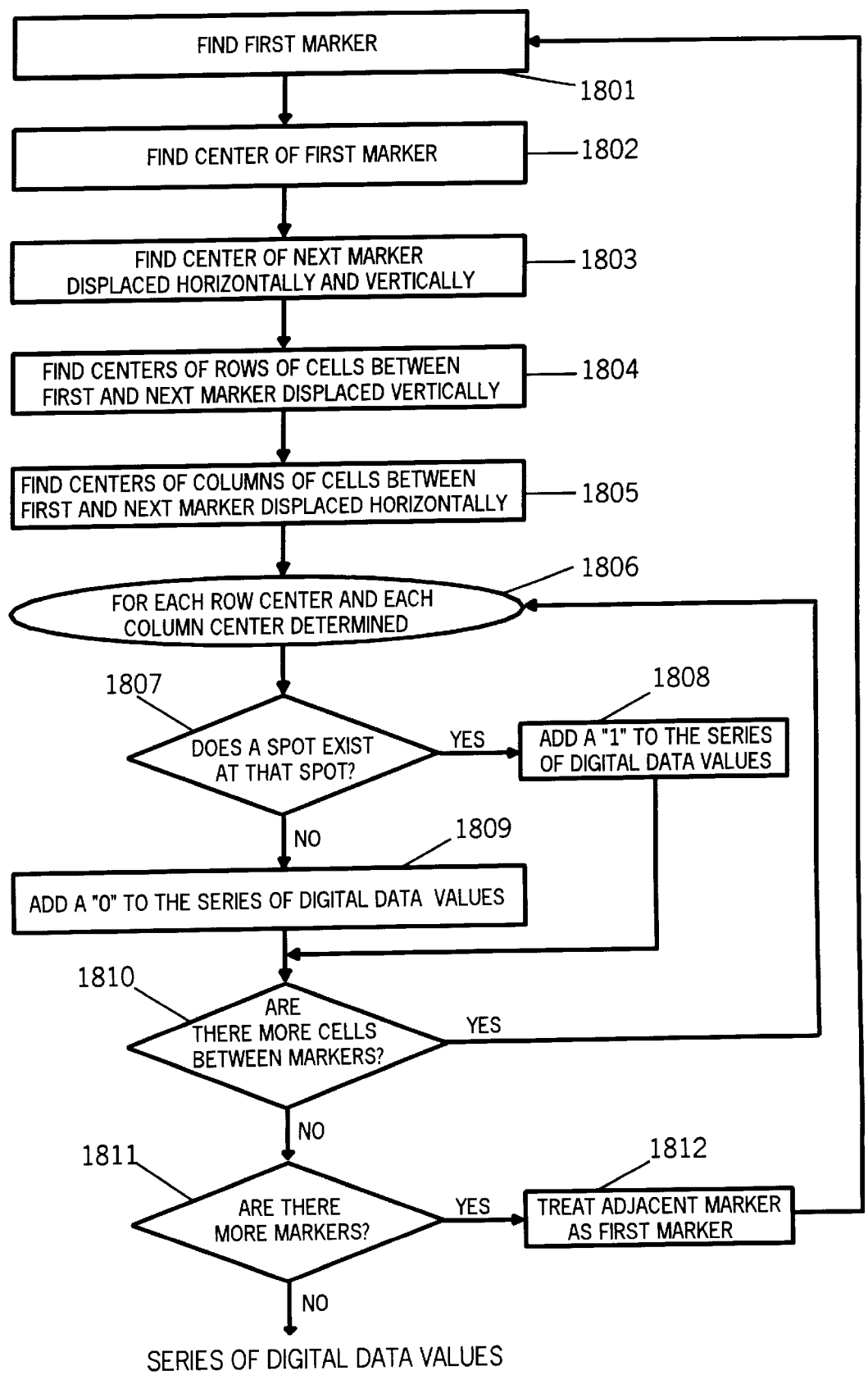
FIG. 18 is a block diagram describing the recovery process for deriving a series of digital data values from the image of that portion of a digitally encoded substrate that lies between markers.
Figure 19:
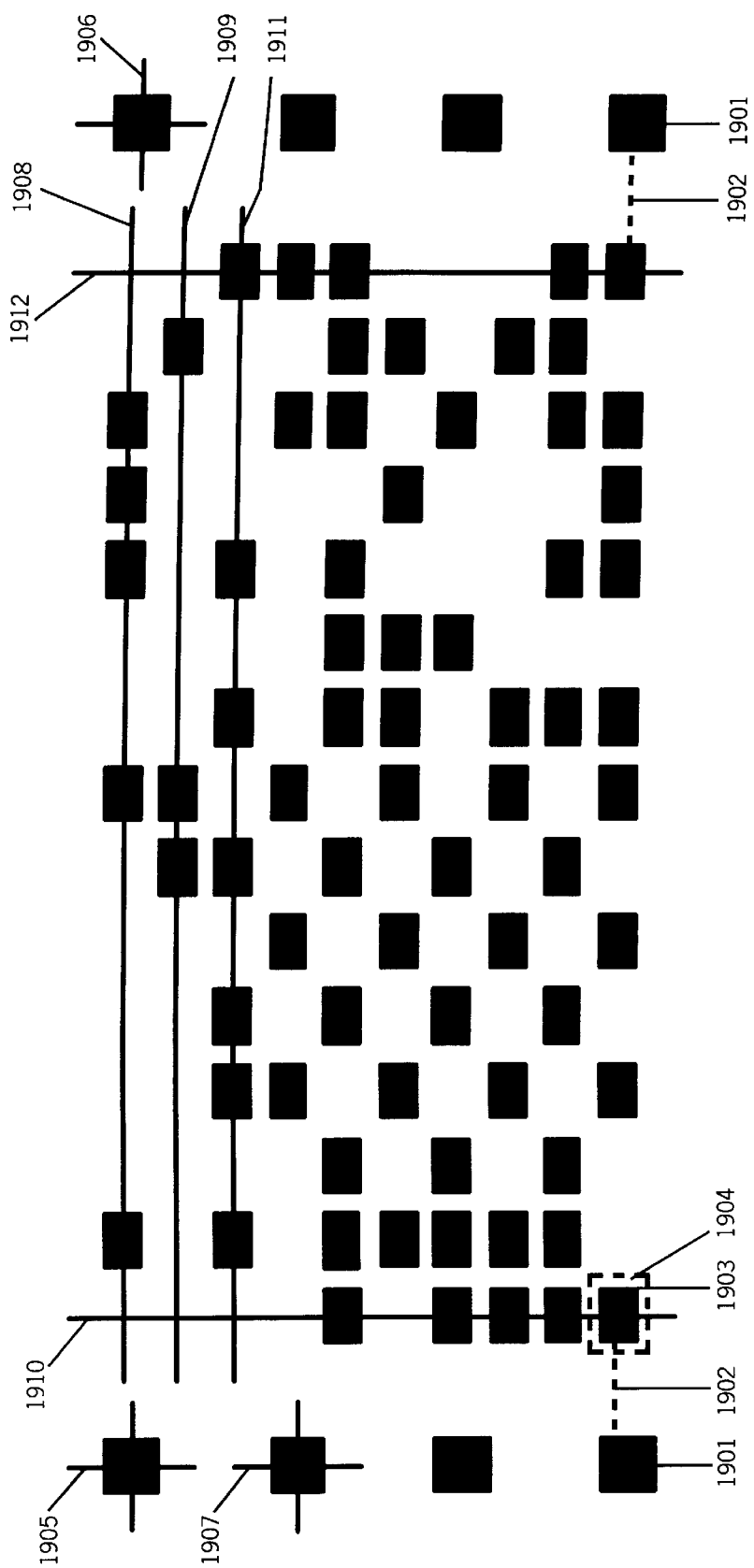
FIG. 19 is an enlarged view of a portion of a digitally encoded substrate illustrating one embodiment of the recovery process used to recover digital data.

Formatted digital data produced by the invention must be decoded in order to reconstruct the original computer files or other digital data. The manner in which the preferred embodiment accomplishes the decoding is illustrated in FIGS. 16, 17, 18, and 19. FIGS. 16, 17, and 18 are block diagrams describing processes relating to decoding, while FIG. 19 is an enlarged portion of a digitally encoded substrate used to illustrate the steps diagrammed in FIG. 18. FIG. 16 describes the method of decoding—i.e., the broad perspective of how a digitally encoded substrate is decoded. Included in the steps according to this broad perspective is step 1602, the decoding process. FIG. 17 describes the preferred embodiment of the decoding process. Included in the steps according to this preferred embodiment are steps 1704 and 1706, both of which involve decoding a grouping of contiguous cells. Decoding a grouping of contiguous cells involves a process of recovering digital data values from the grouping. FIG. 18 is a block diagram describing the preferred embodiment of that recovery process. Thus, FIGS. 16, 17, and 18 should be understood as illustrating increasing detail of the manner in which the preferred embodiment reconstructs the original computer files or other digital data.

The overall method of decoding a substrate comprises, at a minimum, the steps of scanning (i.e., creating an electronic image of the substrate) and decoding. In the preferred embodiment, the method of decoding further comprises the steps of error correction, error detection, and decompression. This embodiment is illustrated in FIG. 16. The digitally encoded substrate is first scanned (processing block 1601). In a preferred embodiment, this scanning occurs using a flatbed scanner attached to a personal computer. In further embodiments, the scanning occurs using a handheld scanner, a sheet-fed page scanner, a business card scanner, a drum scanner or another type of scanner attached to a personal computer. It should be understood that the universe of scanners which may be used is not limited to those attached to personal computers but could include any scanner capable of producing an electronic image. In a still further embodiment, a facsimile machine is used as a scanner, whereby a digitally encoded substrate is fed through the facsimile machine to produce a scan of the datatile. The fax machine may connect to the computer through telephone lines (i.e., by the normal process of transmitting a facsimile from one facsimile device to another by causing the facsimile machine to place a telephone call to a fax/modem attached to the computer), through a device connected to both the facsimile machine and the fax/modem (connected to the computer) which simulates a telephone line, or directly by a telephone wire connected to both the facsimile machine and a fax/modem which is connected to the computer. The result of the scanning is an image of the digitally encoded substrate, such image residing in the memory, fixed drive or other storage component of the personal computer. The image is preferably stored as a bitmap image. Note that the stored image only approximates the pattern placed on the digitally encoded substrate produced by the encoding process. Errors produced by the scanning process, such as misregistration, artifacts due to crimps and folds, skew, and scanner defects, may prevent the stored image from exactly representing the digitally encoded substrate.

The stored image is then decoded (processing block 1602). The decoding process identifies cells (i.e., the locations of possible spots) in the stored image and determines for each cell, at a minimum, the presence or absence of a spot. The aggregation of these determinations results in a series of digital data values. Further embodiments make additional determinations that may include the color and size of a spot present, if any. These further embodiments depend on embodiments of the encoding process that provide for encoding of spots that vary in color or size. The result of these further embodiments is likewise a series of digital data values, but each cell represents more than one bit of that series of digital values.

The series of digital data values resulting from decoding process 1602 is then subjected to error correction and detection processing (processing block 1603). This step 1603 is the inverse of the error correction encoding which occurred during encoding (FIG. 2). The error detection and correction occurs by using the codewords with redundant parity bits added during encoding (FIG. 2) to correct errors which may have occurred. The error correction compensates for the loss of data due to damage to the paper or due to the failure to predict the cell location correctly. The errors may be attributed to staples, hole punches, folds, crumples, paper discolorations, technical problems, imperfections introduced in the scanning process or other imperfections.

Once any required error correction is performed, the stream of digital data values is decompressed (processing block 1604). The decompression performed depends on the compression performed during encoding and is performed to restore the data to its original form.

After decoding (processing block 1602), error detection and correction (processing block 1603) and decompression (processing block 1604), the reconstructed computer files or other digital data can be stored on a disk, displayed, or otherwise used by the computer doing the decoding.

Decoding process 1602 of the preferred embodiment of the invention (FIG. 8, described above, illustrates a digitally encoded substrate produced by the preferred embodiment) takes advantage of the wealth of information provided in the encoding process. Decoding process 1602 of this preferred embodiment achieves a pyramid gain of knowledge: finding the landmark conveys knowledge on where to find the metasector, as well as its dimensions, the metasector conveys knowledge on where to find the main body of data and how precisely to extract data from that main body of data, and the main body of data conveys the underlying computer files or other digital data.

While the method of decoding is described above by reference to a single datatile, the preferred embodiment allows the same steps to be applied to each of a series of datatiles. In one such instance, multiple substrates contain, in the aggregate, more than one datatile while in a further instance, a single substrate contains multiple datatiles, as illustrated in FIG. 11 and FIG. 12. The method of decoding of the preferred embodiment applied to multiple datatiles first scans all datatiles and then applies all of the remaining steps (1602, 1603, and 1604) to each datatile before proceeding to the next datatile. Another embodiment applies all of the steps of FIG. 16 to each datatile before proceeding to the next datatile. A further embodiment applies each step to all datatiles before proceeding to the next step. With each possibility, an automatic document feeder attached to a scanner facilitates the creation of images which are then subject to the decoding process. It should be understood that the method of decoding can also be applied to multiple datatiles not encoded on substrates but, instead, are always in electronic form, as in the case of a facsimile transmission of datatiles from a fax/modem to a fax/modem. FIG. 17 illustrates the decoding process achieving a pyramid gain of knowledge according to the preferred embodiment. The process may be generally described as one in which the locations of metasector cells are determined, the information in the metasector cells is derived, the locations of cells in the main body of data are determined and the data in the cells of the main body of data is derived. The steps of determining the locations of cells in the main body of data and deriving the data from those cells is performed by using the information conveyed by the metasector cells. In the case of multiple datatiles forming one series of digital data values, the entire sequence of steps of FIG. 17 are preferably applied to one datatile before proceeding to the next datatile.

First, the decoding process finds the landmark (processing block 1701). In a digitally encoded substrate produced by the preferred embodiment of the invention (as illustrated in FIG. 8, described above), this landmark consists of two dark bars located at the upper left corner of the datatile, with the first dark bar having a height significantly greater than its width and a second dark bar located near the first dark bar with the second dark bar having a width significantly greater than its height. The decoding process can find the two bars due to their unique characteristics. The decoding process looks for a series of contiguous dark pixels. Having found such a series of contiguous dark pixels, the decoding process tests whether a series of contiguous dark pixels of a calculated number extends in the orthogonal direction, with the calculated number determined by reference to the number of pixels extending in the first direction and the predefined ratios of width to height. The decoding process then attempts to determine the orientation of the first bar—i.e., whether the image has been skewed resulting in the first bar being skewed. Determination of orientation is accomplished by locating the corners of the first bar and judging skew by the relative location of these corners. Location of the corners of what might be a first bar further aids determination of whether the first bar has in fact been found. The corners of the first bar should be a certain angle and distance in pixels from each other. If the decoding process locates the appropriate angle and distance in pixels between corners, the decoding process assumes for purposes of further testing that it has found a first bar of the landmark. The decoding process then determines whether a second bar exists at a location determined by reference to the first bar. Existence of a second bar is accomplished by likewise locating a calculated number of consecutive dark pixels extending in one direction, and a second calculated number of dark pixels extending in the other direction, with the calculated numbers of pixels in each direction determined by reference to the size of the first bar and the predefined ratios of heights and widths. It should be understood that while the process described assumes certainty in the relative size and location of the bars comprising the landmark, the preferred embodiment allows for some latitude. The degree of latitude involves a tradeoff, with too much flexibility introducing the possibility of the decoding process concluding that it has found a landmark, where none in fact exists, and too little flexibility forcing the conclusion that it can find no landmark, where a landmark in fact exists. An appropriate degree of flexibility is provided in the source code of the DEDS program. It should be further understood that in other embodiments of the invention, landmarks of a different size, shape or appearance are used, or no landmark at all is used. In each of these further embodiments, the steps described above are modified or omitted.

The next step toward knowledge acquisition comprises locating the metasector (processing block 1702). As illustrated in FIG. 8, described more fully above, the metasector of the preferred embodiment is located at a predefined location relative to the landmark, that location being generally to the right of the landmark. Having already located the landmark, processing block 1701, the decoding process knows where the metasector should be in the image of the digitally encoded substrate. The decoding process determines the distance of the metasector from what it knows about the landmark. Once it determines the width and height of the landmark's horizontal and vertical bars in image pixels, it can calculate the ratio of image pixels to printed pixels in the "base" case described earlier by reference to FIG. 8. This allows it to calculate the displacement in number of image pixels of the first column of metasector markers from the landmark, for the other columns of markers in the metasector, and the expected size and distances, in image pixels, of these markers and of the spots. The decoding process finds the metasector by finding the first column of metasector markers based on what is known about the location of the landmark in the image, the relative location of the metasector to the landmark in printed pixels and the ratio of image pixels to printed pixels. The decoding process preferably allows some degree of latitude in making this determination of location and dimensions.

Having found the metasector (processing block 1702) the decoding process then finds the metasector markers, processing block 1703. In the preferred embodiment (as illustrated in FIG. 8 described above) the metasector includes 27 metasector markers, 9 columns of 3 evenly spaced markers, with one column of markers bordering each of the left and right sides of the metasector. In addition to having predefined locations, the metasector markers of the preferred embodiment have a size predefined to be different from the metasector data spots. The decoding process determines where the metasector markers should be and then confirms those locations or adjusts to the actual locations as necessary. Because the number of metasector markers and the number of cells between these markers is fixed in the preferred embodiment, this determination is straightforward (as described more fully below with reference to FIG. 18). Another embodiment of the invention provides for an abbreviated metasector, such an abbreviated metasector being warranted when, for example, customary practice of consumers limits the variety of formats actually used. The metasector format in the preferred embodiment expresses enough information to allow the main body of data to assume a vast variety of formats. Yet after considerable experimentation by consumers, it may be that only a relatively small number of such formats enters widespread use. These formats may be adequately captured by a much abbreviated metasector, that only permits these commonly used formats to be specified.

In a further embodiment there are a finite number of possible formats for the metasector. Each of these is searched for, until one is found that conforms to a known possibility. This can be safely done, since it will be certain whether the metasector has been correctly interpreted. Each metasector has a checksum associated with it that can guarantee, to any specified level of certainty, that the information decoded is wholly correct. And of course the metasector might also be in the form of a standard linear barcode, with its own notion of error detection.

It is likewise true that the main body of data might have a finite number of expected formats, which are the most commonly used formats, and even in the absence of a metasector, could be correctly decoded simply by cycling through the possibilities until one is found that works. The correctness of the choice would again be assured by a checksum in the main body of data.

The decoding process then decodes the data contained in the metasector (processing block 1704), such information being located in cells in between the metasector markers. The preferred method of decoding the metasector is as illustrated in FIG. 18, described below. The result of the decoding process is primarily information relating to the encoding process. The decoding process uses this information to decode the main body of data (processing block 1706). The metasector can also contain information not used in the decoding process, such as the time and date the datatile was created. This information, as well as other information not directly related to the decoding, can likewise be contained in the main body of data.

The penultimate step in knowledge acquisition involves locating the main body of data, processing block 1705. As illustrated in FIG. 8 described above, a preferred embodiment places the main body of data at a predefined location relative to the landmark and the metasector. The decoding process pursuant to this embodiment searches for a first marker of the main body of data at or near this predefined location in the image of the digitally encoded substrate.

The final step in knowledge acquisition is decoding the main body of data, processing block 1706. The decoding process preferably accomplishes this by employing the same basic process used to decode the metasector, as illustrated in FIG. 18. The mechanics differ primarily to reflect the peculiarities of the main body of data relative to the metasector. In particular, the mechanics of decoding the main body of data take advantage of the wealth of information provided in the metasector. While the metasector has preferably been encoded in a rigid or semi-rigid fashion with each metasector having the same or largely the same format as any other metasector produced by the method of encoding, the main body of data is preferably encoded in a user selectable format which can vary widely. For example, while every metasector is preferably encoded with cells of a constant or largely constant low resolution, the main body of data may be encoded with cells whose size can vary greatly among datatiles. The mechanics of the decoding process for the main body of knowledge considers the flexibility allowed by the method of encoding, with the details of the encoding process contained in the metasector and communicated by the pyramid gain of knowledge approach of the preferred embodiment. The manner in which the decoding process uses these details is illustrated in FIG. 19, and discussed below.

The metasector, when present, should generally contain at least the version number, the multiple of the "base" printed dimensions of the landmark and metasector, the width and height of the markers, the number of rows of spots per marker, the distance between markers and spots, the horizontal distance between spots (i.e., the difference between Cell Width and Spot Width), the distance between rows of spots (i.e., the difference between Cell Height and Spot Height), the width and height of the spots, the type of checksum in the data sectors, the type of printer (e.g., laser or inkjet), the type and degree of error correction, and finally a checksum to guarantee the correctness of the information. In the DEDS program the metasector contains, in addition to the above information, the number of data segments per datasector, the number of datasectors down, the number of datasectors across, and the size of the data contained in the data portion of the pattern. However, in another embodiment this additional data is instead placed in the main body of data of the pattern by placing it in the top rows of the first portion of the main body of data.

The version of the metasector indicates the precise format and nature of the data fields contained within the metasector. It may also be used to indicate peculiarities of the format of the main body of data of the pattern—for example, the size of the header information in the main body of data.

The result of the decoding process is a series of digital data values. This series of digital data values is the unprocessed data stream from which the method of decoding derives the original computer files or other digital data after applying decompression and, possibly, decryption processing.

The basic process for recovering data from cells is preferably the same whether the cells are contained in the metasector or in the main body of data. FIG. 18 illustrates this recovery process as applied to an image of a digitally encoded substrate produced by a preferred embodiment of the invention, an example of which is illustrated in FIG. 8. The recovery process sequentially finds the point in each cell representing the center of where a spot might be printed and for each cell determines whether a spot exists at that location. In the first step, processing block 1801, the recovery process locates the first marker in the image of the metasector or the main body of data, as the case may be. The recovery process then locates the center at that first marker, processing block 1802. The recovery process then locates the center of the nearest marker displaced horizontally, preferably the marker to the immediate right, and the nearest marker displaced vertically, preferably the marker immediately down from the first marker, processing block 1803. The markers are found by first locating the topmost, leftmost marker. This is done by examining the region where the marker is expected, looking through vertical strips of pixels from right to left until all the vertical strips are "white." This will determine where the leftmost dark pixels in the marker are. Next, horizontal strips are examined from bottom to top, noting where all the strips turn white. This determines where the topmost dark pixels in the marker are. The precise center of the marker is then determined by finding all the contiguous dark pixels, and finding the centroid of this group of pixels. Once the top left marker is found, the top marker for the next column is determined in the preferred embodiment by moving the known displacement across the image, and finding the precise top of the marker by repeating the process described for finding the top of the top, left marker. Again, the precise center is found by finding the centroid of the contiguous dark pixels. The markers down the column are found by the preferred embodiment by progressing down the image from a previously determined marker, examining horizontal strips of pixels, and detecting when the combined intensities of the pixels in the strip dips significantly, as is characteristic when a new marker is encountered. In another embodiment, markers down are determined by first moving down a known displacement to determine the approximate location of the next marker, then searching for the centroid pixel of the marker.

The recovery process then determines for each cell in between the first marker and the next nearest markers displaced vertically and horizontally the point in the cell representing the center of where a spot might be printed. The centers of spot locations are determined by locating the lines across the centers of the rows where spots might be printed in between the first marker and the next marker displaced vertically, processing block 1804, and then locating the lines down the centers of the columns where spots might be printed in between the first marker and the next marker displaced horizontally, processing block 1805. Each spot is preferably thought of as occupying the precise center of its corresponding cell. Accordingly, determining the lines across the centers of rows where spots might be printed equates to finding the lines through the centers of rows of cells. Likewise, determining lines down the centers of the columns where spots might be printed equates to finding the lines through the centers of columns of cells.

Having found the centers of possible spot locations in between the first marker and the next nearest markers, the recovery process determines whether each cell is "on" or "off" by determining whether a spot is present or absent at each of the possible spot locations, and accumulates these determinations. The recovery process accomplishes this subprocess by looping through a series of steps for each cell; processing block 1806 establishes the loop for each cell. For each cell, the recovery process determines whether a spot exists at the point representing the center of where a spot would be if printed, processing block 1807. The center is determined as the intersection of the central line through the column and the central line through the row containing any such spot. It should be understood that the preferred embodiment makes more than a simple "yes" or "no" determination of whether a spot exists at a particular pixel. The preferred embodiment determines the level of gray scale of the center pixel and, depending on the gray scale level, determines that the cell contains a spot, determines that the cell does not contain a spot, or determines the need for further processing if it is too close to call. If it is too close to call, information about whether surrounding dots or spots are present or absent may be used to settle whether the spot is to be considered on or off. If surrounding the region of a potential spot, the neighboring potential spots appear to be mostly present, the intensity of the region of the potential spot is generally depressed (i.e., darker). This is compensated for in the DEDS program by adding predetermined values to the intensity found in the region of the potential spot (i.e., the DEDS program assumes that the region of the potential spot is lighter than what was actually found in the image). If a spot is determined to be present in the cell the recovery process starts (or, in subsequent iterations, adds to) a series of digital data values with a value of 1, processing block 1808. If, alternatively, a spot is determined to be absent from the cell, the recovery process starts (or, in subsequent iterations, adds to) a series of digital data values with a value of 0, processing block 1809.

The next step, processing block 1810, determines whether to continue the loop. If all cells between the first marker and the next nearest markers have been tested for spots, the recovery process proceeds to processing block 1811. If cells remain to be tested for spots, the recovery process returns to the beginning of the loop at 1806, reiterating steps 1807 through 1810 for each cell.

For each further marker or set of markers, the recovery process repeats the process described and illustrated in steps 1801 through 1810. The recovery process first determines whether an additional marker exists, processing block 1811. The recovery process determines this by calculating the number of markers encountered, and comparing this number with the number of markers expected. The number of markers expected by the DEDS program is based on a calculation derived from the number of datasectors down, the number across, the number of spots across a single row in a single datasector, the number of rows of spots per marker, and the total size of the information in the printed pattern. If an additional marker exists, additional cells with data need processing to recover their data. The recovery process is repeated by first treating an adjacent marker as the primary marker of reference (described above as the first marker), processing block 1812, and then repeating steps 1801 through 1811. The preferable manner of choosing an adjacent marker is systematically. A preferred embodiment recovers an entire datasector before moving on to the next datasector. A row of datasectors (i.e., all datasectors across a datatile) are recovered before moving to the next row of datasectors. Within a datasector, the markers are chosen in a similar fashion—markers are sequentially chosen across an entire row, with rows sequentially chosen down the datasector.

In the preferred embodiment, all datasectors within a datatile are decoded in order to recover all data encoded in that datatile. In another embodiment, less than all datasectors are decoded. This further embodiment might be preferable when, for example, a particular application requires some, but not all data conveyed in a datatile and the datatile is designed such that data is encoded in a predetermined organized fashion and the particular application accesses particular datasectors to seek particular data. Such an embodiment would save time and computational resources relative to decoding the entire datatile. Such an embodiment can also be employed to supply a steady stream of data to an application such that datasectors are decoded and the application software is executed both on such a substantially contemporaneous basis as to be transparent to the user (e.g., where the application software is a video player, the video player displays a continuous stream of video derived from the datatiles). In one such embodiment, a substrate is scanned to create an image of the datatile and the locations of all markers in the datatile are determined and stored in the fashion described above by reference to the preferred embodiment. The further steps of locating cell centers and spots are performed only as to the currently desired datasector or datasectors.

In the preferred embodiment, the recovery process first exclusive-ORs the sequence of bits with precisely the same random sequence of bits that was employed in the encoding process, described above by reference to FIG. 2. Whether or not the sequence of bits is thus altered, the recovery process now reconstructs codewords from the sequence. The codewords are interpreted to produce the original data. The ultimate result of the recovery process is, then, a series of digital data values. The information expressed by this series of digital data values depends on the source of the recovery. In the case of recovery of data from a metasector, the series of digital data values represents the information contained in the metasector, primarily the format parameters used to encode the main body of data. In the case of the main body of data, the series of digital data values produced is the unprocessed data from which the method of decoding produces the original computer files or other digital data after further processing that includes decompression and, possibly, decryption.

The recovery process has further embodiments reflecting the different embodiments of the method of encoding. Where the method of encoding places multiple bits in each cell through the use of multiple colors (such as varying levels of gray), the recovery process preferably determines the centers of cells (i.e., the centers of possible spots) in a fashion described above but then determines not merely the presence of a spot at the cell's center but also the color of any spot present.

Where the method of encoding places multiple bits in each cell through the use of multiple spot sizes, the recovery process again preferably determines the centers of cells in a fashion described above but then determines not merely the presence of a spot at the cell's center but also the size of any spot present. In one embodiment, the size of a possible spot is preferably determined by first testing the center pixel of a cell (i.e., the pixel at the intersection of the lines through the column and row of the possible spot) to determine whether a spot exists. If a spot exists, this method of decoding then tests all contiguous pixels (i.e., pixels one pixel removed from the center pixel) and then, depending on the maximum size of possible spots, tests all pixels 2 pixels removed from the center pixel, and then retest pixels even further removed. This methodology can be applied to the datatile a portion of which is illustrated in FIG. 14. Cell 1409 contains a spot with a dark center and a gray border on all sides. The method first tests the center pixel, finding a dark spot. Depending on the printer/scanner resolution ratio, the method may continue to find dark pixels emanating out from the center pixel in the scanned image. Eventually, the method would encounter gray pixels. Having found both dark pixels at the center and gray pixels at the periphery, the method determines that the spot in cell 1409 represents the logical state expressed by a spot with a dark center and gray periphery. Spots such as those in cells 1402 and 1403 are determined by the dark pixels at the center and dark pixels on the periphery with the difference between the two spots determined by the number of pixels that are dark. Spots such as those in cells 1406 and 1407 are determined in a like fashion to the spots in cell 1402 and 1403 except that gray is found in the center and surrounding pixels. Adjustments obvious to those skilled in the art are made where the pixel determined to be at a possible spot's center is not in fact at the spot's exact center. For example, if the centroid pixel of a spot differs from the pixel determined to be at the intersection of the column and row containing the spot, the centroid pixel is used as the starting point instead of the pixel at the intersection.

In another embodiment, which can be applied where the datatile encodes multiple bits per cell by varying the size of spots or both the size and color of spots (other than variations of color based solely on intensity such as varying levels of gray scale), the method of decoding determines the intensity of each image pixel that may contain all or part of a particular spot, accumulates those intensities and compares the aggregate intensity to ranges of intensities that correspond to varying spot sizes to determine the size of the spot. Where various colors were also used in encoding (e.g., cyan, magenta, yellow and black), the method of decoding determines both an aggregate intensity and color.

Where the method of encoding employs multiple spot and cell sizes the recovery process is adjusted so as to determine each cell's center. The manner in which cell centers are determined would generally follow the recovery process described above except as adjusted to reflect the various sizes. Likewise, the recovery process is adjusted to reflect each of the other embodiments of the method of encoding where these requisite adjustments should be apparent to those skilled in the art of imaging.

FIG. 19 illustrates the recovery process as applied to a portion of an image of a digitally encoded substrate produced by one embodiment of the invention. It should be understood that FIG. 19 represents a substantially enlarged view for the purpose of illustrating the process. FIG. 19 references the following parts: columns 1901 of markers, the distance from markers to the closest possible spots 1902, spot 1903, cell 1904, center 1905 of the first marker, center 1906 of the next marker displaced horizontally, center 1907 of the next marker displaced vertically, line 1908 through the center of the top row of possible spots, line 1909 through the center of the second row of possible spots, line 1910 through the center of the first column of possible spots, line 1911 through the center of the third row of possible spots, and line 1912 through the center of the last column of possible spots. The substrate has markers located in the image of FIG. 19 in columns 1901 consisting of 4 markers at the right and left perimeters of the image. These markers have dimensions 3 printer pixels wide by 3 printer pixels high. The distance from markers to the closest possible spots 1902 equals 5. Each spot, such as spot 1903, is 3 printer pixels wide by 2 printer pixels high contained in a cell, such as cell 1904, which is 4 printer pixels wide by 3 printer pixels high. Each spot should be understood as occupying the precise center of its corresponding cell. Accordingly, each cell containing a spot has a blank border 0.5 printer pixels wide along the right, left, bottom, and top of the cell. Also, the lines through the centers of any rows or columns of possible spots are the same as the lines through the centers of any corresponding rows or columns of cells. The number of spots per segment, 15, is illustrated in FIG. 19 by the 15 cells, some with spots, some blank, located between the 2 columns of markers. There are 3 rows of possible spots between markers displaced vertically. The information concerning printer pixel sizes and distances, the number of rows between markers and the number of spots per segment is conveyed by the metasector of the preferred embodiment and is therefore known to the recovery process.

Having found the first marker, the recovery process finds the center of that first marker, here located at 1905. In the preferred embodiment, pixels are determined to be part of the marker by virtue of having a gray scale level below a threshold. The coordinates of the pixels contained in the marker are averaged after being weighted to determine the center of the marker. The recovery process then determines the center 1906 of the next marker displaced horizontally and the center 1907 of the next marker displaced vertically through the process described above in steps 1802 and 1803 of FIG. 18.

Having determined the centers of three reference point markers, the recovery process of the preferred embodiment uses that information, as well as information conveyed by the metasector, to determine the lines through the centers of the columns and rows of possible spot locations. If an image has no skew, the line 1908 through the center of the top row of possible spots is determined to be one-half printer pixel higher than the vertical pixel coordinates of the center 1905 of the first marker and the center 1906 of the next marker displaced horizontally. This determination of the central line through the row is made due to a number of factors. First, the top of the first row of possible spots in FIG. 19 is known to be at the same location as the top of the highest markers in FIG. 19, this feature having been established as a convention of the preferred embodiment. Second, while the markers are known to be 3 printer pixels high any spots are known to be 2 printer pixels high—both heights are conveyed by the metasector. The recovery process can accordingly infer that the vertical centers of any possible spots in the first row should be 1 printer pixel down from the tops of the spots (a spot height of 2 printer pixels divided in half) while the vertical centers of markers should be 1.50 printer pixels down from the tops of the markers (a marker height of 3 printer pixels divided in half). Because the tops of the spots are known to be at the same location as the top of the markers, the recovery process can accordingly infer that the vertical centers of the row of possible spots is 0.50 (i.e., 1.50–1.00) printer pixels higher than the markers' centers.

Because the adjustment of one-half pixel is expressed in printer pixels and the vertical pixel coordinates of the marker centers 1905 and 1906 are expressed in image (e.g., scanner) pixels, and printer pixel size may differ from image pixel size, the adjustment of one-half must be first multiplied by the image to printer pixel ratio to determine the actual adjustment in image pixels.

The ratio of image pixels to printed pixels is determined immediately after decoding the metasector. The dimensions of the metasector in image pixels (e.g., its overall length) are known after decoding it. In addition, the metasector internally expresses the multiple the metasector dimensions are, in printed pixels, of the "base" case (by convention, configured to be printed at 300 dpi, and scanned in at 400 dpi.). The ratio of image pixels to printer pixels is therefore the length of the metasector in image pixels, divided by the product of the multiple and the length of a metasector in printed pixels in the base case.

The recovery process determines the centers of subsequent rows of possible spots by reference to the relative printer pixel displacement from the top marker to the next marker displaced vertically. The recovery process first determines the printer pixels down from the center 1905 of the first marker to the center of each such subsequent row of possible spots. The recovery process determines this printer pixel distance by adding one-half the printer pixel spot height, the product of multiplying the printer pixel cell height by the number of rows down a particular row is from the top row, and subtracting one-half the printer pixel marker height. The recovery process would then determine the total printer pixels down from the center 1905 of the first marker to the center 1907 of the next marker displaced vertically. This is here determined to be 9 by multiplying the number of rows of possible spots between markers of 3 by the cell height of 3. A ratio of printer pixels down for each row to the total printer pixels down between centers 1905 and 1907 is then computed. The recovery process then determines the image pixels down between the centers of the first marker and of the next marker displaced vertically, 1905 and 1907, respectively. For each row, the recovery process multiplies the printer pixel ratio for the row by the total image pixels between centers 1905 and 1907. The result is the image pixels down for the central line through each such subsequent row.

If for example, the digitally encoded substrate was printed at 300 dpi and scanned at 600 dpi with no skew or imperfections, the line 1909 through the center of the second row of possible spots would be 5 image pixels down from the center 1905 of the first marker. The line 1909 through the center of the second row of possible spots is 2.5 printer pixels down from the center 1905 of the first marker. The recovery process determines this by adding 1 (one-half the printer pixel spot height of 2) plus 3 (printer pixel cell height of 3 multiplied by 1, the number of rows down from the first row to the second row), and then subtracting 1.5 (one-half the printer pixel marker height of 3). The total printer pixels down from the center 1905 of the first marker to the center 1907 of the next marker displaced vertically equals 9, rows per marker of 3 multiplied by cell height of 3. These conclusions regarding printer pixels are inferred from information conveyed in the metasector and therefore known by the recovery process. The ratio of the printer pixels down from the center 1905 of the first marker to the line 1909 through the center of the second row of possible spots to the total printer pixels down between the center 1905 of the first marker and center 1907 of the next marker displaced vertically equals 2.5:9. This ratio is then multiplied by the image pixels down between the centers 1905 of the first marker and 1907 of the next marker displaced vertically. The image pixels down between the centers 1905 of the first marker and 1907 of the next marker displaced vertically should equal 18 (a 600 dpi scan should produce a distance in image pixels double the printer pixels produced by a 300 dpi printer). Multiplying the ratio 2.5:9 by 18 image pixels results in a determination that the line 1909 through the center of the second row is 5 image pixels down from the center 1905 of the first marker. Thus, for example, if the center 1905 of the first marker has a vertical image pixel coordinate of 70 (i.e., 70 image pixels below the top edge of the image produced by the scanner), then the line 1909 through the center of the second row has a vertical image pixel coordinate of 75.

Having determined the lines through the centers of the rows of possible spots, the recovery process determines the line 1910 through the center of the first column of possible spots. The line through the center of each column of possible spots is determined by reference to two factors, first, the ratio of the printer pixel distance of that column's central line from the center 1905 of the first marker to the printer pixel distance from the center 1905 of the first marker to the center 1906 of the next marker displaced horizontally, and second, the image pixel distance from the center 1905 of the first marker to the center 1906 of the next marker displaced horizontally. The recovery process determines the line 1910 through the center of the first column of possible spots to be 8 printer pixels to the right of the center 1905 of the first marker. The recovery process makes this determination by using information conveyed in the metasector. The Marker Width parameter was set at 3, the Marker to Spot parameter was set at 5, and the Spot Width parameter was set at 3. Accordingly, the horizontal distance from the center 1905 of the first marker to the line 1910 through the center of the first column should equal the sum of one-half the marker width, 3×0.5=1.5, the marker to spot distance of 5 and one-half of the spot width, 3×0.5=1.5. This sum equals 8. For each subsequent column, the recovery process adds to this printer pixel distance of 8 the product from multiplying the printer pixel cell width of 4 by the number of columns the subsequent column is displaced from the first column. The recovery process then computes the total distance in printer pixels from the center 1905 of the first marker to the center 1906 of the next marker displaced horizontally. This computation is performed by summing the following distances measured in printer pixels as communicated by the metasector: the distance from the center 1905 of the first marker to the center of the first spot, 8 (8=0.5×printer pixel marker width of 3+the distance from markers to the closest possible spots 1902 of 5+0.5×printer pixel spot width of 3), the distance of 56 from line 1910 through the center of the first column of possible spots to the line 1912 through the center of the last column of possible spots (56=cell width of 4×14, the number of columns separating the centers of the first and last columns determined by subtracting 1 from the Spots per Segment of 15), and the distance from the center of the last spot to the center 1906 of the next marker displaced horizontally from the first marker of 8 (8=0.5×printer pixel marker width of 3+the distance from markers to the closest possible spots 1902 of 5+0.5×printer pixel spot width of 3). This sum equals 72. The recovery process then determines the total distance in image pixels from the center 1905 of the first marker to the center 1906 of the next marker displaced horizontally. The lines through the centers of the columns of possible spots, in image pixels displaced from the center 1905 of the first marker, are then determined by multiplying this total distance in image pixels by the ratio of the printer pixels from the center 1905 of the first marker to the line through the center of each column of possible spots to the total printer pixel distance from the center 1905 of the first marker to the center 1906 of the next marker displaced horizontally.

If, for example, the digitally encoded substrate was printed with a 300 dpi printer, scanned with a 600 dpi scanner, and the printing and scanning processes had no imperfections, the line 1910 through the center of the first column of possible spots should be 16 image pixels to the right of the center 1905 of the first marker. Thus, if the horizontal image pixel coordinate of the center 1905 of the first marker is, for example, 110 image pixels to the right of the leftmost edge of the image produced by the scanner, the line 1910 through the center of the first column of possible spots would have a horizontal image pixel coordinate of 126. The total distance from the center 1905 of the first marker to the center 1906 of the next marker displaced horizontally should be 144 image pixels, double the printer pixel distance of 72, because the scanned image should twice as large in pixels as the printout due to a scanner with twice the resolution. This distance of 144 image pixels is multiplied by the ratio 8:72 to determine the horizontal distance in image pixels from the center 1905 of the first marker to the line 1910 through the center of the first column of possible spots. The product, 16 image pixels, is added to the horizontal image pixel coordinate of 110 of the center 1905 of the first marker to produce the horizontal image pixel coordinate of 126 for the line 1910 through the center of the first column of possible spots. A similar methodology is employed to determine the lines through the centers of each subsequent column of possible spots.

Having determined the lines through the centers of rows of possible spots and the lines through the centers of columns of possible spots, the recovery process can then look to the intersection of the row and column central lines for each possible spot to determine if a spot is in fact present or absent. Accordingly, the recovery process can thereby determine one bit of the series of digital data values. These determinations may depend on contextual information. Thus, if all the spots in all surrounding cells are present (i.e., "on"), it may very well be that the cell is relatively dark, even though no spot is present. In such a case, an adjustment in the threshold for calling a bit on or off may reduce bit errors. The source code contains one methodology for making these determinations and adjustments.

If a nonrectangular spot has been defined, the center of that spot is preferably determined by looking to the centroid of the pixels of any such spot which might exist in a cell. If a nonrectangular cell has been defined, the center is preferably found by locating the cell in a manner similar to locating the center of a rectangular cell, discussed above (including adjustments made for cells placed diagonally), adjusting such determination where the centroid pixel of any spot in such cell is expected (based on what is known about how the cells and spots were formatted) to be different from the center pixel otherwise determined.

It should be understood that determining the centers of rows of possible spots and the centers of columns of possible spots can also be determined not by reference to the image pixel/printer pixel ratio but by reference to the ratios determined by dividing the number of rows or columns, as the case may be, that a particular row or column is displaced from a first reference marker by the total rows or columns, as the case may be, between markers. This ratio for each row or column is then multiplied by the total image pixel distance between markers to determine the image pixel displacement of each row or column from the reference markers. This method of determining the center of each row and each column performs most efficiently with an embodiment where there is no distance between markers and the nearest cells—i.e., the Marker to Spot parameter equals 0. For example, where the digitally encoded substrate is formatted and encoded such that there are 3 rows between markers (i.e., Rows per Marker equals 3), the total image pixel distance between the top of a first marker and the top of the next marker displaced vertically equals 21, the top of the first row of possible spots has the same vertical pixel coordinate as the top of the first marker, the image pixel distance between the top and bottom of each spot equals 6 and the vertical pixel image coordinate of the top of the first marker equals 156, the centers of each of the 3 rows can be determined by multiplying 21 by the ratios 0:3, 1:3, and 2:3, the products being 0, 7, and 14, and adding those products to 159 (the vertical pixel coordinate of the top of the first marker plus 50% of the image pixel distance from the top to the bottom of each spot). Thus, the centers of the 3 rows would be at vertical image pixel coordinates 159, 166, and 173.

While the recovery process preferably determines the centers of cells and the existence of spots through processes rendered by a computer from an electronic image of a datatile, it should be understood that the recovery process can be employed without reference to an electronic image. Instead, the distinct features of a datatile (e.g., markers and spots) are determined by measuring distances. Distances are preferably determined entirely through automatic means (i.e., without any human intervention). In one such embodiment, a microscope coupled with a measuring device constitutes a mechanical means that automatically determines distance by sensing areas of differing reflectivity. Visual inspection of a datatile provides information from which to conclude the locations of datatile features such as landmarks, markers, cells, and spots, and these conclusions are then used to derive the series of digital data values which can, if appropriate, be used to manually derive some further information, such as text. Visual inspection follows the steps described in FIG. 18, and generally follows that part of the process described by reference to FIG. 19 that involves distances generally and not printer or image pixels or conversions of printer pixel coordinates and distances to image pixel coordinates and distances, it being understood that in a visual inspection embodiment there is no image of a datatile other than the printed datatile itself, and determination of printer pixels (instead of actual markers, spots, etc.) by visual inspection may be cumbersome and unnecessary. A method of decoding employing measurement of distances enjoys many of the same benefits of the preferred embodiment, including use of the metasector to communicate the format parameters used for encoding.

A visual inspection embodiment of the method of decoding preferably determines the lines through the centers of rows and columns by reference to actual distances, such as distances in microns. According to this embodiment, and assuming the top of the first row of possible spots next to a first marker has the same vertical coordinate as the top of that first marker, the lines through the centers of rows are determined by first measuring the distance from the top of that first marker to the next marker displaced vertically and dividing that measurement by the number of known rows of cells between each marker and the next marker displaced vertically. The result of this division is multiplied by the number of rows that a row is down from the first row next to the first marker. That product is then added to the sum of one half the spot height plus the vertical coordinate of the top of the first marker. If the assumption that the top of the first row of possible spots has the same vertical coordinate as the top the first marker is invalid, appropriate adjustments are made for each row by adding the distance between the top of the first marker and the top of the first row of possible spots.

Lines through the centers of the leftmost and rightmost columns are preferably determined by visual inspection—through mechanical means locating the vertical centers of the top and bottom spots in each of those columns and drawing, physically or conceptually, a line through those spot centers. The lines through the centers of columns in between the first and last columns are determined by measuring the distance between the lines through the centers of the first column of possible spots and the last column of possible spots, dividing that distance by the result derived by subtracting one from the known number of columns between markers, and multiplying that product by the number of columns that each column is horizontally displaced from the first column. The product from that multiplication indicates the distance that the line through the center of each column is horizontally displaced from the center of the first column of possible spots. This system of determining column centers more accurately accounts for printing distortions.

Determinations of the numbers of rows and columns known to exist between markers can be made either through visual inspection by mechanical means or, preferably, by first decoding information conveyed by the metasector.

The visual inspection embodiment as described in general above can be understood more particularly as following a series of steps applied for each grouping of cells between markers. The steps below are applied to a datatile where a known number of rows exists between the top of each marker and the top of the next marker displaced vertically, and where a known number of columns exists between the left side of each marker and the left side of the next marker displaced horizontally, this knowledge being best conveyed by the metasector.

1. Locate a first marker bordering a first grouping of contiguous cells.
2. Determine the vertical coordinate of the top of the first marker.
3. Locate a second marker being the nearest marker displaced vertically from the first marker.
4. Measure the distance from the top of the first marker to the top of the first row of spots.
5. Locate a third marker being the nearest marker displaced horizontally from the first marker.
6. Determine the height of each spot. This knowledge may also be conveyed by the metasector.
7. Determine the lines through the centers of each of the rows of cells by measuring the distance from the top of the first marker to the top of the second marker, dividing that distance by the number of rows of cells known to exist between markers, and for each of the known number of rows, adding to the vertical coordinate of the top of the first marker the sum of one-half the height of each spot plus the distance from the top of the first marker to the top of the spots in the first row, plus, for each row of cells, the product from multiplying the result of the division by the number of rows that that row of cells is vertically displaced from the first row of cells.
8. Determine the lines through the centers of each of the columns of cells by determining the lines through the centers of the rightmost and leftmost columns of cells located between the first marker and the third markers, determining the horizontal coordinate of the line through the center of the leftmost column of cells, determining the distance between the lines through the centers of the rightmost and leftmost columns of cells between the first marker and the third marker, dividing that distance by the result derived by subtracting one from the number of columns known to exist between markers, and, for each column, multiplying the result of that division by the number of columns that the column is horizontally displaced from the leftmost column, and adding that product to the horizontal coordinate of the line through the center of the leftmost column of cells.
9. For each cell, determine the location of the cell as being the intersection of the lines through the centers of the cell's corresponding row and column.

Thus, the location of each cell located between each set of markers (a set of markers being three markers—a marker and the next marker displaced vertically and the next marker displaced horizontally) can be determined through the above steps. These steps would be applied for each set of markers in the datatile. Having determined the locations of all cells, the method of decoding would then determine the contents of the cells to determine the series of digital data values.

The above methodology can be applied to the enlarged portion of a digitally encoded substrate illustrated in FIG. 19. If, for example, the distance between the top of the first marker and the next marker displaced vertically equals 900 microns, that distance is divided by 3, the number of rows known to exist between markers, that number being known by virtue of being communicated in the metasector. The result, 300 microns, is multiplied by the number of rows that each row is down from the first row next to the first marker—i.e., 0 for the first row, 300 microns for the second row, and 600 microns for the third row. If each spot is known to have a height of 200 microns, one-half of this height, i.e., 100 microns, is added to the products for each row to determine the distance that the lines through the centers of rows are from the top of the first marker. Accordingly, the line 1908 through the center of the first row of possible spots is 100 microns below the vertical coordinate for the top of the first marker. Line 1909 through the center of the second row of possible spots is 400 microns below the vertical coordinate of the top of the first marker. Line 1911 through the center of the third row of possible spots is 700 microns below the vertical coordinate of the top of the first marker.

The embodiment then determines the lines through the centers of columns of possible spots. Visual inspection through mechanical means should determine the line 1910 through the center of the first column of possible spots and the line 1912 through the center of the last column of possible spots. If, for example, the distance between lines 1910 and 1912 equals 5,600 microns, that distance is divided by 14, the number of known columns between markers, 15, less one. The result of that division, 400 microns, is multiplied by the number of columns that each column is horizontally displaced from the first column of possible spots. Accordingly, lines through the centers of the first five columns of possible spots, for example, are 0, 400, 800, 1,200, and 1,600 microns horizontally displaced from the line 1910 through the center of the first column of possible spots.

Other embodiments of the method of decoding involving visual inspection determine the lines through the centers of possible rows and columns through other means. In one such embodiment, the centers are determined entirely by visual inspection—e.g., by visually observing through mechanical means patterns of spots, the location of each cell is possible and determination of the presence or absence of a spot is thereby possible without measuring distances.

The process above for recovering data from a digitally encoded substrate, a portion of an example of which is illustrated in FIG. 19, assumes that cells have been formatted into horizontal rows and vertical columns and that the printing and scanning processes produced little or no skew. The recovery process of the preferred embodiment makes adjustments for diagonal formatting or unintended skew. The recovery process makes such adjustments by determining the lines through the centers of rows of possible spots and the centers of columns of possible spots where both such lines are diagonal or skewed, expressed as having both vertical and horizontal displacements. The method of determining relative distances in printer pixels is the same as though no skew existed. These ratios are then applied to displacements between markers that are both vertical and horizontal. The line through the center of a row of possible spots is a diagonal or skewed line parallel to a line between the centers of a first marker and the next marker displaced primarily horizontally, but partially vertically. The line through the center of a column of possible spots would be a diagonal or skewed line parallel to a line between the centers of a first marker and the next marker displaced primarily vertically, but partially horizontally. In the case where cells are at perfect 45 degree angles to each other, the recovery process treats series of cells as though occurring in rows and columns, where the lines through the centers of rows and columns have equal horizontal and vertical displacements.

Figure 20:
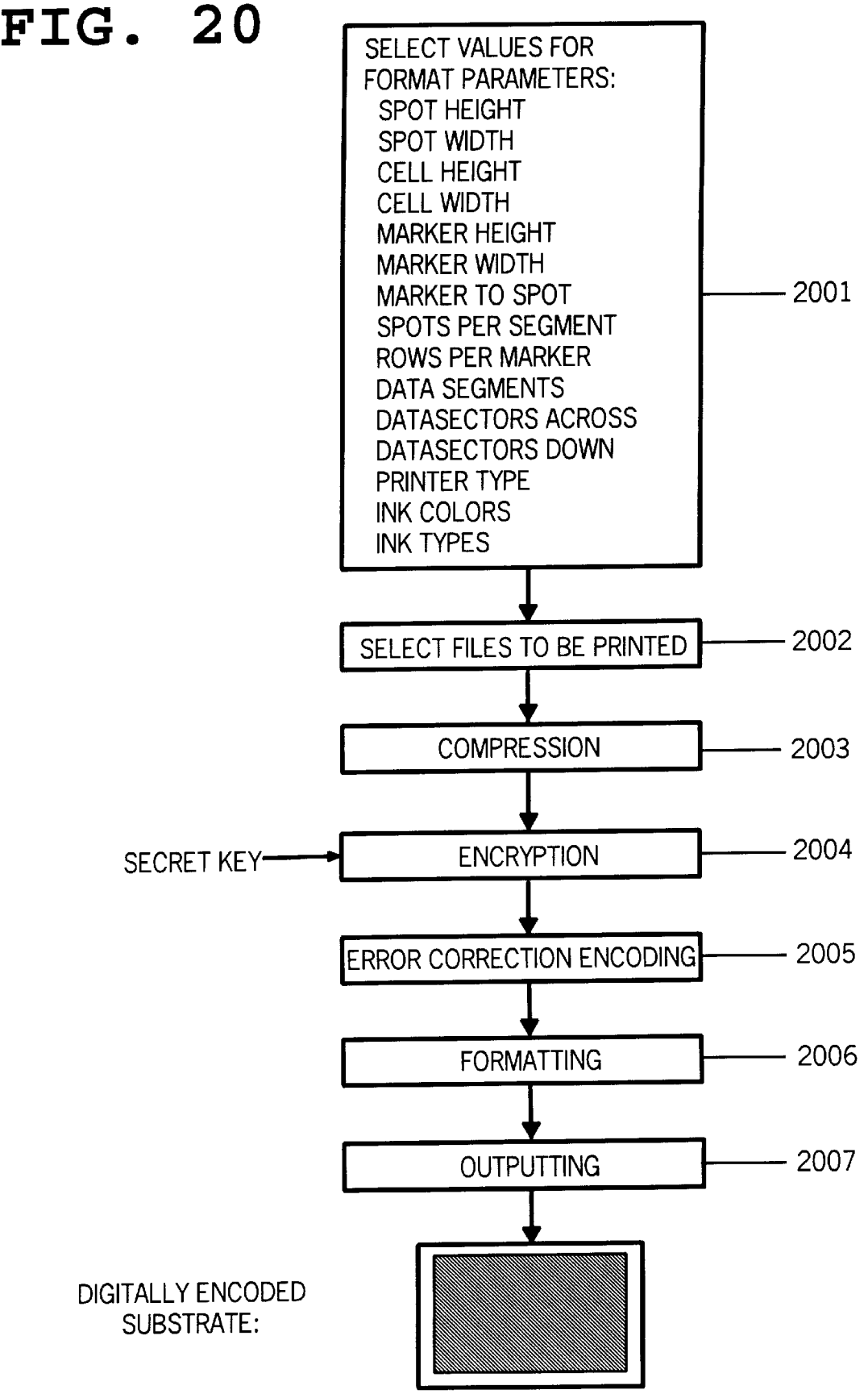
FIG. 20 is a block diagram illustrating a further embodiment of the method of encoding in which the digital data is subjected to encryption prior to encoding.

In a further embodiment, encryption and decryption may be integrated into the methods of encoding and decoding of the invention. FIG. 20 illustrates the method of encoding of this further embodiment. Note that in one embodiment of the method of encoding, this would occur after the compression of the digital data (processing block 2003). Note that each of the processing blocks in FIG. 20 are performed as their similarly named counterparts in FIG. 2, with the exception of encryption processing block 2004.

In one embodiment, encryption is provided by exclusive-ORing the initial data with a pseudo-random sequence generated using a secret key as a seed. Note that in this case, the decryption process (as described below) is simply exclusive-ORing the data with the same pseudo-random sequence. Note that this type of encryption process is not a perfectly secure method of data encryption because of the short key length used to seed pseudo-random sequences and the fact that the same key is likely to be used on more than one message. There are well-known methods to attack this type of encryption.

In order to obtain secure data through encryption, a one time pad can be employed in place of the pseudo-random sequence. A one time pad comprises a series of randomly generated bits that are known to both parties (i.e., the "encrypting" party and the "decrypting" party) and is only used once in the encryption process. In a one time pad, the key length is equal to the message length and may be more than 100,000 bits. Since the one time pad is used once, it is not susceptible to the same attacks which are used on pseudo-random sequences.

In another embodiment, encryption processing could be performed using the digital encryption standard (DES) or the RSA algorithm In the RSA algorithm, digital data is encrypted using two prime numbers which are multiplied together, as is well-known in the art. It should be noted that any digital encryption method may be employed with the present invention.

In the preferred embodiment, one method of encryption is used. In a further embodiment, the user can choose, as a further format parameter, from a variety of encryption methods.

Figure 21:
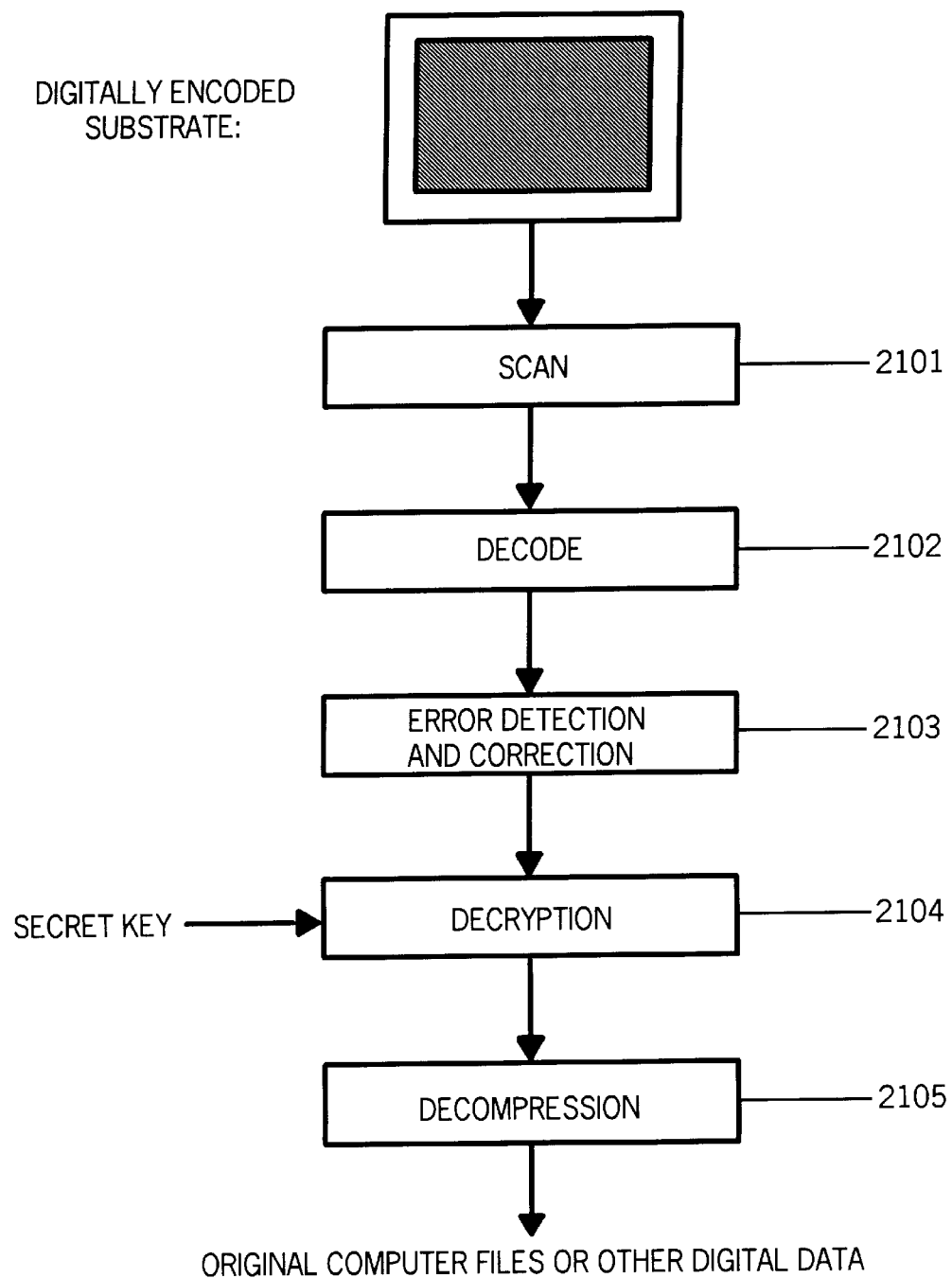
FIG. 21 is a block diagram illustrating the addition of decryption to the method of decoding where the method of encoding included encryption prior to encoding.

If encryption is integrated into the method of encoding, then decryption must be included in the method of decoding. One embodiment of the method of decoding of the present invention that includes decryption is shown in FIG. 21. Note that each of the processing blocks in FIG. 21 are performed in the same manner as their similarly named counterparts in FIG. 16, with the exception of decryption processing block 2104. After error detection and correction, the data undergoes decryption (processing block 2104). The decryption processing 2104 is the inverse of the encryption applied in the method of encoding (FIG. 20). In one embodiment, the decryption process requires the use of the same key used during encryption. By using the same key, the original data is recreated.

When the methods of encryption (and decryption) of the present invention are being integrated into the methods of encoding and decoding, the present invention also provides data information to be transferred using plain paper in a manner which preserves its privacy, authentication and/or limited accessibility. In the present invention, this privacy can easily be obtained through the use of a key or code known to the user(s) when encryption and decryption of a document occurs. Another useful application of the present invention is the authentication of a document. Specifically, the present invention could be used to authenticate signatures on paper documents or facsimile transmissions. A further use of the present invention is to limit access to a selected audience. Information could be widely published, as in, for example, newspapers or other mass media, with access limited to those designated to receive the secret key where such designation could occur before or after the encryption process. These keys could be distributed, for example, pursuant to subscriptions or some other method of raising revenue.

Methods of Transmitting Digital Data

Figure 22:
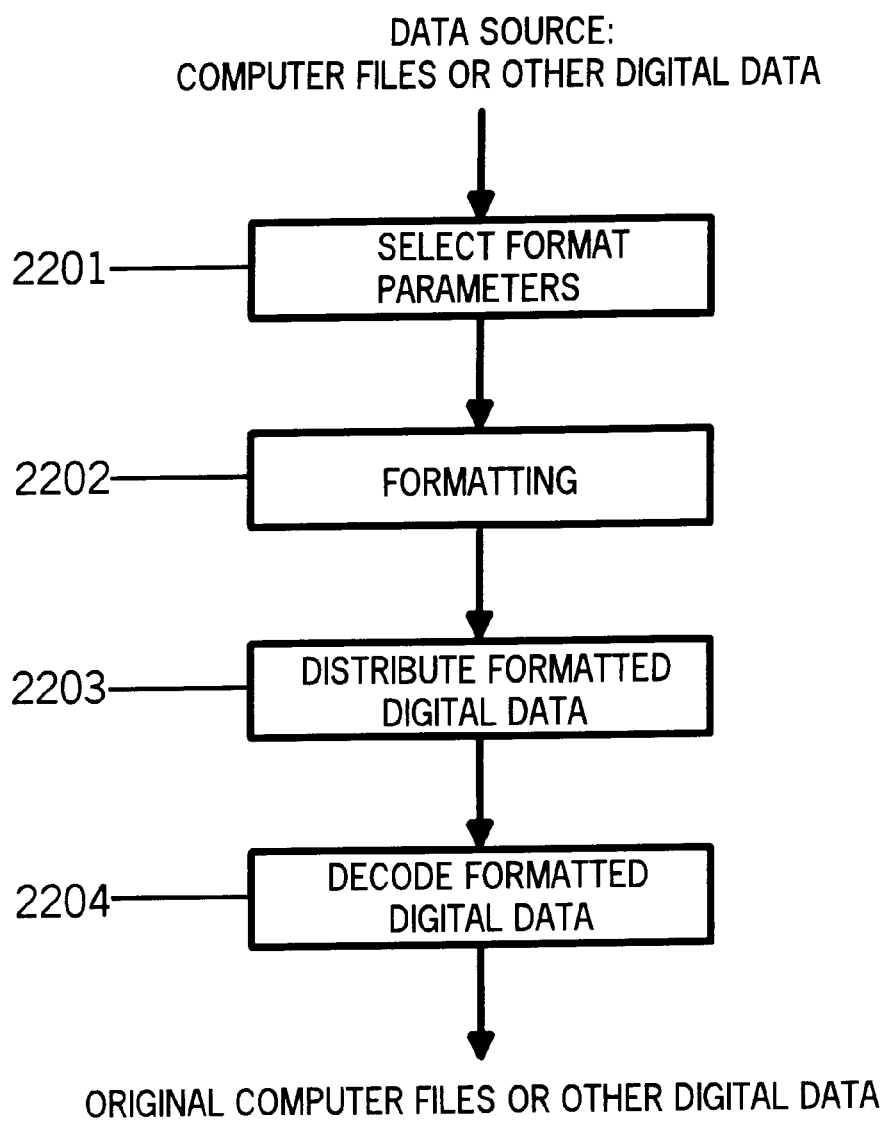
FIG. 22 is a block diagram describing a method of transmitting digital data.

FIG. 22 is a block diagram illustrating a method of transmitting digital data. A data source provides computer files or other digital data. The method of transmitting digital data selects format parameters (step 2201) for the formatting 2202 of the computer files or other digital data. Formatting 2202 formats the computer files or other digital data into a series of digital data values and formats that series of digital data values into a series of cells where each cell contains at least one bit of information from that series of digital data values. Formatting 2202 is done in accordance with the format parameters selected in step 2201. In the preferred embodiment formatting 2202 includes defining a cell size (i.e., width and height), and a spot size (i.e., width and height), such sizes defined as pixels of the encoding device, whether a printer, a facsimile machine, a fax/modem using facsimile software, or some other encoding device. The dimensions of a cell in the preferred embodiment are at least as large as the corresponding dimensions of any spot that might occupy the cell. It should be understood that the details concerning the computer files or other digital data, selection of format parameters (step 2201), and formatting 2202, are generally the same as the method of encoding described and illustrated above, including as described by reference to FIG. 2.

Formatted digital data is then distributed, step 2203. The manner of distribution may include any manner for the distribution of digital data in electronic or physical form.

Embodiments of electronic distribution include facsimile, satellite transmission, telephonic transmission, cable transmission, and high speed line transmission (such as T1 or ISDN). Embodiments of physical distribution include postal delivery, hand delivery, courier or other contract delivery service as well as any other means for moving the digitally encoded substrate. In the case of physical distribution, the formatted digital data is first encoded onto a substrate, where the manner of producing the substrate is as described above, including as illustrated in and described by reference to FIG. 2.

Step 2201 preferably selects format parameters optimal for the means of distribution used. The DEDS program source code stores the appropriate format parameters in lookup tables in the setdefs.c file. Transmission by facsimile machine typically requires larger spot and cell sizes than transmission by fax modem. Where the manner of distribution is more likely to introduce damage to the formatted digital data, format parameters should reflect larger spot and cell sizes than less damaging means of distribution. Distribution by printing and physical distribution may require larger or smaller spot and cell sizes than electronic distribution, depending on the printer/scanner combination, the electronic distribution method or other factors. Thus, the selection of format parameters allows flexibility to consider not only the manner of encoding and decoding but also the manner of distribution.

Once the formatted digital data is distributed, the recipient decodes that formatted digital data, step 2204. The details of the decoding are as described above in the method of decoding, including as illustrated in and described by reference to FIGS. 16, 17, 18, and 19. In the case of physical distribution and in the case of facsimile transmission to a facsimile machine, step 2204 of the preferred embodiment includes first scanning the digitally encoded substrate to produce an image which is then decoded. In the case of electronic distribution of the formatted digital data, step 2204 of the preferred embodiment does not require an initial scan because the digital data is already in electronic form. In any case, step 2204 of the preferred embodiment decodes the formatted digital data from an electronic image of that formatted digital data. A preferred embodiment of decoding step 2204 is that method described by reference to and illustrated in FIGS. 17, 18, and 19, and, where formatted digital data has been placed on a substrate, FIG. 16. The result derived from step 2204 is the original computer files or other digital data.

Figure 23:
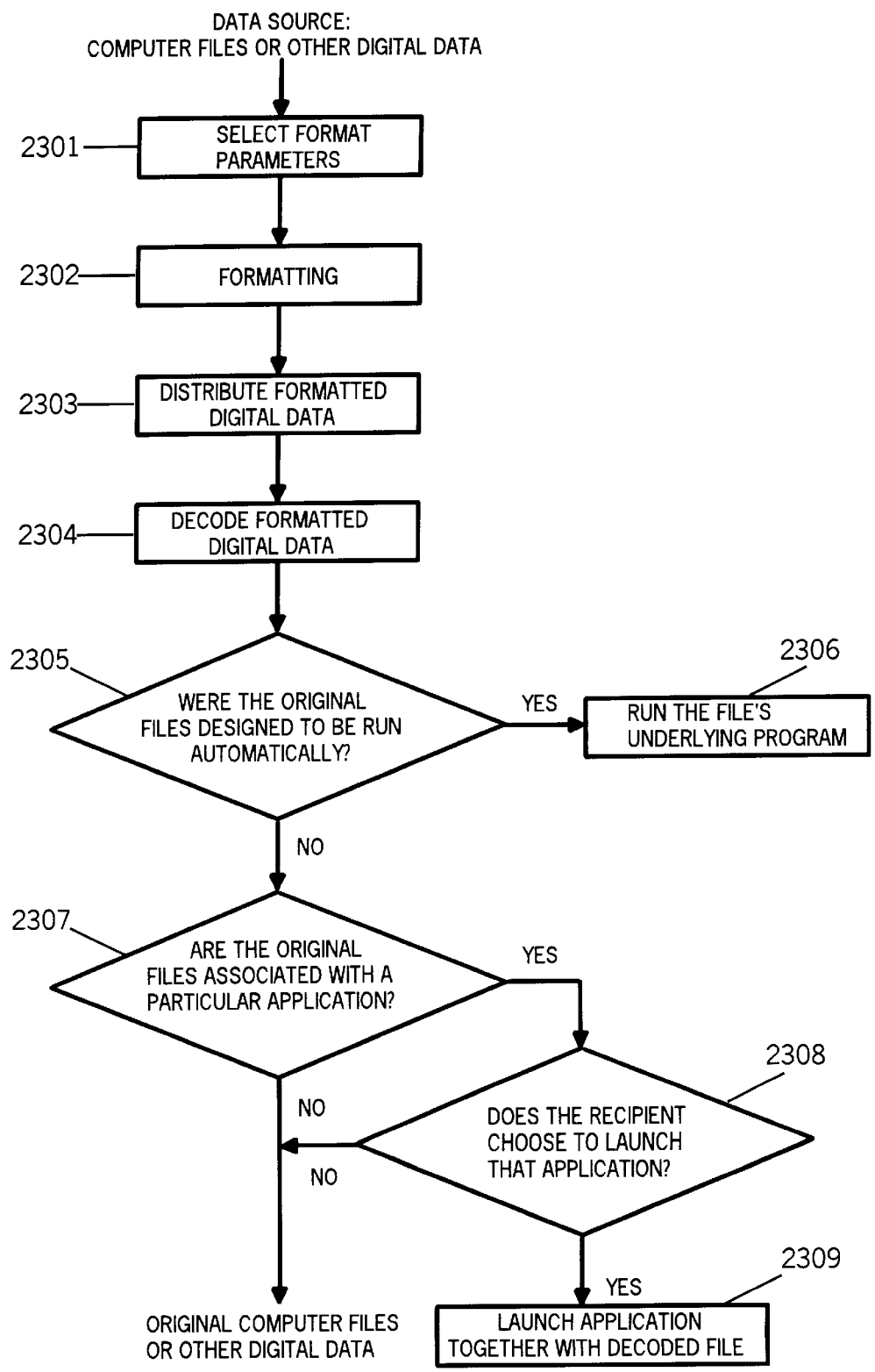
FIG. 23 is block diagram describing a method of transmitting digital data involving immediate use of the digital data transmitted on the substrate.

FIG. 23 illustrates in further detail the preferred embodiment of a method of transmitting digital data. The initial processes are similar to the steps illustrated in FIG. 22 and described above. The initial source of digital data is preferably computer files stored on the fixed disk drive of a personal computer, but could also be other sources of digital data such as a floppy disk, or another digitally encoded substrate. The computer files contemplated include data files not associated with any particular application software, data files associated with a particular application software, and executable files, i.e., files that perform functions once invoked. The method of transmitting digital data then provides for selection of format parameters, step 2301, and formatting, step 2302, these steps being the same as those described as steps 2201 and 2202, above.

The formatted digital data is then distributed (step 2303). The recipient of the digitally encoded substrate then subjects the digitally encoded substrate to decoding process 2304. Decoding process 2304, comparable to step 2204 discussed above, is as described in detail and illustrated above.

The preferred embodiment of the method of transmitting digital data then determines (process step 2305) whether the original digital data included a computer file designed to be run automatically following decoding. Whether a computer file is designed to be run automatically is a matter originally determined by the person creating the original file, quite possibly the person producing the formatted digital data. If it is an independently executable DOS/Windows® file (Windows is a product of Microsoft Corporation of Redmond, Wash.), then it has a distinct file name extension, such as ".exe". Furthermore, the program will be automatically executed if a flag in the header portion of the first datasector is so set. In the preferred embodiment, the person producing the formatted digital data has the option to select setting of this flag. For example, the computer file may be communications software that activates the recipient computer's modem, places a telephone call to a pre-designated electronic bulletin board (or other remote computer such as a network server or Internet service provider), establishes a connection between the recipient's computer and the electronic bulletin board (or other remote computer), and downloads a further computer file from the electronic bulletin board (or other remote computer) to the recipient's computer.

If process step 2305 determines that the original digital data includes a computer file designed to be run automatically, step 2306 commences execution of that computer file. Execution of the computer file may also follow or precede the storing on the recipient computer's fixed disk other computer files contained within the datatile, possibly including files available for the automatically executed file. It should be understood that an application launched automatically may be stored and operated solely on the recipient's computer, or may be an application all or part of which involves establishing communication with other computers. Thus, for example, the application launched automatically may be a communications program that activates the recipient computer's modem to telephone a remote computer and establish a connection with that remote computer, and then turn control over to the recipient of the datatile for further action. As a further example, a datatile contains both a computer file of a document and instructions to automatically print the document on the printer attached to the recipient's computer. Thus, the recipient gets a hardcopy printout of the underlying document through a minimum of effort.

If, alternatively, the datatile does not include a computer file designed to be launched automatically, the method of transmitting digital data determines whether the datatile contains files associated with a particular application (process step 2307). A file can be associated with a particular application when that file has been created by a particular application software or can be run by a particular application software. If the file is intended to be executed as input into an application, the appropriate application is also determined in Windows by the file name extension, along with standard mappings from extensions to applications (this mapping is stored in the win.ini file). For example, a file with the name "letter.wri" is typically assumed to be a Microsoft® Write document, as it ends with the extension ".wri", and that is usually mapped in win.ini to Microsoft Write. Similar to the process for automatically executing a file, if a file is intended to be launched as part of an application, a flag in the header portion of the first datasector is set, with the setting preferably being selected by the user. For example, a word processing software package is an application software that creates files containing documents.

If that document file is associated with the word processing software and if the word processing software is pre-installed, choosing to open the document file actually launches the word processing software and then loads (i.e., opens within the word processing software for further processing) the document file. If the datatile contains a file associated with a particular application, and if the recipient's computer has that particular application software pre-installed, and if the recipient chooses to launch the application software (process step 2308) then step 2309 commences execution of the application software and loads the associated file contained in the datatile. Alternatively, the recipient's computer produces the original computer files or other digital data for purposes such as being stored on the recipient computer's fixed disk.

Figure 24:
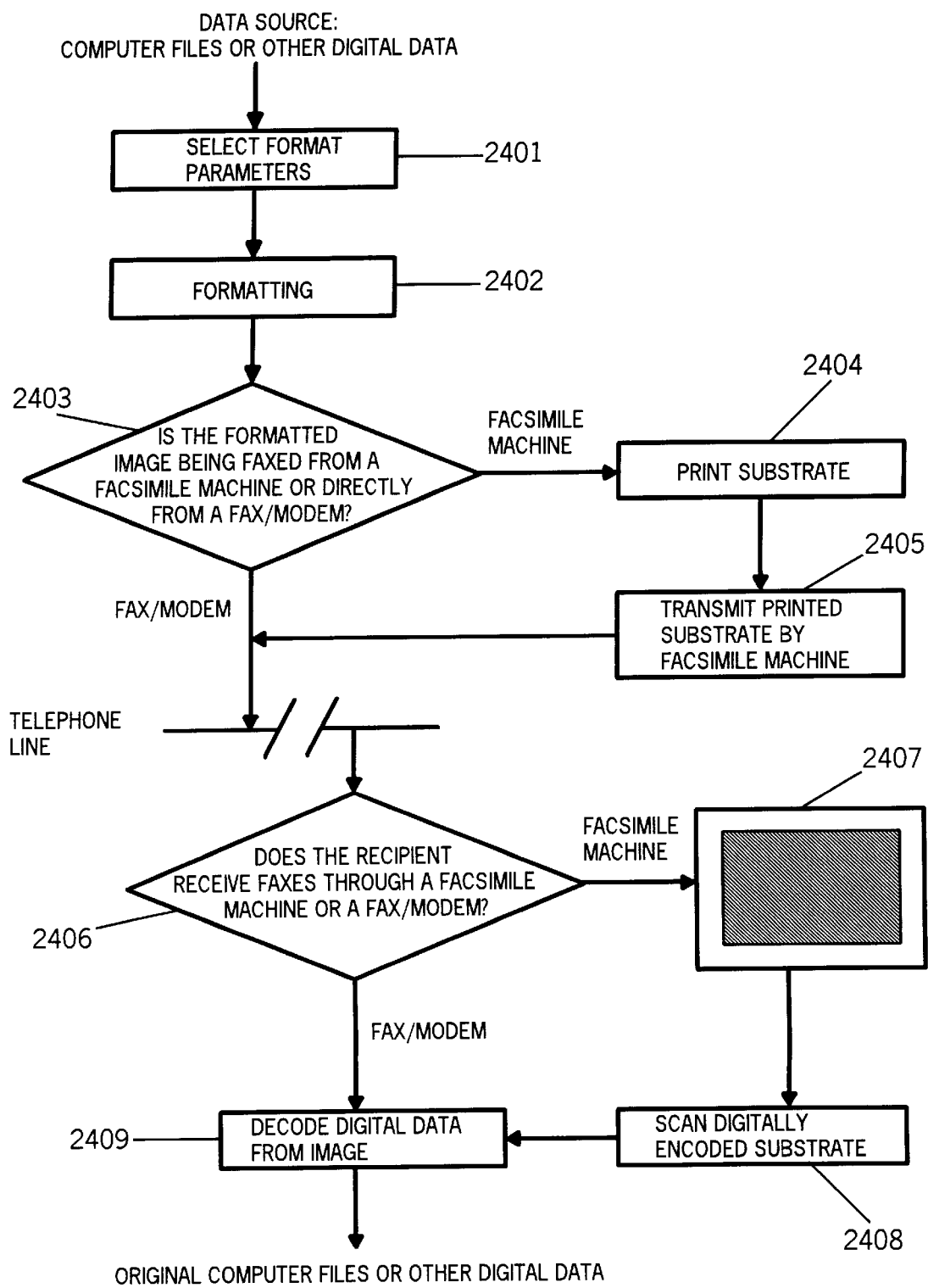
FIG. 24 is a block diagram describing a further embodiment of a method of transmitting digital data, including transmission of a digitally encoded substrate, that method being by facsimile transmission.

FIG. 24 is a block diagram of a further embodiment of the method of transmitting digital data, one which includes facsimile transmission. The data source can be computer files or other digital data. It should be understood that the nature of computer files or other digital data is not limited in scope and can include any source described previously for other embodiments such as files that can be launched automatically or files associated with a particular application software that can be launched automatically. The method of decoding then provides for selection of format parameters, step 2401, and formatting, step 2402, these steps being the same as those described as steps 2201 and 2202, above.

The present embodiment, contemplating transmission of digital data by facsimile transmission, then determines in step 2403 whether the person transmitting digital data transmits by facsimile machine or, alternatively, by fax/modem connected to a computer. If the transmission is by fax/modem, the digital data as formatted in step 2402 is transmitted over a telephone line consistent with the method of transmitting any computer generated image by fax/modem. If, alternatively, the person transmitting digital data uses a fax machine, the digital data formatted in step 2402 is printed onto a substrate, step 2404. That digitally encoded substrate is then processed in step 2405 through a facsimile machine, the processing comprehending those same sub-steps exercised in any facsimile machine transmission: feeding the document, in this instance the digitally encoded substrate, into the facsimile machine, entering the telephone number and causing the facsimile machine to dial the inputted number. Whether by facsimile machine or through a fax/modem, the transmission sent over a telephone line is fundamentally the same—an image of a datatile one example of which is illustrated in FIG. 8. It should be noted, however, that minor differences might occur as a result of different format parameters. It should also be noted that a further embodiment comprehends, based on the sender's knowledge (or information available to the sender's computer), determined in advance or determined contemporaneously, of the recipient's currently activated equipment, the possibility of direct transmission of digital data from modem to modem. In those instances where possible and advantageous, this further embodiment employs direct modem to modem transmission in order to achieve transmission speeds faster than by facsimile transmission through a fax/modem. The digital data sent pursuant to this further embodiment is either the formatted digital data or the original computer files or other digital data.

The image of formatted digital data having been sent by facsimile transmission, process step 2406 of the present embodiment then determines, at the recipient's end, whether the recipient receives facsimile transmissions by facsimile machine or, alternatively, through a fax/modem connected to a computer. If the recipient receives facsimile transmissions by fax machine, the formatted digital data as transmitted through the telephone line is printed by the facsimile machine, producing a digitally encoded substrate 2407. Digitally encoded substrate 2407 is then scanned, process step 2408, using a scanner connected to a computing device capable of producing an image in electronic form of the digitally encoded substrate 2407 (the scanner used for this purpose may include the fax machine itself where the fax machine first receives a transmission and prints the substrate and the recipient then feeds the substrate back through the fax machine sending an image of the substrate to a computer through the computer's fax/modem). The image of the digital data, whether produced by facsimile machine and scanned into electronic form or instead received by fax/modem directly in electronic form, is decoded in step 2409, such decoding being as described and illustrated above, including the method illustrated in and described by reference to FIGS. 16, 17, 18, and 19. In the present embodiment the result of the decoding process 2409 is the reconstruction of the original computer files or other digital data. In further embodiments, the result is the automatic launching of executable files or the automatic launching of an application software with the transmitted file loaded within that application software, it being understood that the embodiment illustrated in FIG. 24 involves additional means of transmitting digital data that does not in any way limit what can be done with that digital data once decoded.

In a further embodiment of a method of transmitting digital data incorporating the facsimile transmission in accordance with the method illustrated by FIG. 24, digital data is sent through a fax back system. In accordance with this embodiment, a person desiring to receive digital data telephones a number established by a person that desires to distribute the digital data. The person desiring to transmit digital data connects the telephone line to a fax/modem connected to a computer or other means capable of both receiving input from a touch tone telephone and then sending out a facsimile transmission. The person desiring to receive digital data, having established a telephone connection, inputs information by use of touch tone telephone signals, such information including, at a minimum, the facsimile number of the person desiring to receive digital data and, if a choice is available, the digital data desired. The computer or other means capable of both receiving touch tone telephone input and transmitting facsimile transmission, then telephones (without further human intervention) the facsimile telephone number of the person desiring to receive digital data and establishes a facsimile connection with the facsimile means of the person desiring digital data. Having established this facsimile connection, the computer or other means capable of both receiving touch tone telephone input and transmitting facsimile transmission, transmits an image of the formatted digital data in accordance with embodiments of the invention described previously. A similar embodiment employs a fax-on-demand capability—the image of formatted digital data is transmitted by facsimile during the telephone call placed by the person desiring to receive digital data.

In a further embodiment of the method of transmitting data, information recorded on a substrate includes digital data as well as human readable information where the digital data includes one or both of data needed to have the computer display appear the same or similar to the human readable information appearing on the substrate and data that causes information to appear on the computer display together with hyperlinks to further sources of information.

Figure 25:
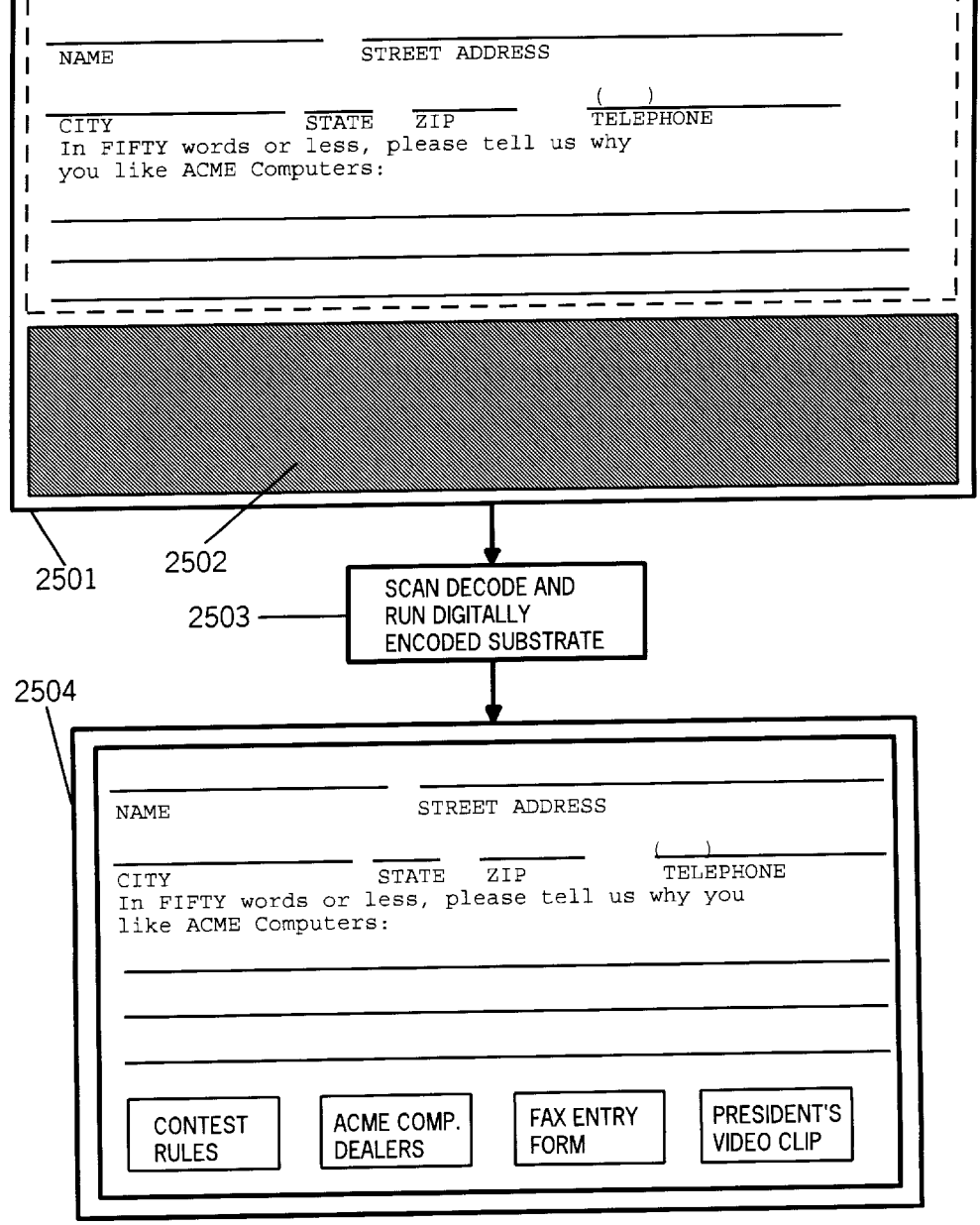
FIG. 25 illustrates a further embodiment of the invention in which both machine readable encoded digital data and human readable text and graphics are placed on the substrate and in which the encoded digital data is designed to cause a computer to reproduce on the computer's display the human readable text and graphics placed on the substrate as well as allow context sensitive interaction with the computer.

FIG. 25 illustrates an example of a substrate and the process according to this embodiment. A paper substrate 2501 has printed upon it human readable text and graphics as well as encoded digital data. Paper substrate 2501 represents how the embodiment might be used for marketing purposes as in marketing flyers, advertising appearing in print media or other marketing materials. More particularly, the printed paper has three main components. First, at top, human readable text informs the reader of the purpose of the marketing material and the contents of the encoded digital data. Second, in the middle of paper substrate 2501, surrounded by a dashed line, an entry form prompts the reader for the information needed to enter a contest. Third, at the bottom, a datatile 2502 includes encoded digital data.

The reader of paper substrate 2501 may then process (step 2503) the datatile, it being understood that the reader may also proceed to enter the contest by manually completing the entry form as printed without use of a computer and without processing 2503 of the datatile. Processing 2503 includes the substeps of scanning, decoding and running of the datatile, which substeps are as further described and illustrated above.

Datatile 2502 in paper substrate 2501 would preferably include a computer file designed to be run automatically upon completion of the decoding process of the invention. The computer file could be composed using, for example, hypertext markup language (HTML). Datatile 2502, once scanned, produces an image 2504 on the computer display (e.g., 2504 represents a computer monitor with the image as the user would see it). Image 2504 has two primary components. First, image 2504 duplicates on the computer display the entry form appearing on paper substrate 2501. Datatile 2502 preferably contains or invokes word processing software allowing the reader to enter and edit through keyboard input the information needed to enter the contest. Second, image 2504 contains at its bottom a series of "icons", delineated areas of the display which, if the user selects by click of a mouse or otherwise, causes the computer to commence some further action. The datatile is encoded with digital data that includes means for navigating to the subsets of information indicated by each icon illustrated in image 2504. In the instance of image 2504, there are 4 icons. The first, labeled "CONTEST RULES", will, when selected by the user, cause the computer to erase the current image on the display and in its stead produce an image of the contest rules. The second, labeled "ACME COMP. DEALERS", will, when selected by the user, cause the computer to erase the current image on the display and in its stead place an image of a list of Acme computer dealers on the display. The third, labeled "FAX ENTRY FORM", will, when selected by the user, cause the computer to activate its fax/modem and send a facsimile transmission of an image of the entry form appearing on the display, as altered by the user with keyboard input. The fourth, labeled "PRESIDENT'S VIDEO CLIP", will, when selected by the user, cause the computer to erase the current image on the display and in its stead commence a video clip on the display. Thus, FIG. 25 illustrates an embodiment including both automatic links to further sources of data and "reverse WYSIWYG"—i.e., instead of printing on paper the image appearing on a computer display (What You See Is What You Get), the image printed on paper appears on the computer's display. This feature is accomplished by virtue of the datatile being encoded with instructions such that displaying means will display an image comparable to the human readable information printed on substrate 2501.

It should be understood that the digital data of each underlying icon application may derive from the datatile, from some other source including other digitally encoded substrates, remote computers connected telephonically by modem, compact disks, hard disk, floppy disk, or from a combination of the datatile and another source. For example, referring back to FIG. 25, selecting "CONTEST RULES" may cause the computer to produce on its display a list of contest rules derived from the datatile while selecting "PRESIDENT'S VIDEO CLIP" may cause the computer to access a video clip from a compact disk, or to instead search for and access the video clip from various alternative sources—for example, first determining whether the video clip exists on the computer's hard disk, looking next on a compact disk, then invoking telephonic communication with an online service, bulletin board, an internal or external network or the Internet, accessing the video clip from the first available source. In one embodiment, uniform resource locators (URLs) are used in the instructions directing the computer to access digital data.

It should be further understood that because the invention acts as a channel for digital communication the ability to link the printed page to the electronic world can be accomplished in any manner in which instructions can be digitized. Thus, while FIG. 25 illustrates the use of icons, automatic links to further data sources can also occur through hypertext—i.e., specially formatted text which when selected by the click of a mouse button causes a jump to some further source of data. Also, HTML is just one method known to those skilled in programming for accomplishing the linking of paper to the electronic world. Other methods include the object linking and embedding ("OLE") facility of Windows® Version 3.1 produced by Microsoft Corporation of Redmond, Wash. and the facility of Microsoft Plus® for Windows 95® to place an icon in a document which, when selected by click of a mouse button, automatically activates the host computer's modem and Internet access software, calls and establishes contact with the host computer's Internet access provider, and navigates to the URL specified for the icon (i.e., the URL specified by the person creating the icon for the document).

The linking of paper with the electronic world is preferably accomplished using the methods of encoding and decoding described above. These methods of encoding and decoding make the linking feasible due to many of the unique and advantageous features including the density of data possible and the wide range of acceptable printers and, more importantly, acceptable off-the-shelf scanning devices.

It should be further understood that while the invention serves as a link between paper and the electronic world, the electronic connection can also be just a digital path to an analog source. For example, the digital data can include a way of navigating, a priori, through a voice mail system where the digital data includes a company's main telephone number, a directory of employees of a company, the particular telephone extensions for each of those employees and computer instructions to activate a calling device (such as a modem) place a telephone call to the company's main number and navigate through the company's voice mail system to the telephone of the employee selected by the user before the call is made. By decoding the digital data, activating the program contained in the digital data, and making a selection of employee, the user can avoid the usual time consuming method of navigating a company's voice mail system. The method is especially advantageous for subsequent calls to the same company because the digital data would presumably be stored on hard disk after decoding. Thus, the digital data serves as a link between two analog sources—the user and the company employee.

Appendix

Table of Contents for DEDS Program Source Code

| File | Starts at page |
|---|---|
| Bars.c | 86 |
| Bars.h | 116 |
| Crtpatt6.c | 118 |
| Error.h | 150 |
| Error45.c | 152 |
| Fileio.c | 251 |
| Hyperdot.c | 464 |
| Hyperdot.rc | 745 |
| Mergeit.c | 775 |
| Patdscnw.c | 789 |
| Setdefs.c | 797 |
| Showdib.h | 851 |
| Xtrdecod.c | 859 |
| Zipstuff.c (description only) | 1159 |

The preceding Appendix refers to materials contained in U.S. patent application Ser. No. 08/609,549, titled Variable Formatting of Digital Data into a Pattern, filed on Mar. 1, 1997, now pending, which is hereby incorporated by reference into this application.

We claim:

1. A method of decoding digital data values formatted into a pattern comprising the steps of:

determining the locations of cells in a first grouping of contiguous cells where the grouping of contiguous cells contains digital data indicating information concerning the formatting of a plurality of the remaining cells in said pattern, deriving from said first grouping of contiguous cells said information concerning the formatting of a pattern of a plurality of the remaining cells in said pattern, where the deriving comprises extracting digital data from each cell wherein each cell contains at least one bit of data where one logical state is expressed by the presence in the cell of a spot with one set of attributes and at least one other logical state is expressed by the absence from the cell of a spot with the same set of attributes as a spot the presence of which expresses the first logical state, determining the locations of said plurality of the remaining cells in said pattern, where said step of determining locations is performed by reference to and use of at least some of said information concerning the formatting of a plurality of the remaining cells in said pattern, deriving digital data values from said plurality of the remaining cells in said pattern where the deriving comprises extracting digital data from each cell wherein each cell contains at least one bit of data where one logical state is expressed by the presence of a spot with one set of attributes and at least one other logical state is expressed by the absence from the cell of a spot with the same set of attributes as a spot the presence of which expresses the first logical state, whereby digital data is recovered from said pattern.

2. The method of decoding of claim 1 where the cells of said first grouping of contiguous cells are formatted into a plurality of contiguous rows and a plurality of contiguous columns and the cells of said plurality of the remaining cells in said pattern are formatted into a plurality of contiguous rows and a plurality of contiguous columns and where at least one series of markers borders on at least one side of said first grouping of contiguous cells and on at least one side of said plurality of the remaining cells in said pattern and where the steps of determining locations of cells in said pattern is performed by reference to and use of the markers.

3. The method of decoding of claim 2 where all cells are formatted into groupings of contiguous cells and encoded onto a substrate and each grouping of contiguous cells is formatted into a plurality of contiguous rows and a plurality of contiguous columns, and where series of markers border each grouping of contiguous cells on at least two sides, and where a known number of rows exists between the top of each marker and the top of the next marker displaced vertically, and where a known number of columns exists between the left side of each marker and the left side of the next marker displaced horizontally, and where determining locations of cells on the digitally encoded substrate is performed by reference to and use of said series of markers comprising the steps, applied for each grouping of cells between markers, of:

locating a first marker bordering a first grouping of contiguous cells, determining the vertical coordinate of the top of said first marker, locating a second marker being the nearest marker displaced vertically from said first marker, determining the distance from the top of said first marker to the top of the first row of spots, locating a third marker being the nearest marker displaced horizontally from said first marker, determining the height of each spot, determining the lines through the centers of each of the rows of cells by determining the distance from the top of said first marker to the top of said second marker, dividing that distance by the number of rows of cells known to exist between markers, and for each of the known number of rows, adding to said vertical coordinate of the top of said first marker the sum of one-half the height of each spot plus the distance from the top of said first marker to the top of the spots in the first row, plus, for each row of cells, the product from multiplying the result of the division by the number of rows said each row of cells is vertically displaced from the first row of cells, determining the lines through the centers of each of the columns of cells by determining the lines through the centers of the rightmost and leftmost columns of cells located between said first marker and said third markers, determining the horizontal coordinate of the line through the center of the leftmost column of cells, determining the distance between the lines through the centers of the rightmost and leftmost columns of cells between said first marker and said third marker, dividing that distance by the result derived by subtracting one from the number of columns known to exist between markers, and, for each column, multiplying the result of that division by the number of columns that said each column is horizontally displaced from the leftmost column, and adding that product to the horizontal coordinate of the line through the center of the leftmost column of cells, and for each cell, determining the location of the cell to be the intersection of the lines through the centers of the cell's corresponding row and column.

4. The method of decoding of claim 2 where all cells are formatted into groupings of contiguous cells and encoded onto a substrate and where each grouping of contiguous cells is formatted into a plurality of contiguous rows and a plurality of contiguous columns, and where series of markers border said each grouping of contiguous cells on at least two sides, and where, for said each grouping of contiguous cells,
a known number of printer pixels separates the markers from the edges of possible spots,
a known number of rows exists between the top of each marker and the top of the next marker displaced vertically,
a known number of columns exists between the right side of each marker and the left side of the next marker displaced horizontally,
each cell has the same height and width,
each spot has the same height and width,
the vertical printer pixel coordinates for the top of a marker and the top of the spots in the nearest row are equal, and where said first grouping of contiguous cells contains information concerning the encoding of the remaining cells on the digitally encoded substrate where the information includes,
the marker, spot, and cell widths and heights measured in printer pixels,
the value of the known number of printer pixels that horizontally separates the markers from the edges of possible spots in the nearest columns,
the value of said known number of rows,
the value of said known number of columns, and where the method of decoding further comprises creating an image of the digitally encoded substrate where the various parts of said image can be measured in image pixels and the locations of the various parts can be referenced by horizontal and vertical image pixel coordinates, and where the steps of locating cells on the digitally encoded substrate, applied for each grouping of contiguous cells located between markers, comprise:
locating a first marker bordering a first grouping of contiguous cells,
determining the image pixel coordinates of the center of said first marker,
determining the image pixel coordinates of the top of said first marker,
locating a second marker being the nearest marker displaced vertically from said first marker,
determining the image pixel coordinates of the center of said second marker,
locating a third marker being the nearest marker displaced horizontally from said first marker,
determining the line through the center of each of the rows of cells between said first marker and said second marker by:
determining the distance in image pixels from the center of said first marker to the center of said second marker,
determining the printer pixels vertically separating the centers of said first marker and said second marker by multiplying the value for the known number of rows by the printer pixel cell height,
determining for each of the known number of rows the printer pixel vertical distance from the center of said first marker to the line through the center of the row by subtracting one-half of the printer pixel marker height from the sum of one-half the printer pixel spot height plus the product derived from multiplying the printer pixel cell height by the number of rows that the row is displaced from the top row between said first marker and said second marker,
determining for each of said known number of rows a ratio of printer pixels that the line through the center of that row is vertically displaced from the center of said first marker to said printer pixels vertically separating the centers of said first marker and said second marker,
for each row, adding to the vertical image pixel coordinate of the center of said first marker the product from multiplying the distance in image pixels from the center of said first marker to the center of said second marker by said ratio of printer pixels that the line through the center of that row is vertically displaced from the center of said first marker to said printer pixels vertically separating the centers of said first marker and said second marker,
determining the lines through the centers of each of the columns of cells by
determining the distance in image pixels from the center of said first marker to the center of said third marker,
determining the printer pixels horizontally separating the centers of said first marker and said third marker by determining the sum of the printer pixel marker width, plus the known printer pixel distance horizontally separating said first marker and the nearest edges of possible spots in the nearest column to the right of said first column, plus the printer pixel spot width, plus the product derived from multiplying the cell width by the result derived from reducing by one said value for said known number of columns, plus the known printer pixel distance horizontally separating said third marker and the nearest edges of possible spots in the nearest column to the left of said third marker,
determining for each of the known number of columns the printer pixel horizontal distance from the center of said first marker to the line through the center of the column by determining the sum of half the printer pixel marker width, plus the known printer pixel distance horizontally separating said first marker and the nearest edges of possible spots in the nearest column to the right of said first marker, plus half the printer pixel spot width, plus the product derived from multiplying the printer pixel cell width by the number of columns that the column is horizontally displaced from the nearest column to the right of said first marker,
determining for each of said known number of columns a ratio of printer pixels that the line through the center of that column is horizontally displaced from the center of said first marker to said printer pixels horizontally separating the centers of said first marker and said third marker,
for each column, adding to the horizontal image pixel coordinate of the center of said first marker the product from multiplying the distance in image pixels from the center of said first marker to the center of said third marker by said ratio of printer pixels that the line through the center of that column is horizontally displaced from the center of said first marker to said printer pixels horizontally separating the centers of said first marker and said third marker, and for each cell, determining the location of the cell to be the intersection of the lines through the center of the cell's corresponding row and column.

5. The method of decoding of claim 1 wherein said pattern is encoded on a substrate and where said substrate further comprises a landmark and wherein the steps of the method of decoding further comprise an initial step of locating said landmark and wherein the step of determining the locations of said first grouping of contiguous cells is performed by reference to the location of said landmark.

6. The method of decoding of claim 1 done in accordance with the DEDS program.

7. The method of decoding of claim 1 wherein said digital data values are encoded onto a plurality of substrates and wherein said method of decoding further comprises a step of locating each of the groupings of cells on each of said plurality of substrates wherein the steps of determining the locations of cells and deriving digital data values are then applied to each of the groupings of cells on each of said plurality of substrates.

8. The method of decoding of claim 7 further comprising creating a series of images of the groupings of cells from said plurality of digitally encoded substrates wherein the steps of determining the locations of cells and deriving digital data values are then applied to each of the series of images of said plurality of digitally encoded substrates.

9. A method of decoding digital data values from a pattern, the method comprising:
   determining formatting information concerning a plurality of first cells contained in a first portion of the pattern from a first feature contained in a second portion of the pattern;
   determining the locations of the first cells; and
   deriving digital data values from the cells by using the formatting information provided by the first feature.

10. The method of decoding of claim 9, wherein the first feature does not comprise a grouping of cells.

11. The method of decoding of claim 9, wherein the first feature is a marking having dimensions, and wherein the step of determining formatting information comprises determining formatting information based at least in part on an aspect of the marking other than its dimensions.

12. The method of decoding of claim 11 wherein the step of determining formatting information comprises determining formatting information based entirely on an aspect of the marking other than its dimensions.

13. The method of decoding of claim 9 wherein the first feature comprises a grouping of second cells containing digital data, and wherein the step of determining formatting information comprises determining formatting information by deriving the digital data from the second cells.

14. The method of decoding of claim 13 wherein the second cells of the first feature are contiguous.

15. The method of decoding of claim 13 wherein each of a plurality of the first and second cells contain at least one bit of data in which at least one logical state is expressed by the presence of a spot having one set of attributes, and wherein the steps of deriving digital data from the first and second cells comprises determining whether each cell contains a spot having the one set of attributes.

16. The method of decoding of claim 13 wherein the pattern further comprises a second feature, the method further comprising using the second feature to locate the pattern and the location of the first feature.

17. A method of decoding data wherein the data is formatted into a series of data values arranged in a pattern, the pattern comprising a plurality of spaces and at least one series of markers located between at least two of said spaces, the method comprising:
   locating at least one series of markers;
   locating at least one marker within the located series of markers; and
   locating at least two of said spaces at least in part from the location of the at least one marker.

18. The method of decoding of claim 9, wherein the data is formatted into a series of data values arranged in a pattern, the pattern comprising a plurality of spaces formatted into a plurality of subgroupings of contiguous spaces, the pattern further comprising at least a second series of markers near each of at least two subgroupings of spaces, where the method of decoding comprises:
   locating said second series of markers;
   locating at least one second marker within the second series of markers; and
   locating at least one of said spaces from each of at least two subgroupings of spaces at least in part from the location of the at least one second marker.

19. The method of decoding of claim 18 wherein each of the at least two subgroupings of contiguous spaces is formatted into a plurality of rows and a plurality of columns and wherein a series of markers is located in between each of said subgroupings, and wherein the step of locating at least one space in each of said at least two subgroupings of contiguous spaces comprises:
   determining a theoretical line running horizontally from at least one marker in said series of markers;
   determining a theoretical distance that each of said spaces should be vertically removed from such theoretical line;
   determining a theoretical distance that each of said spaces should be horizontally removed from the marker; and
   determining the location of each of said spaces as being the location that is vertically removed from the theoretical line by the distance so determined and horizontally removed from the marker by the distance so determined.

20. The method of decoding of claim 19 wherein all subgroupings of contiguous spaces are formatted into a plurality of rows and a plurality of columns and where a series of markers is located in between each of said subgroupings, and wherein the step of locating a space is applied to each space.

21. The method of decoding of claim 18 wherein the location of at least one of said spaces from each of at least two subgroupings of spaces is at least in part determined from the locations of a plurality of markers of said at least one series of markers.

22. The method of decoding of claim 18 wherein the pattern comprises a plurality of series of markers wherein a series of markers is near each subgrouping of spaces, and wherein the step of locating the space comprises determining the location of at least one marker in each of a plurality of series of markers.

23. The method of decoding of claim 22 wherein each subgrouping of spaces has a series of markers near each of a plurality of sides of said subgrouping and where the step of locating the space comprises determining the location of one marker in each of two series of markers.

24. A method of decoding digital data values formatted into a pattern of spaces wherein the presence of a spot in a space represents at least one logical state, the method comprising:

(a) determining the dimensions of each of a plurality of spots;
(b) determining the expected center of each of a plurality of possible spots at least in part by reference to the information determined in step (a); and
(c) determining the presence or absence of spots in at least some spaces by at least in part determining whether a spot exists at the expected center of each of said plurality of possible spots as determined by step (b).

25. The method of decoding data of claim 24 wherein the step of determining the presence or absence of spots comprises determining the presence or absence of spots in each of a grouping of spaces.

26. A method of decoding digital data from a pattern wherein the pattern comprises a plurality of spaces at least some of which can contain a spot that represents at least one bit of said digital data, and wherein at least one way in which digital data is encoded within said pattern is by the presence in at least one space of a spot with at least one attribute different from at least one attribute of the space, such method comprising:
(a) determining the at least one attribute of at least one space of a spot which might be contained within the at least one space; and
(b) decoding at least one bit of data using information obtained in step (a).

27. The method of decoding digital data of claim 26 wherein the at least one attribute is height and wherein the step of decoding at least one bit of data comprises decoding data when the height of the spot is less than the height of the space.

28. The method of decoding digital data of claim 26 wherein the at least one attribute is width and wherein the step of decoding at least one bit of data comprises decoding data when the width of the spot is less than the width of the space.

29. The method of decoding digital data of claim 26 where each of the plurality of spaces can contain a spot, all spots in said plurality of spaces have at least one common attribute, and all of said plurality of spaces have at least one common attribute, and wherein the step of decoding at least one bit of data comprises decoding the data based on the common attribute.

30. The method of decoding data of claim 29 wherein the common attributes of said spots and spaces is height and wherein the height of the spots differ from the height of the spaces.

31. The method of decoding data of claim 29 where the common attributes of said spots and spaces is width and wherein the width of the spots differs from the width of the spaces.

32. The method of decoding digital data of claim 26 wherein at least one feature of the pattern is used in the step of determining at least one attribute of at least one space and of the spot which that space might contain.

33. The method of decoding of claim 32 where the feature comprises a first grouping of contiguous spaces wherein that grouping of contiguous spaces contains digital information concerning the parameters of a plurality of remaining spaces and the spots which those spaces might contain.

34. The method of decoding of claim 26 wherein an attribute is capable of being one of a plurality of possible attributes and where the step of determining at least one attribute comprises selecting at least one of said plurality of possible attributes.

35. A method of decoding data from a pattern at least some of which pattern contains a plurality of spaces formatted in a plurality of subgroupings of contiguous spaces, each subgrouping formatted in a plurality of rows and a plurality of columns, and wherein a series of markers is encoded in said pattern, the method comprising:
locating a first marker; and
using said first marker as a clocking mechanism for at least two subgroupings of spaces.

36. The method of decoding of claim 35 wherein the pattern further comprises a landmark, the method further comprising locating said plurality of subgroupings by reference to the landmark.

37. The method of decoding of claim 35 wherein the pattern comprises a first grouping of contiguous spaces containing digital information concerning the formatting of a plurality of remaining spaces in said pattern, the method comprising:
deriving from said first grouping the digital information contained therein; and
deriving digital data from the remaining spaces by using at least some of the digital information derived from said first grouping.

38. The method of decoding of claim 35 wherein the pattern contains a first grouping of contiguous spaces containing digital information concerning the formatting of at least one marker in said pattern, the method comprising:
deriving from said first grouping the digital information contained therein; and
locating said first marker by using at least some of the digital information derived from said first grouping.

* * * * *